(12) United States Patent
Lee et al.

(10) Patent No.: US 10,097,995 B2
(45) Date of Patent: *Oct. 9, 2018

(54) NETWORK ARCHITECTURE AND SECURITY WITH ENCRYPTED NETWORK REACHABILITY CONTEXTS

(71) Applicant: QUALCOMM Incorporated, San Diego, CA (US)

(72) Inventors: Soo Bum Lee, San Diego, CA (US); Gavin Bernard Horn, La Jolla, CA (US); Anand Palanigounder, San Diego, CA (US); Stefano Faccin, San Ysidro, CA (US)

(73) Assignee: QUALCOMM Incorporated, San Diego, CA (US)

( * ) Notice: Subject to any disclaimer, the term of this patent is extended or adjusted under 35 U.S.C. 154(b) by 154 days.

This patent is subject to a terminal disclaimer.

(21) Appl. No.: 15/160,245

(22) Filed: May 20, 2016

(65) Prior Publication Data

US 2017/0013454 A1   Jan. 12, 2017

Related U.S. Application Data

(60) Provisional application No. 62/191,458, filed on Jul. 12, 2015, provisional application No. 62/320,506, filed on Apr. 9, 2016.

(51) Int. Cl.
*H04W 12/06* (2009.01)
*H04W 68/00* (2009.01)
(Continued)

(52) U.S. Cl.
CPC ............. *H04W 12/06* (2013.01); *H04L 63/06* (2013.01); *H04L 63/0892* (2013.01);
(Continued)

(58) Field of Classification Search
CPC .............................. H04W 12/04; H04W 40/02
See application file for complete search history.

(56) References Cited

U.S. PATENT DOCUMENTS 8,494,163 B2   7/2013   Casati et al.
8,687,556 B2   4/2014   Eipe et al.
(Continued)

FOREIGN PATENT DOCUMENTS

CN   102065417 B   2/2014
EP   2757856 A1   7/2014
(Continued)

OTHER PUBLICATIONS

3GPP TR 33.868: "3rd Generation Partnership Project, Technical Specification Group Services and System Aspects, Study on Security Aspects of Machine-Type Communications (MTC) and other Mobile Data Applications Communications Enhancements (Release 12)", 3GPP Draft, 33868-C10, 3rd Generation Partnership Project (3GPP), Mobile Competence Centre, 650, Route Des Lucioles, F-06921 Sophia-Antipolis Cedex, France, Jun. 26, 2014 (Jun. 26, 2014), pp. 1-116, XP058917128, Retrieved from the Internet: http://www.3gpp.org/ftp/Specs/zltuInfo/M.2012-2/2014-12/Rel-12/33series/ [retrieved on Jun. 26, 2014]—the whole document.
(Continued)

*Primary Examiner* — Oleg Korsak
(74) *Attorney, Agent, or Firm* — Loza & Loza, LLP

(57) ABSTRACT

In an aspect, a network supporting a number of client devices may include a network device that establishes a security context and generates a client device context. The client device context includes network state information that enables the network to communicate with the client device. The network device generates one or more encrypted network reachability contexts based on the client device context, and transmits the one or more encrypted network reachability contexts to a network entity. The one or more
(Continued)

encrypted network reachability contexts enable the network device to reconstruct the context for the client device when the network device receives a message to be transmitted to the client device from the network entity. As a result, the network device can reduce an amount of the context for the client device maintained at the network device in order to support a greater number of client devices.

51 Claims, 25 Drawing Sheets

(51) Int. Cl.
H04W 40/02 (2009.01)
H04L 29/06 (2006.01)
H04W 12/04 (2009.01)
H04W 76/38 (2018.01)
H04W 76/34 (2018.01)
H04W 4/70 (2018.01)
H04W 12/02 (2009.01)

(52) U.S. Cl.
CPC ........... H04W 12/04 (2013.01); H04W 40/02 (2013.01); H04W 68/005 (2013.01); H04W 76/34 (2018.02); H04W 76/38 (2018.02); H04L 2463/062 (2013.01); H04W 4/70 (2018.02); H04W 12/02 (2013.01)

(56) References Cited

U.S. PATENT DOCUMENTS

| 9,497,624 | B2* | 11/2016 | Kahn | .................. H04W 12/04 |
| 2002/0184217 | A1 | 12/2002 | Bisbee et al. | |
| 2012/0082105 | A1* | 4/2012 | Hwang | .................. H04W 76/06 370/329 |
| 2012/0269167 | A1 | 10/2012 | Velev et al. | |
| 2013/0301611 | A1 | 11/2013 | Baghel et al. | |
| 2013/0305386 | A1 | 11/2013 | Zhang et al. | |
| 2013/0343280 | A1 | 12/2013 | Lee et al. | |
| 2014/0053241 | A1 | 2/2014 | Norrman et al. | |
| 2014/0126448 | A1 | 5/2014 | Punz et al. | |
| 2015/0127733 | A1 | 5/2015 | Ding et al. | |
| 2015/0200941 | A1 | 7/2015 | Muppidi et al. | |
| 2017/0013453 | A1 | 1/2017 | Lee et al. | |
| 2017/0131994 | A1 | 5/2017 | Middleton et al. | |

FOREIGN PATENT DOCUMENTS

| EP | 2804441 A1 | 11/2014 |
| WO | WO-2008152611 A1 | 12/2008 |
| WO | WO-2013024435 A1 | 2/2013 |

OTHER PUBLICATIONS

International Search Report and Written Opinion—PCT/US2016/037061—ISA/EPO—dated Aug. 25, 2016.
Hummen, R., etal., "Delegation-based Authentication and Authorization for the IP-based Internet of Things", 2014 Eleventh Annual IEEE International Conference on Sensing, Communication, and Networking (SECON), IEEE, Jun. 30, 2014 (Jun. 30, 2014), XP032708816, pp. 284-292. [retrieved on Dec. 16, 2014].
NTT Docomo., "Signalling-LTE SDT (SL-SDT) Procedure", 3GPP Draft, S2-130378 Signalling-LITE-SDT Procedure-V4, 3rd Generation Partnership Project (3GPP), Mobile Competence Centre, 650, Route Des Lucioles, F-06921 Sophia-Antipolis Cedex, France, vol. SA WG2, no. Prague, Czech Republic, Jan. 28, 2013-Feb. 1, 2013, Jan. 25, 2013 (Jan. 25, 2013), XP050684970, Retrieved from the Internet: URL: http://www.3gpp.org/ftp/tsg_sa/WG2_Arch/TSGS2_95_Prague/Docs/ [retrieved-on Jan. 25, 2013].
Partial International Search Report and Written Opinion—PCT/US2016/037279—ISA/EPO—dated Feb. 23, 2017.
EventHelix (LTE Security Encryption and Integrity Protection in LTE, 2012, 11 pages).
Ericsson et al.,"More details on Fast Path Security Protocol," vol. SA W63, No. Qingdao, China; Jul. 8, 2013-Jul. 12, 2013 Jul. 12, 2013 (Jul. 12, 2013), XP050727211, 10 Pages, Retrieved from the Internet: URL:http://www.3gpp.org/ftp/tsg_sa/WG3_Security/TSGS3_72_Qingdao/Docs/ [retrieved an Jul. 12, 2013].

* cited by examiner

NETWORK ARCHITECTURE AND SECURITY WITH ENCRYPTED NETWORK REACHABILITY CONTEXTS

CLAIM OF PRIORITY UNDER 35 U.S.C. § 119

The present application for Patent claims priority to U.S. Provisional Application No. 62/191,458 entitled "IoT Architecture and Security with Encrypted Network Reachability Contexts" filed Jul. 12, 2015, and U.S. Provisional Application No. 62/320,506 entitled "Network Architecture and Security with Encrypted Client Device Contexts" filed Apr. 9, 2016, which are both assigned to the assignee hereof and hereby expressly incorporated by reference herein.

INTRODUCTION

Field of the Disclosure

Aspects of the disclosure relate generally to communication, and more specifically, but not exclusively, to an Internet of Things (IoT) network architecture.

Background

The capabilities of electronic devices to collect, process, and exchange data are continuing to grow. Moreover, an increasing number of these electronic devices are being provided with network connectivity. Such capabilities and features are enabling many electronic devices to evolve into Internet of Things (IoT) devices. As the number of these types of electronic devices continues to rapidly increase, networks may not have the resources to adequately support these electronic devices.

A client device context may represent network state information associated with the client device. When a client device is in the idle mode, a mobility management entity (MME) of the network may maintain a context for the client device that includes network reachability information for the client device. When a client device is in the Evolved Packet System Mobility Management (EMM) registered state, a client device context may be maintained at an MME and a serving gateway (S-GW).

However, in order to support many client devices, the MME and S-GW may need to be equipped with a large amount of storage to maintain contexts for client devices that may remain in the idle mode for long periods of time. It can be appreciated that the network may need to support a large number (e.g., billions) of client devices, and since the amount of resources (e.g., equipment, such as network functions, different than for normal client devices) allocated by the network for IoT purposes may be limited, the network functions may not be able to maintain the contexts for all client devices that would be infrequently active.

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

In an aspect, a method for a network device is provided. The network device establishes a security context for a connection with a client device, wherein the security context includes at least an encryption algorithm, an encryption key, an integrity protection algorithm, an integrity protection key, or combinations thereof, generates a context for the client device, the context including network state information associated with the client device, the network state information including at least the encryption algorithm, the encryption key, the integrity protection algorithm, the integrity protection key, or combinations thereof, generates one or more encrypted network reachability contexts based on the context, and transmits the one or more encrypted network reachability contexts to a network entity, wherein the one or more encrypted network reachability contexts serve to reduce an amount of the context maintained at the network device and enable reconstruction of the context for the client device when the network device receives a message to be transmitted to the client device from the network entity. In an aspect, the network state information further includes information that enables the network device to reach the client device for transmission of the message. In an aspect, the network device receives a control packet to be sent to the client device and the one or more encrypted network reachability contexts from the network entity, and reconstructs the context using the one or more encrypted network reachability contexts. In an aspect, the network device determines a key that was used to generate the one or more encrypted network reachability contexts, generates a first message authentication code using the key, and compares the first message authentication code to a second message authentication code in the one or more encrypted network reachability contexts in order to verify the one or more encrypted network reachability contexts. In an aspect, the network device pages the client device based on the reconstructed context. In an aspect, the network device receives, from the client device, a request to communicate with a network, wherein the security context is established as a result of a successful authentication and key agreement procedure, and wherein the network entity includes at least one of an application server or a packet data network gateway. In an aspect, the network device generates the one or more encrypted network reachability contexts by encrypting at least one of a control plane client device context for control information or a user plane client device context for downlink packet transfer. In an aspect, the one or more encrypted network reachability contexts are generated based on one or more corresponding uses (e.g., encrypted network reachability context usage information) of the one or more encrypted network reachability contexts. In an aspect, the network device protects a control packet with the security context for the client device, and transmits the message including the control packet. In an aspect, the network device protects the control packet by protecting the control packet based on at least one of the encryption algorithm, the encryption key, the integrity protection algorithm, or the integrity protection key. In an aspect, the network device removes the context, receives a resource establishment request and at least one of the one or more encrypted network reachability contexts from a network entity, obtains a network address for the client device in response to the resource establishment request, and transmits the network address to the client device and the network entity. In an aspect, the network device receives a resource release request message from the network entity and releases one or more resources for the client device. In an aspect, the network device transmits a resource release request message to a packet data network gateway when a timer expires prior to a transmission from the network entity to the client device or prior to a transmission from the client device to the network entity, wherein the resource release request message enables the packet data network gateway to release one or more resources for the client device. In an aspect, the network device removes the at least one context, receives a message from the client device, the message including at least one of the one or more encrypted network reachability contexts and usage information associated with the one or more encrypted network reachability contexts, reconstructs at least a portion of a context based on the at least one of the one or more encrypted network reachability contexts and the usage information. In an aspect, the network device maintains the at least a portion of a context for a first threshold period of time when the usage information indicates a reduced data transmission, or a second threshold period of time when the usage information indicates a burst data transmission, the second threshold period of time being greater than the first threshold period of time. In an aspect, the usage information indicates whether transmission of the message is a reduced data transmission or a burst data transmission.

In an aspect, a network device is provided. The network device includes means for establishing a security context for a connection with a client device, wherein the security context includes at least an encryption algorithm, an encryption key, an integrity protection algorithm, an integrity protection key, or combinations thereof, means for generating a context for the client device, the context including network state information associated with the client device, the network state information including at least the encryption algorithm, the encryption key, the integrity protection algorithm, the integrity protection key, or combinations thereof, means for generating one or more encrypted network reachability contexts based on the context, and means for transmitting the one or more encrypted network reachability contexts to a network entity, wherein the one or more encrypted network reachability contexts serve to reduce an amount of the context maintained at the network device and enable reconstruction of the context for the client device when the network device receives a message to be transmitted to the client device from the network entity. In an aspect, the network state information further includes information that enables the network device to reach the client device for transmission of the message. In an aspect, the network device includes means for receiving a control packet to be sent to the client device and the one or more encrypted network reachability contexts from the network entity, and means for reconstructing the context using the one or more encrypted network reachability contexts. In an aspect, the network device includes means for determining a key that was used to generate the encrypted network reachability context, means for generating a first message authentication code using the key, and means for comparing the first message authentication code to a second message authentication code in the one or more encrypted network reachability contexts in order to verify the one or more encrypted network reachability contexts. In an aspect, the network device includes means for paging the client device based on the reconstructed context. In an aspect, the network device includes means for receiving, from the client device, a request to communicate with a network, wherein the security context is established as a result of a successful authentication and key agreement procedure, and wherein the network entity includes at least one of an application server or a packet data network gateway. In an aspect, the means for generating the one or more encrypted network reachability contexts is configured to encrypt at least one of a control plane client device context or a user plane client device context for downlink packet transfer. In an aspect, the network device includes means for protecting a control packet with the security context for the client device, and means for transmitting the message including the control packet. In an aspect, the means for protecting the control packet is configured to protect the control packet based on at least one of the encryption algorithm, the encryption key, the integrity protection algorithm, or the integrity protection key. In an aspect, the network device includes means for removing the context, means for receiving a resource establishment request and at least one of the one or more encrypted network reachability contexts from a network entity, means for obtaining a network address for the client device in response to the resource establishment request, and means for transmitting the network address to the client device and the network entity. In an aspect, the network device includes means for receiving a resource release request message from the network entity and means for releasing one or more resources for the client device. In an aspect, the network device includes means for transmitting a resource release request message to a packet data network gateway when a timer expires prior to a transmission from the network entity to the client device or prior to a transmission from the client device to the network entity, wherein the resource release request message enables the packet data network gateway to release one or more resources for the client device. In an aspect, the network device includes means for removing the at least one context, means for receiving a message from the client device, the message including at least one of the one or more encrypted network reachability contexts and usage information associated with the one or more encrypted network reachability contexts, means for reconstructing at least a portion of a context based on the at least one of the one or more encrypted network reachability contexts and the usage information. In an aspect, the network device includes means for maintaining the at least a portion of a context for a first threshold period of time when the usage information indicates a reduced data transmission, or a second threshold period of time when the usage information indicates a burst data transmission, the second threshold period of time being greater than the first threshold period of time. In an aspect, the usage information indicates whether transmission of the message is a reduced data transmission or a burst data transmission.

In an aspect, a method for a network device is provided. The network device receives a data packet to be sent to a client device and one or more encrypted network reachability contexts associated with the client device from a network entity, obtains a key for the encrypted network reachability context, decrypts the one or more encrypted network reachability contexts using the key to obtain network state information included in the one or more encrypted network reachability contexts, the network state information including at least an encryption algorithm, an encryption key, an integrity protection algorithm, an integrity protection key, or combinations thereof, protects the data packet based on at least one of the encryption algorithm, the encryption key, the integrity protection algorithm, the integrity protection key, or combinations thereof, and transmits a message including the data packet to the client device. In an aspect, the network device reconstructs a context for the client device based on the network state information included in the encrypted network reachability context. In an aspect, the network state information further includes information that enables the network device to reach the client device for transmission of the message. In an aspect, the network device generates a first message authentication code using the key, and compares the first message authentication code to a second message authentication code in the one or more encrypted network reachability contexts in order to verify the encrypted network reachability context.

In an aspect, a network device is provided. The network device includes means for receiving a data packet to be sent to a client device and one or more encrypted network reachability contexts associated with the client device from a network entity, means for obtaining a key for the one or more encrypted network reachability contexts, means for decrypting the one or more encrypted network reachability contexts using the key to obtain network state information included in the one or more encrypted network reachability contexts, the network state information including at least an encryption algorithm, an encryption key, an integrity protection algorithm, an integrity protection key, or combinations thereof, means for protecting the data packet based on at least one of the encryption algorithm, the encryption key, the integrity protection algorithm, the integrity protection key, or combinations thereof, and means for transmitting a message including the data packet to the client device. In an aspect, the network device includes means for reconstructing a context for the client device based on the network state information included in the encrypted network reachability context. In an aspect, the network state information further includes information that enables the network device to reach the client device for transmission of the message. In an aspect, the network device includes means for generating a first message authentication code using the key, and means for comparing the first message authentication code to a second message authentication code in the one or more encrypted network reachability contexts in order to verify the one or more encrypted network reachability contexts.

In an aspect, a method for a network entity is provided. The network entity receives one or more encrypted network reachability contexts for a client device from a network device, generates a message to be delivered to the client device, the message including the one or more encrypted network reachability contexts, and transmits the message including the one or more encrypted network reachability contexts to the client device, wherein the one or more encrypted network reachability contexts includes network state information that enables the network entity to reach the client device. In an aspect, the network entity is a packet data network gateway. In such aspect, network entity stores the one or more encrypted network reachability contexts, associates the one or more encrypted network reachability contexts to the client device, receives a packet to be transmitted to the client device, wherein the packet is included in the generated message, and determines the one or more encrypted network reachability contexts that corresponds to the client device. In an aspect, the one or more encrypted network reachability contexts serve to reduce an amount of a context maintained at the network entity and enable reconstruction of a context for the client device. In an aspect, the network entity includes at least a packet data network gateway or a server.

In an aspect, a network entity is provided. The network entity includes means for receiving one or more encrypted network reachability contexts for a client device from a network device, means for generating a message to be delivered to the client device, the message including the one or more encrypted network reachability contexts, and means for transmitting the message including the one or more encrypted network reachability contexts to the client device, wherein the one or more encrypted network reachability contexts includes network state information that enables the network entity to reach the client device. In an aspect, the network entity is a packet data network gateway. In such aspect, the network entity includes means for storing the one or more encrypted network reachability contexts, means for associating the one or more encrypted network reachability contexts to the client device, means for receiving a packet to be transmitted to the client device, wherein the packet is included in the generated message, means for determining the one or more encrypted network reachability contexts that corresponds to the client device. In an aspect, the one or more encrypted network reachability contexts serve to reduce an amount of a context maintained at the network entity and enable reconstruction of a context for the client device. In an aspect, the network entity includes at least a packet data network gateway or a server.

In an aspect, a method for a first network device is provided. The first network device receives a control packet from a client device, requests a context for the client device from a second network device, receives the context for the client device from the second network device, generates one or more encrypted network reachability contexts based on the context, and transmits the one or more encrypted network reachability contexts to a network entity. In an aspect, the first network device transmits, to the client device, a globally unique temporary identifier associated with the first network device. In an aspect, the one or more encrypted network reachability contexts include network state information that enables the network entity to reach the client device. In an aspect, the network entity is a server. In an aspect, the first network device is associated with a new serving area with respect to the client device, wherein the second network device is associated with an old serving area with respect to the client device, and wherein the control packet includes a serving area update request.

In an aspect, a first network device is provided. The first network device includes means for receiving a control packet from a client device, means for requesting a context for the client device from a second network device, means for receiving the context for the client device from the second network device, means for generating one or more encrypted network reachability contexts based on the context, and means for transmitting the one or more encrypted network reachability contexts to a network entity. In an aspect, the first network device includes means for transmitting, to the client device, a globally unique temporary identifier associated with the first network device. In an aspect, the one or more encrypted network reachability contexts include network state information that enables the network entity to reach the client device. In an aspect, the network entity is a server. In an aspect, the first network device is associated with a new serving area with respect to the client device, wherein the second network device is associated with an old serving area with respect to the client device, and wherein the control packet includes a serving area update request.

These and other aspects of the disclosure will become more fully understood upon a review of the detailed description, which follows. Other aspects, features, and implementations of the disclosure will become apparent to those of ordinary skill in the art, upon reviewing the following description of specific implementations of the disclosure in conjunction with the accompanying figures. While features of the disclosure may be discussed relative to certain implementations and figures below, all implementations of the disclosure can include one or more of the advantageous features discussed herein. In other words, while one or more implementations may be discussed as having certain advantageous features, one or more of such features may also be used in accordance with the various implementations of the disclosure discussed herein. In similar fashion, while certain implementations may be discussed below as device, system, or method implementations it should be understood that such implementations can be implemented in various devices, systems, and methods.

DETAILED DESCRIPTION

Figure 1:
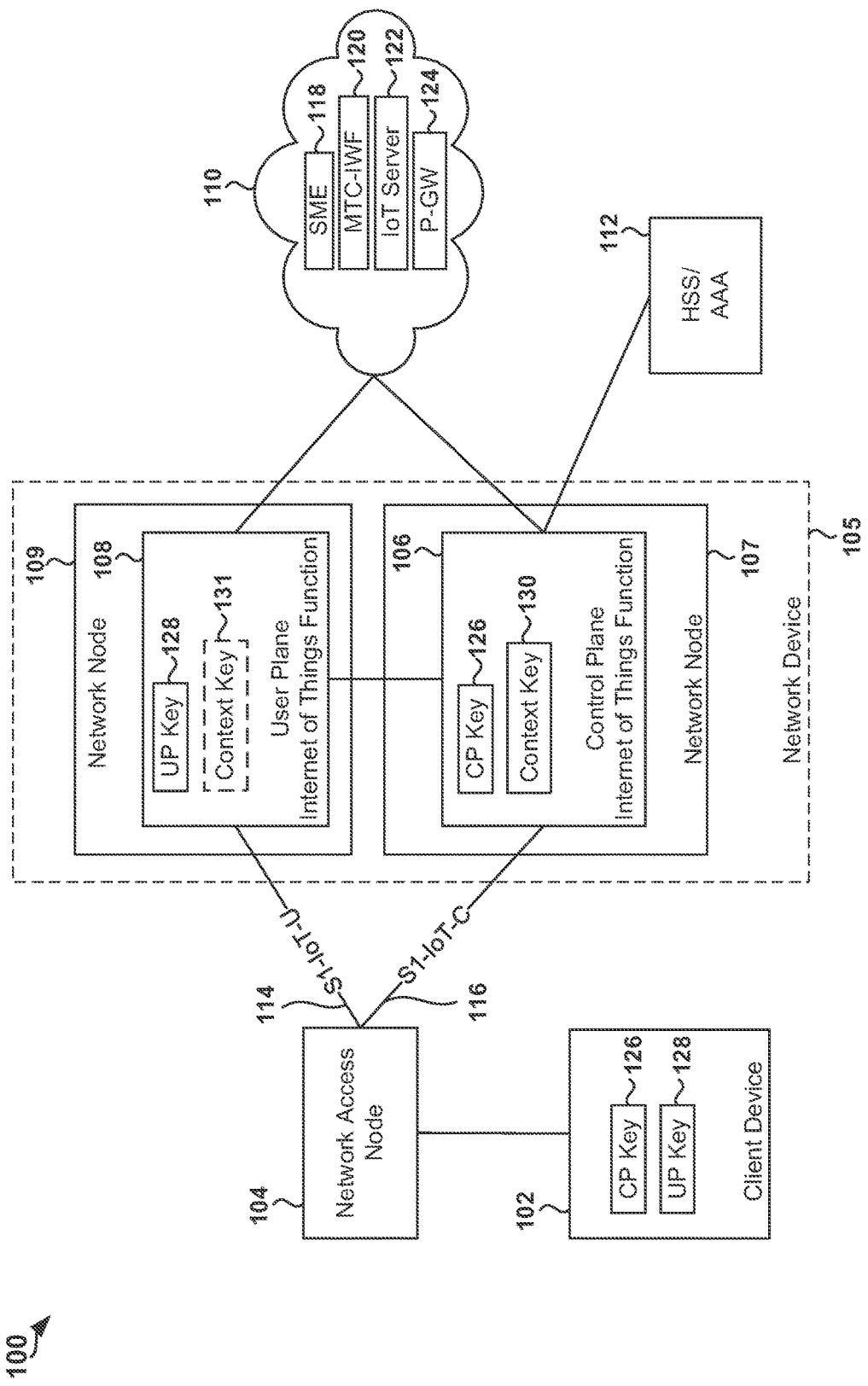
FIG. 1 is a block diagram of an Internet of Things (IoT) network architecture in accordance with various aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Long Term Evolution (LTE) mobility management and session management incur too much overhead to scale for potentially billions of client devices (also referred to as Internet of Things (IoT) devices), due to management and storage of contexts for the client devices at network nodes.

When a client device transitions from an idle mode to a connected mode, signaling overhead may be incurred by the network. For example, a client device may establish a connection with a network access node (e.g., evolved Node B (eNB), base station, or network access point) and the network access node may generate network state information (also referred to as a "context" or a "client device context") for the client device.

For client device terminated traffic (e.g., downlink (DL) data from the network destined for the client device), the client device context may be maintained at the network and may allow the network to reach the client device. For example, if the client device is in the connected mode, the client device context may allow a gateway (e.g., a serving gateway) of the network to tunnel the DL data to a cell (e.g., the cell to which the client device is connected) for delivery of the DL data to the client device. As another example, when the client device is in the idle mode, a mobility management entity (MME) of the network may maintain a context for the client device that includes network reachability information for the client device. Therefore, the MME may use the client device context to determine where (and/or when) to reach (e.g., page) the client device in order to indicate to the client device that DL data from the network is available and to trigger a service request. As another example, a client device context may be maintained at an MME and a serving gateway (S-GW) while the client device is in the Evolved Packet System Mobility Management (EMM) registered state.

The aspects disclosed herein include IoT network architectures for client devices, from an upper-layer perspective, for achieving ultra-low client device power consumption, a large number of client devices per cell, and/or a small spectrum. Dedicated network functions are introduced to enable independent deployment and remove scalability/inter-working requirements. Security is anchored at an IoT network function (also referred to as an IoT Function (IoTF)). According to various aspects, the architecture may allow no security context to be maintained at a network access node (e.g., eNB, base station, network access point) for data transfer to or from client devices. For example, a client device may be configured to communicate with a network, such as an LTE network, and a context may represent network state information associated with a client device. A client device, for example, may be a cellular telephone (e.g., a smartphone), a personal computer (e.g., a laptop), a gaming device, an automobile, an appliance, or any other suitable device that is configured to communicate with the network. In some aspects, the client device may be referred to as a user equipment (UE) or an access terminal (AT). In some aspects, a client device as referred to herein may be a mobile device or a static device.

To avoid affecting normal packet data network (PDN) connection/traffic of client devices, dedicated core network resources are allocated for small data transfer. The network may allocate dedicated physical (PlY) layer resources for access control to also limit small data traffic. A client device context may be used for small data transfer to eliminate a client device's semi-persistent context at an IoTF when the client device is in an idle state. To achieve efficient data transmission for client devices, the disclosed network architectures may include an IoTF implemented at a network device. Such IoTF may include a control plane IoTF (IoTF-C) and a user plane IoTF (IoTF-U). In an aspect of the present disclosure, the IoTF-C may have functions similar to a mobility management entity (MME). In an aspect of the present disclosure, the IoTF-U may be the mobility and security anchor for user plane data traffic. In an aspect of the present disclosure, an IoTF-U may have functions similar to a serving gateway (S-GW) and/or a network access node (e.g., evolved Node B (eNB), base station, or network access point).

In order to allow the network functions (e.g., IoTF-C, IoTF-U) to optimize resource usage for client devices, various aspects of the disclosed IoT network architectures may implement a design protocol in which a context for a client device is carried in a packet (e.g., IP packet) and the IoTF (e.g., an IoTF that includes an IoTF-C and an IoTF-U) creates the context for the client device opportunistically. This enables network functions to maintain minimal to no network state information for the client device and minimal to no signaling overhead. It should be understood that the disclosed IoT network architectures and the functions included therein may be used for any type of small data transfer. For example, a client device (e.g., smartphone) may have a nominal mode where it establishes a connection and transfers data, but also uses procedures as disclosed herein to transfer data using a client device context.

IoT Network Architecture

FIG. 1 is a block diagram of an IoT network architecture 100 in accordance with various aspects of the present disclosure. As shown in FIG. 1, the IoT network architecture 100 includes a client device 102 (also referred to as an IoT device), a network access node 104, a network device 105, a service network 110, and a home subscriber server (HSS)/authentication, authorization, and accounting (AAA) server 112. In one aspect, the network access node 104 may be an eNB, base station, or a network access point.

In one aspect, the network device 105 may include one or more processing circuits and/or other appropriate hardware configured to implement an IoTF. In one aspect of the present disclosure, an IoTF may include a control plane IoT Function (IoTF-C) 106 and a user plane IoT Function (IoTF-U) 108. For example, the IoTF-C 106 may be implemented at a first network node 107 and the IoTF-U 108 may be implemented at a second network node 109. In accordance with the various aspects disclosed herein, the term "node" may represent a physical entity, such as a processing circuit, a device, a server, or a network entity, included in the network device 105. Accordingly, for example, a network node may be referred to as a network node device.

In one aspect, the IoTF-C 106 and the IoTF-U 108 may be implemented at the same hardware platform (e.g., a processing circuit and other associated hardware components, such as memory). In such aspect, for example, the IoTF-C 106 may be implemented at a first virtual machine (e.g., a first operating system) provided on a hardware platform (e.g., the network device 105), and the IoTF-U 108 may be implemented at a second virtual machine (e.g., a second operating system) provided on the hardware platform.

As shown in FIG. 1, the IoTF-C 106 is in communication with the network access node 104 via a first S1 connection 116, and the IoTF-U 108 is in communication with the network access node 104 via a second S1 connection 114. In an aspect, the service network 110 may include a number of entities, functions, gateways, and/or servers configured to provide various types of services. For example, the service network 110 may include a short message entity (SME) 118, a machine type communication interworking function (MTC-IWF) 120, an IoT server 122, and/or a packet data network (PDN) gateway (P-GW) 124. It should be understood that the service network 110 disclosed in FIG. 1 serves as one example and that in other aspects, the service network 110 may include different types of entities, functions, and/or servers than those disclosed in FIG. 1.

In an aspect of the present disclosure, the IoTF implemented at the network device 105 may provide control plane and user plane functionality. In an aspect of the present disclosure, the IoTF-C 106 handles control plane signaling (e.g., packets carrying control information, herein referred to as "control packets") for client devices. For example, the IoTF-C 106 may perform mobility and session management for client devices, perform authentication and key agreement (also referred to as an AKA procedure) with client devices, and/or may create security contexts for client devices. In an aspect of the present disclosure, the IoTF-C 106 may derive control plane (CP) key(s) 126 for control plane traffic associated with the client device 102, user plane (UP) key(s) 128 for user plane traffic associated with the client device 102, and/or a context key(s) 130 for generating an encrypted network reachability context for the client device 102. In an aspect of the present disclosure, the IoTF-C 106 may provide the user plane key(s) 128 and/or at least one of the context key(s) 130 to the IoTF-U 108. Accordingly, in some aspects, the IoTF-U 108 may include the user plane key(s) 128 and/or context key(s) 131 provided by the IoTF-C 106.

In an aspect of the present disclosure, the IoTF-U 108 may handle user plane traffic for client devices. For example, the IoTF-U 108 may derive a ciphering key and an integrity key (e.g., an Authenticated Encryption with Associated Data (AEAD) cipher using the UP key 128), create a client device context (also referred to as a IoT device context) on-the-fly, authenticate and decipher uplink packets sent by client devices and forward the uplink packets to a PDN or P-GW (e.g., P-GW 124), cipher and authenticate downlink (DL) packets for connected client devices and forward the downlink packets to the next hop network access node (e.g., eNB), and/or buffer downlink packets for idle client devices during paging. In an aspect of the present disclosure, the IoTF-U 108 can be considered to be the mobility and security anchor for data traffic.

Exemplary Key Hierarchy for an IoT Network

Figure 2:
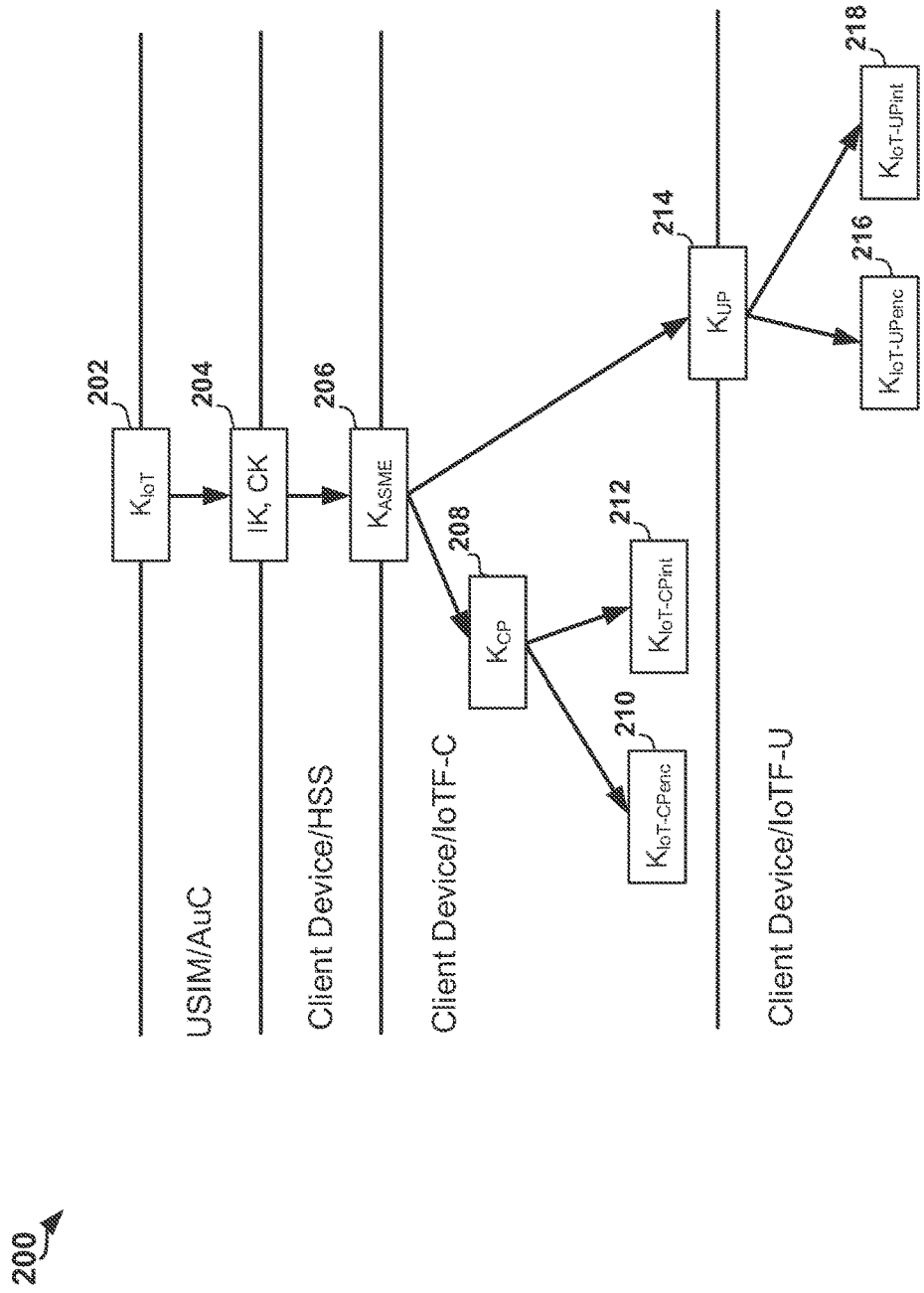
FIG. 2 is a diagram illustrating a key hierarchy for an IoT network architecture in accordance with various aspects of the present disclosure.

FIG. 2 is a diagram illustrating a key hierarchy 200 for an IoT network architecture (e.g., IoT network architecture 100) in accordance with various aspects of the present disclosure. In FIG. 2, the key $K_{IoT}$ 202 may be a secret key stored permanently in a Universal Mobile Telecommunications System (UMTS) Subscriber Identity Module (USIM) of a client device (e.g., the client device 102) and an Authentication Center (AuC)) of the network. The integrity key (IK) and cipher key (CK) (shown as IK, CK 204 in FIG. 2) are a pair of keys derived in the AuC and USIM during an AKA procedure. With reference to FIG. 1, during the AKA procedure, the IoTF-C 106 may receive authentication vectors (AVs) from the HSS/AAA server 112 which contain a key (shown in FIG. 2 as the key $K_{ASME}$ 206) from an Access Security Management Entity (ASME). The IoTF-C 106 may derive a control plane key ($K_{CP}$) 208 and a user plane key ($K_{UP}$) 214 from the key $K_{ASME}$ 206. The IoTF-C 106 may provide the key $K_{UP}$ 214 to the IoTF-U 108. The IoTF-C 106 may derive an encryption key $K_{IoT\text{-}CPenc}$ 210 and an integrity protection key $K_{IoT\text{-}CPint}$ 212 from the key $K_{CP}$ 208. The IoTF-U 108 may derive an encryption key $K_{IoT\text{-}UPenc}$ 216 and an integrity protection key $K_{IoT\text{-}UPint}$ 218 from the key $K_{UP}$ 214.

Figure 3:
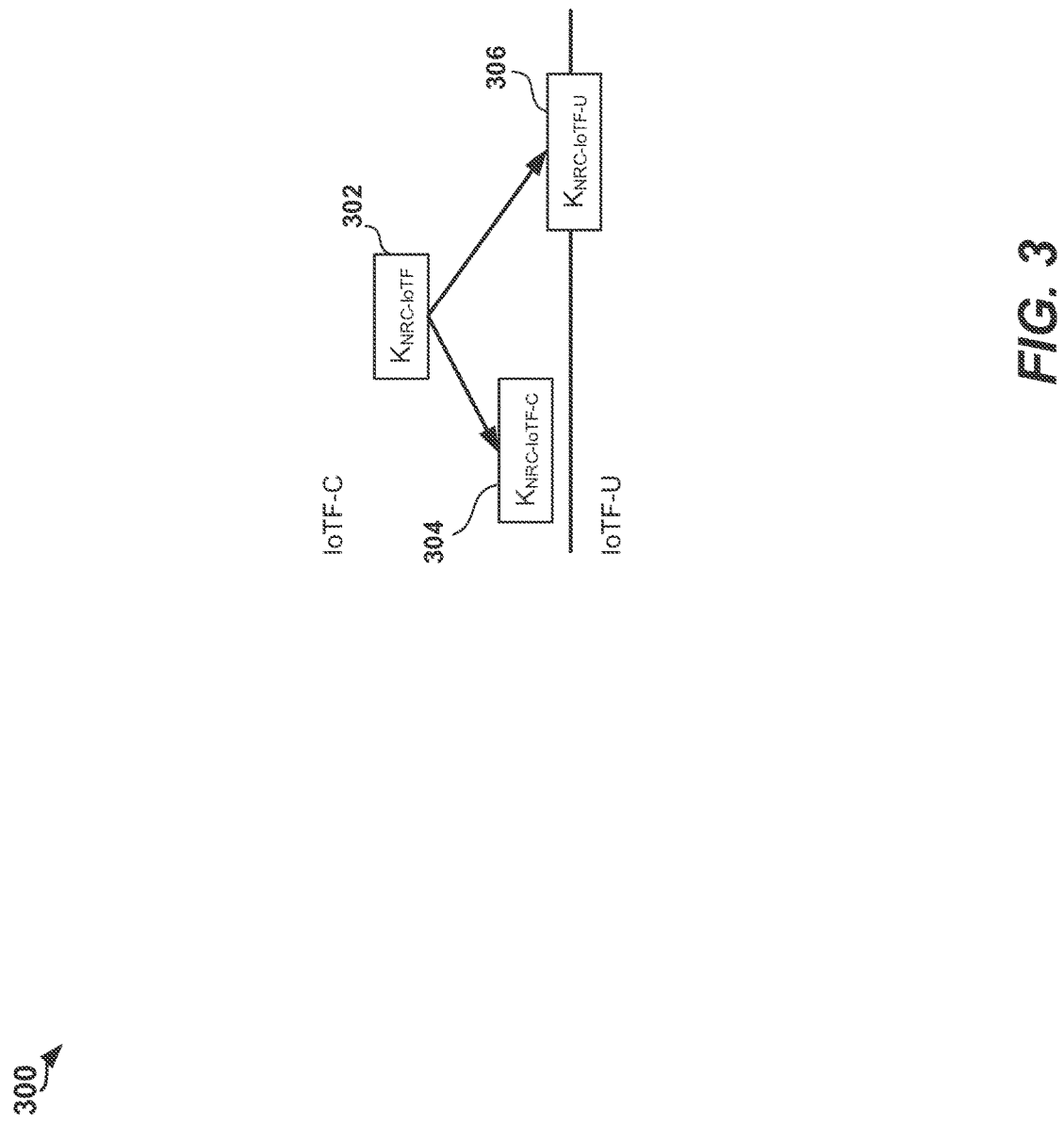
FIG. 3 is a diagram illustrating a key hierarchy for encrypting contexts in an IoT network architecture in accordance with various aspects of the present disclosure.

FIG. 3 is a diagram illustrating a key hierarchy 300 for encrypting contexts in an IoT network architecture (e.g., IoT network architecture 100) in accordance with various aspects of the disclosure. In an aspect of the present disclosure, with reference to FIG. 1, the IoTF-C 106 may randomly generate a network reachability context (NRC) encryption key ($K_{NRC\text{-}IoTF\text{-}C}$) 304 for the control plane based on a context key $K_{NRC\text{-}IoTF}$ 302. The IoTF-C 106 may further randomly generate a network reachability context (NRC) encryption key ($K_{NRC\text{-}IoTF\text{-}U}$) 306 for the user plane based on the context key $K_{NRC\text{-}IoTF}$ 302. For example, the key $K_{NRC\text{-}IoTF\text{-}C}$ 304 and the key $K_{NRC\text{-}IoTF\text{-}U}$ 306 may be generated for an application service or a P-GW (e.g., P-GW 124).

Exemplary Network States of a Client Device

In a wireless communication system (e.g. an LTE network), network states are defined for a client device for mobility management (e.g., Evolved Packet System Mobility Management (EMM)). Such network states enable efficient communication between a client device and other entities in the network. In an aspect of the present disclosure, a client device (e.g., client device 102 in FIG. 1) may be in a deregistered state or a registered state. For example, when the client device is in a deregistered state, the context for the client device may be stored in the HSS. The network holds no valid location or routing information for the client device, and the client device is not reachable. As another example, the client device may enter a registered state by a successful registration with the network. In an aspect of the present disclosure, the client device may perform such registration by performing an attach procedure with the network. In the registered state, the client device has at least one active PDN connection. The client device also has an EPS security context set up. It should be noted that the deregistered and registered states assume that the client device has credentials (e.g., there is a subscription available in the HSS) for the network.

In an aspect of the present disclosure, network state information (e.g., a context) for a client device may be used by one or more network entities (e.g., the P-GW 124) to reach the client device (e.g., the client device 102) in order to deliver downlink (DL) data traffic to the client device. Such network state information for a client device may be referred to as a network reachability context. In an aspect of the present disclosure, and as described in detail below, the network state information may include various types of information used by a network to communicate with the client device, such as a client device identifier, security information, and/or next hop (S5/S8) configuration information. For example, the network state information may be generated or determined by the network (e.g., the IoTF-C 106) when a connection is established between the client device and the network.

A wireless communication network (e.g., an LTE network) may further include network states defined for a client device for Evolved Packet System Connection Management (ECM). Accordingly, a client device (e.g., client device 102 in FIG. 1) in a registered state may be in one of two states (also referred to as sub-states of the registered state), such as an idle state or a connected state. In the idle state, no Non-Access-Stratum (NAS) signaling connection exists between the client device and the other network entities. In the idle state, the client device may perform cell selection/reselection and public land mobile network (PLMN) selection. There may be no context for the client device in the radio access network (RAN) (e.g., network access node) when the client device is in the idle state. Moreover, there may be no S1-MME and no S1-U connection for the client device in the idle state. In the connected state, the location of the client device is known in the MME with an accuracy of a serving access network identifier (e.g., eNB identifier (ID), base station ID, or network access point ID). Mobility of the client device is handled by a handover procedure. Moreover, a signaling connection exists between the client device and the MME. The signaling connection may be made up of two parts: a radio resource control (RRC) connection and an S1-MME connection.

Figure 4:
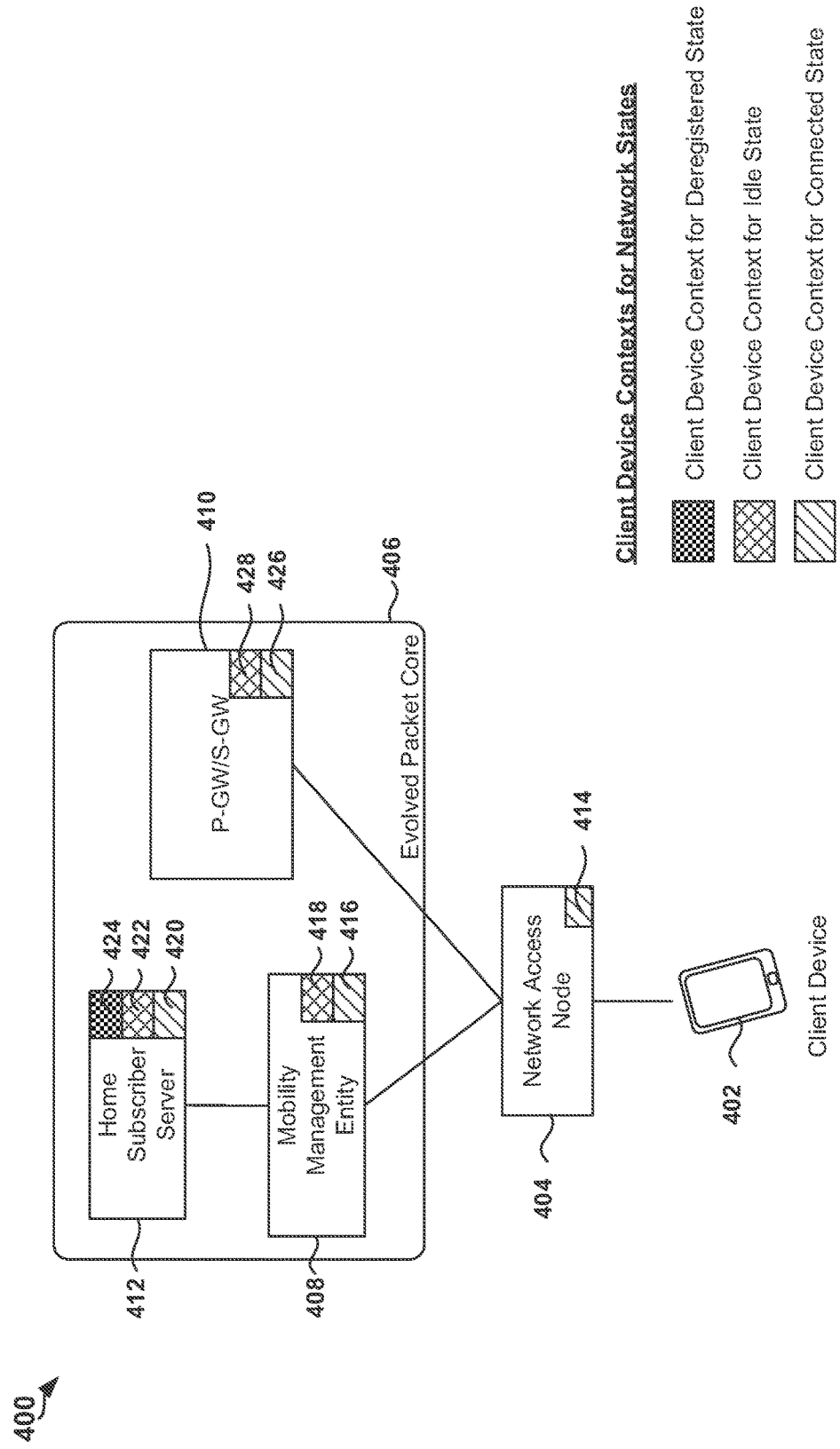
FIG. 4 is a diagram illustrating various contexts for a client device in a network.

FIG. 4 is a diagram illustrating example network states of a client device maintained at various entities in a network 400. As shown in FIG. 4, the network 400 includes a client device 402, a network access node 404, and an Evolved Packet Core (EPC) 406. As further shown in FIG. 4, the EPC 406 includes a home subscriber server (HSS) 412, a mobility management entity (MME) 408, and a Packet Data Network Gateway (P-GW)/Serving Gateway (S-GW) 410. In an aspect of the present disclosure, the network 400 may be a 4G network. In other aspects, the network 400 may be a 3G network, an LTE network, a 5G network, or other appropriate network.

For example, with reference to FIG. 4, the network access node 404 may maintain a context 414 (also referred to as network state information) for the client device 402 when the client device 402 is in a connected state. The MME 408 may maintain a context 416 for the client device 402 when the client device 402 is in a connected state, and a context 418 for the client device 402 when the client device 402 is in an idle state. The P-GW/S-GW 410 may maintain a context 426 for the client device 402 when the client device 402 is in a connected state, and a context 428 for the client device 402 when the client device 402 is in an idle state. The HISS 412 may maintain a context 420 for the client device 402 when the client device 402 is in a connected state, a context 422 for the client device 402 when the client device 402 is in an idle state, and a context 424 for the client device 402 when the client device 402 is in a deregistered state. In an aspect of the present disclosure, if the network 400 is implemented as a 3G network, the P-GW/S-GW 410 may not maintain a context for the client device 402 when the client device 402 is in the idle state.

Encrypted Network Reachability Context

A network reachability context for a client device may be encrypted to generate an encrypted network reachability context for downlink (DL) transmissions. In some aspects, and as described herein, one or more encrypted network reachability contexts may be generated. The encrypted network reachability context enables an IoTF (e.g., IoTF-C 106, IoTF-U 108) to remove a client device context when the client device becomes idle. For example, with reference to FIG. 1, the encrypted network reachability context may be provided to the IoT server 122 or to the P-GW 124 that desires to communicate with the client device 102. Therefore, in this example, the network 100 does not need to maintain network state information or may reduce the amount of network state information maintained for the client device 102. The IoT server 122 or the P-GW 124 may provide the encrypted network reachability context when it sends a downlink (DL) data packet to the client device 102 to allow one or more nodes or entities in the network 100 to reconstruct the network reachability context.

Encrypted network reachability context(s) may include one or more of the following features. In an aspect of the present disclosure, an encrypted network reachability context may provide a mobility feature by including an identifier for retrieving the network side network state information of the client device 102, a tracking area ID (TAI) list or equivalent to determine where to page the client device 102, and timing information (e.g., to determine when to page the client device 102). In an aspect of the present disclosure, an encrypted network reachability context may enable a context relocation procedure, such as a tracking area update (TAU) and optionally to obtain a new encrypted network reachability context and ID. In an aspect of the present disclosure, an encrypted network reachability context may include information extending beyond security and may indicate how security context is managed.

In an aspect of the present disclosure, the IoTF-C 106 provides information (e.g., a TAI list) to one or more entities in the service network 110 (e.g., IoT server 122 or P-GW 124). Such one or more entities in the service network 110 may then send the encrypted network reachability context to other entities in the IoT network architecture 100 to re-establish the context for the client device 102. The encrypted network reachability context(s) may be implemented for network initiated traffic. However, in some aspects involving client device initiated traffic or network initiated traffic, the network device 105 may maintain very limited to no network state information for the client device 102. In an aspect of the present disclosure, the IoTF-C 106 may provide the location of the client device 102 in terms of at least a TAI list, which may be a portion of an encrypted network reachability context.

Initial Attach Procedure

Figure 5:
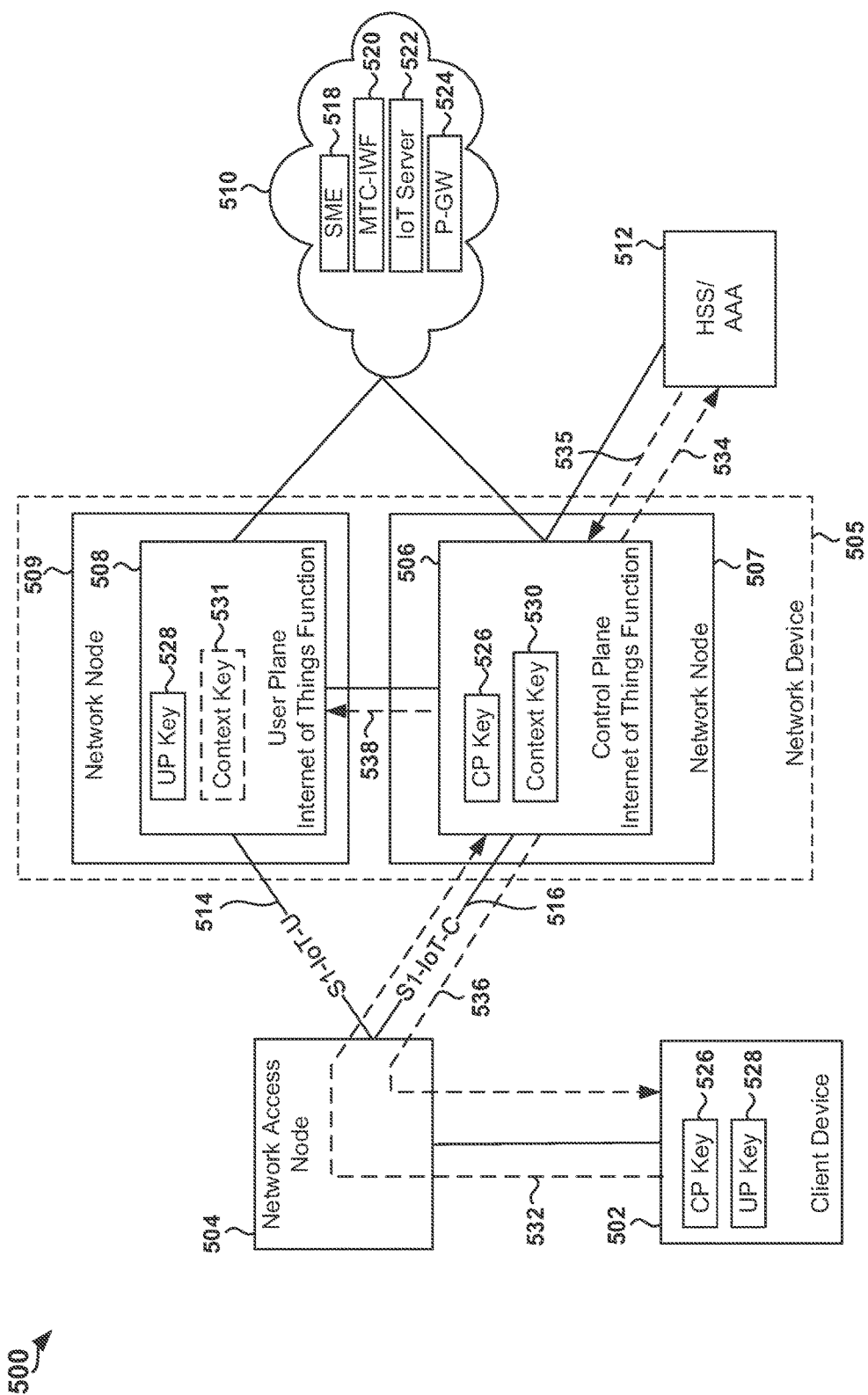
FIG. 5 is a block diagram illustrating an initial attach procedure by a client device in an IoT network architecture in accordance with various aspects of the present disclosure.

FIG. 5 is a block diagram illustrating an initial attach procedure by a client device in an IoT network architecture 500 in accordance with various aspects of the present disclosure. In some aspects, an attach procedure as described herein is also referred to as a network attachment procedure or a registration procedure. As shown in FIG. 5, the IoT network architecture 500 includes a client device 502 (also referred to as an IoT device), a network access node 504 (e.g., eNB, base station, network access point), a network device 505, a service network 510, and a home subscriber server (HSS)/authentication, authorization, and accounting (AAA) server 512. In one aspect, the network device 505 may include one or more processing circuits and/or other appropriate hardware configured to implement an IoTF. For example, an IoTF may include a control plane IoT Function (IoTF-C) 506 and a user plane IoT Function (IoTF-U) 508. In such aspect, the IoTF-C 506 may be implemented at a network node 507 and the IoTF-U 508 may be implemented at a network node 509. In one aspect, the IoTF-C 506 and the IoTF-U 508 may be implemented at the same hardware platform, such that the IoTF-C 506 and the IoTF-U 508 each represent an independent node in the architecture 500. In such aspect, for example, the IoTF-C 506 may be implemented at a first virtual machine (e.g., a first operating system) provided on a hardware platform (e.g., the network device 505) and the IoTF-U 508 may be implemented at a second virtual machine (e.g., a second operating system) provided on the hardware platform.

As shown in FIG. 5, the IoTF-C 506 is in communication with the network access node 504 via a first S1 connection 516, and the IoTF-U 508 is in communication with the network access node 504 via a second S1 connection 514. In an aspect of the present disclosure, the service network 510 may include a number of entities, functions, gateways, and/or servers configured to provide various types of services. For example, the service network 510 may include a short message entity (SME) 518, a machine type communication interworking function (MTC-IWF) 520, an IoT server 522, and/or a packet data network (PDN) gateway (P-GW) 524. It should be understood that the service network 510 disclosed in FIG. 5 serves as one example and that in other aspects, the service network 510 may include different types of entities, functions, and/or servers than those disclosed in FIG. 5.

As shown in FIG. 5, the client device 502 may transmit an attach request 532 to the network, which may be received by the network access node 504. In an aspect of the present disclosure, the attach request 532 may indicate that the client device 502 is to attach as an IoT device (e.g., or indicate a request to perform small (reduced) data transfer, or indicate that the client device is operating in a low power consumption mode) and may indicate the home domain (e.g., HPLMN ID or fully qualified domain name (FQDN)) from which the authentication information should be retrieved. The network access node 504 may forward the request to the IoTF-C 506 to which it belongs.

The IoTF-C 506 may determine the address of the HSS/AAA server 512 from the home domain information provided by the client device 502 and may transmit a request 534 for authentication information for the client device 502 to the HSS/AAA server 512. The IoTF-C 506 may receive the authentication information 535 from the HSS/AAA server 512.

The IoTF-C 506 may perform mutual authentication (e.g., an AKA procedure) with the client device 502. During the AKA procedure, the IoTF-C 506 may receive AVs from the HSS/AAA server 512 through the authentication information 535. For example, the AVs may contain a key (shown in FIG. 2 as the key $K_{ASME}$ 206) from an Access Security Management Entity (ASME). For example, the IoTF-C 506 may provide the key $K_{ASME}$ 206 to the client device 502 through the signal 536. When the AKA procedure is completed, the IoTF-C 506 and the client device 502 may derive CP key(s) 526, such as the key $K_{CP}$ 208, the key $K_{IoT-CPenc}$ 210 and/or the key $K_{IoT-UPenc}$ 212, and may derive UP key(s) 528, such as the key $K_{UP}$ 214, the key $K_{IoT-UPenc}$ 216 and/or the key $K_{IoT-UPint}$ 218, from the key $K_{ASME}$ 206 or from the key $K_{IoT}$ 202. In some aspects, the IoTF-C 506 may transfer the key $K_{UP}$ 214 and the user plane encryption and integrity protection keys, such as the key $K_{IoT-UPenc}$ 216 and the key $K_{IoT-UPint}$ 218, to the IoTF-U 508 via the message 538.

In an aspect of the present disclosure, the IoTF-C 506 may generate one or more encrypted network reachability contexts for transmitting downlink (DL) traffic to the client device 502 by using the context key 530 to encrypt a network reachability context. The IoTF-C 506 may then transmit the one or more encrypted network reachability contexts to the IoT server 522 or P-GW 524. Example approaches for generating one or more encrypted network reachability contexts are discussed in detail herein. The IoTF-C 506 may send the key $K_{UP}$ 214, user plane encryption and integrity protection keys (e.g., the key $K_{IoT-UPenc}$ 216 and the key $K_{IoT-UPint}$ 218), and a network reachability context (NRC) encryption key for the user plane (e.g., the key $K_{NRC-IoTF-U}$ 306), to the IoTF-U 508 via the message 538. Accordingly, in some aspects, the IoTF-U 508 may include context key(s) 531 (e.g., the key $K_{NRC-IoTF-U}$ 306) provided by the IoTF-C 506.

Figure 6:
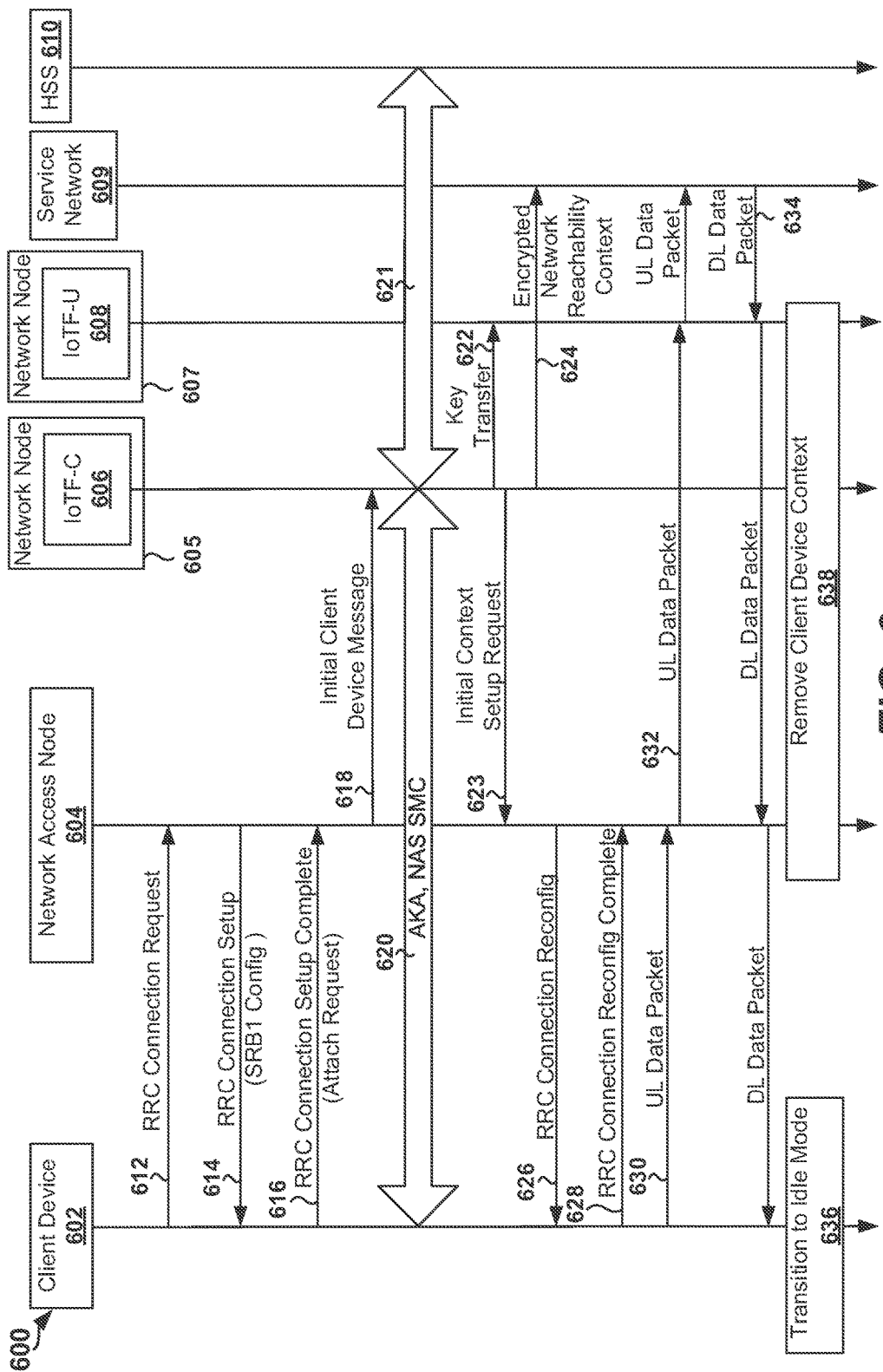
FIG. 6 is a signal flow diagram of an attach procedure by a client device in an IoT network architecture in accordance with various aspects of the present disclosure.

FIG. 6 is a signal flow diagram 600 of an exemplary attach procedure by a client device in an IoT network architecture (e.g., IoT network architecture 100, 500) in accordance with various aspects of the present disclosure. As shown in FIG. 6, the signal flow diagram 600 includes a client device 602 (also referred to as an IoT device), a network access node 604 (e.g., eNB, base station, or network access point), an IoTF-C 606 implemented at a network node 605, an IoTF-U 608 implemented at a network node 607, a service network 609, and a home subscriber server (HSS) 610. As shown in FIG. 6, the client device 602 may transmit a request 612 (e.g., an RRC connection request) to the network access node 604 in order to communicate with the network. The client device 602 may receive an RRC connection setup message 614, which may include a signaling radio bearer (SRB) configuration (e.g., an SRB1 configuration for transmitting NAS messages over a dedicated control channel (DCCH)). The client device 602 may transmit an RRC connection setup complete message 616 to the network access node 604. For example, the RRC connection setup complete message 616 may indicate an attach request. The network access node 604 may transmit an initial client device message 618 to the IoTF-C 606. The IoTF-C 606 may determine the address of the HSS server 610 from the home domain information provided by the client device 602, and may communicate 621 with the HSS 610. For example, the IoTF-C 606 may transmit a request for authentication information for the client device 602 to the HSS server 610 and may receive the authentication information from the HSS server 610.

As shown in FIG. 6, the IoTF-C 606 may perform mutual authentication, such as an AKA procedure 620, with the client device 602. When the AKA procedure 620 is completed, the IoTF-C 606 and the client device 602 may derive control plane keys, such as the key $K_{IoT-CPenc}$ 210 and/or key $K_{IoT-CPint}$ 212, from the key $K_{ASME}$ 206 or from the key $K_{IoT}$ 202. The IoTF-C 606 and the client device 602 may further derive user plane keys, such as the key $K_{IoT-UPenc}$ 216 and/or the key $K_{IoT-UPint}$ 218, from the key $K_{ASME}$ 206 or from the key $K_{IoT}$ 202. In an aspect of the present disclosure, the IoTF-C 606 may generate a control plane (CP) encrypted network reachability context by encrypting a control plane (CP) context for the client device 602 using the key $K_{NRC-IoTF-C}$ 304 and/or may generate a user plane (UP) encrypted network reachability context for the client device 602 by encrypting a user plane (UP) context for the client device 602 using the key $K_{NRC-IoTF-U}$ 306. The IoTF-C 606 may transfer one or more keys (e.g., user plane keys, such as the key $K_{IoT-UPenc}$ 216, the key $K_{IoT-UPint}$ in 218, and/or the key $K_{NRC-IoTF-U}$ 306) to the IoTF-U 608 via the message 622. In an aspect of the present disclosure, an encryption key (e.g., the key $K_{NRC-IoTF-U}$ 306) is only known to an IoTF (e.g., network reachability context may be retrieved exclusively by the IoTF-C 606 and/or IoTF-U 608). In an aspect of the present disclosure, an IoTF (e.g., the IoTF-C 606) may allocate encrypted network reachability contexts to an IoT server or a P-GW in the service network 609. The IoTF-C 606 may transmit an initial context set up request message 623 to the client device 602. In an aspect of the present disclosure, the IoTF-C 606 may transmit a message 624 including an encrypted network reachability context to a network entity. Therefore, in one example, the IoTF-C 606 may transmit the message 624 including an encrypted network reachability context (e.g., a CP encrypted network reachability context and/or a UP encrypted network reachability context) to the service network 609. Therefore, the encrypted network reachability context may include a client device context (e.g., network state information) associated with the IoTF-C 606 and/or IoTF-U 608 implemented at a network device, where such client device context may be used for downlink (DL) data transmission from the network (e.g., from an entity in the service network 609) to the client device 602.

The network access node 604 may transmit an RRC connection reconfiguration message 626 to the client device 602. The client device 602 may transmit an RRC connection reconfiguration complete message 628 to the network access node 604. The client device 602 may transmit a first message 630 including a data packet (e.g., a UL data packet) to the network access node 604. The network access node 604 may forward the data packet to the service network 609 via the second message 632. The service network 609 may transmit a third message 634 including a data packet (e.g., a DL data packet) to the client device 602. For example, and as shown in FIG. 6, the third message 634 may be forwarded to the client device 602 by the IoTF-U 608 and the network access node 604. The client device 602 may then transition 636 to the idle mode. The network access node 604, the IoTF-C 606, and the IoTF-U 608 may proceed to remove 638 the client device context.

IoT UL Data Transfer

Figure 7:
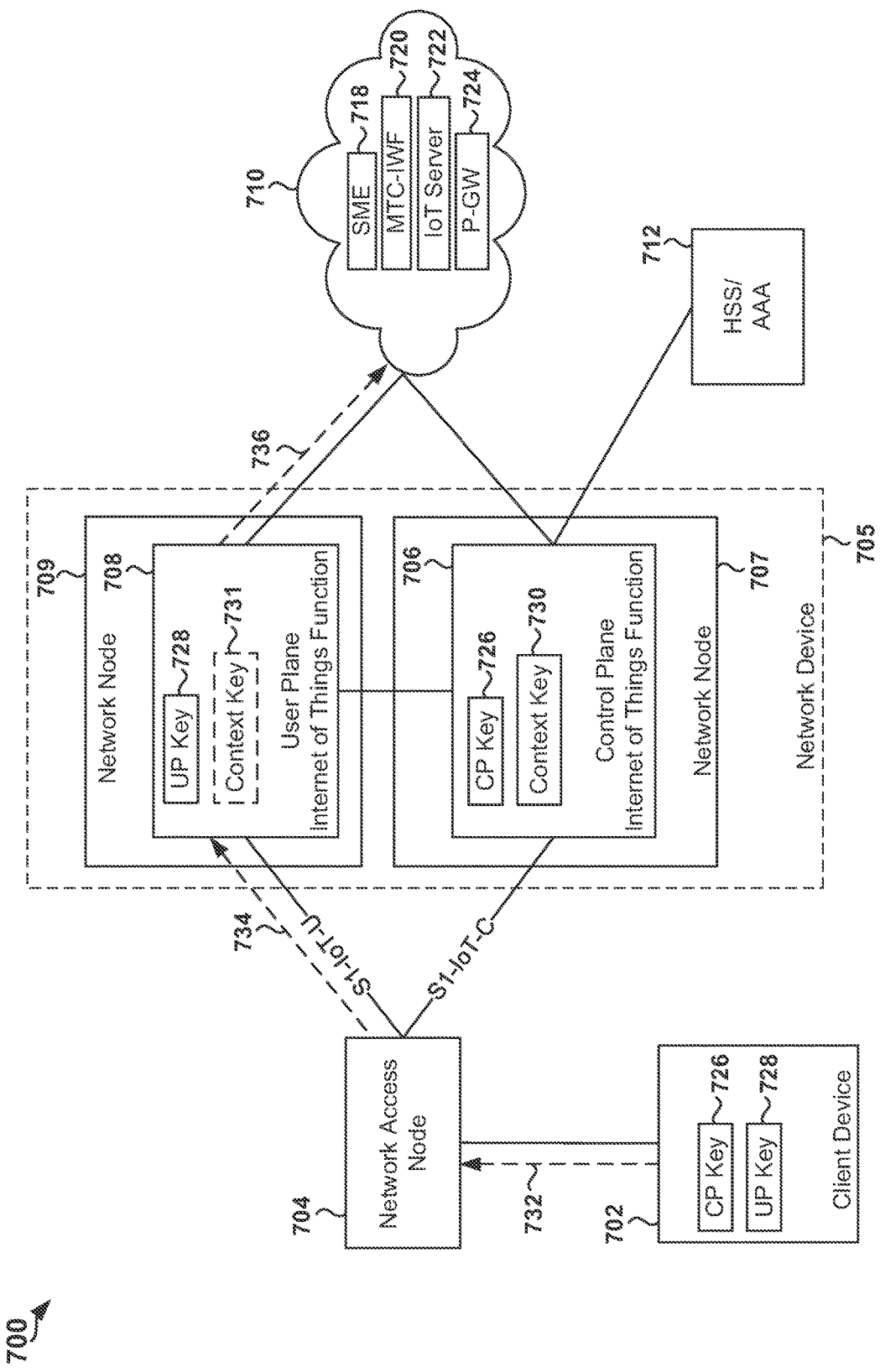
FIG. 7 is a block diagram illustrating a data transmission initiated by a client device in an IoT network architecture in accordance with various aspects of the present disclosure.

FIG. 7 is a block diagram illustrating a data transmission initiated by a client device (e.g., the client device 702) in an IoT network architecture 700 in accordance with various aspects of the present disclosure. As shown in FIG. 7, the IoT network architecture 700 includes a client device 702 (also referred to as an IoT device), a network access node 704 (e.g., eNB, base station, network access point), a network device 705, a service network 710, and a home subscriber server (HSS)/authentication, authorization, and accounting (AAA) server 712. In one aspect, the network device 705 may include one or more processing circuits and/or other appropriate hardware configured to implement an IoTF. For example, an IoTF may include a control plane IoT Function (IoTF-C) 706 and a user plane IoT Function (IoTF-U) 708. In such aspect, the IoTF-C 706 may be implemented at a network node 707 and the IoTF-U 708 may be implemented at a network node 709. In one aspect, the IoTF-C 706 and the IoTF-U 708 may be implemented at the same hardware platform, such that the IoTF-C 706 and the IoTF-U 708 each represent an independent node in the architecture 700. In such aspect, for example, the IoTF-C 706 may be implemented at a first virtual machine (e.g., a first operating system) provided on a hardware platform (e.g., the network device 705) and the IoTF-U 708 may be implemented at a second virtual machine (e.g., a second operating system) provided on the hardware platform.

In an aspect of the present disclosure, the service network 710 may include a number of entities, functions, gateways, and/or servers configured to provide various types of services. For example, the service network 710 may include a short message entity (SME) 718, a machine type communication interworking function (MTC-IWF) 720, an IoT server 722, and/or a packet data network (PDN) gateway (P-GW) 724. It should be understood that the service network 710 disclosed in FIG. 7 serves as one example and that in other aspects, the service network 710 may include different types of entities, functions, and/or servers than those disclosed in FIG. 7.

In the aspect of FIG. 7, the IoTF-C 706 may have generated an encrypted network reachability context for the control plane and an encrypted network reachability context for the user plane. In such aspect, the context key(s) 730 may include a first context key (e.g., the key $K_{NRC\text{-}IoTF\text{-}C}$ 304) for generating an encrypted network reachability context for the control plane and a second context key (e.g., the key $K_{NRC\text{-}IoTF\text{-}U}$ 306) for generating an encrypted network reachability context for the user plane. For example, the IoTF-C 706 may have transmitted the second context key (e.g., the key $K_{NRC\text{-}IoTF\text{-}U}$ 306) for generating the encrypted network reachability context for the user plane to the IoTF-U 708. Accordingly, in such example, the IoTF-U 708 may include the context key(s) 731 provided by the IoTF-C 706 as shown in FIG. 7. In the aspect of FIG. 7, the client device 702 has derived CP key(s) 726 and UP key(s) 728 in a manner previously discussed.

As shown in FIG. 7, the client device 702 may transmit a first message 732 including a data packet to the network access node 704. The network access node 704 may determine the address of the IoTF-U 708 from the IoTF-U identifier in the data packet and may forward the data packet to the IoTF-U 708 via a second message 734. The IoTF-U 708 may then decrypt and verify the data packet with the encryption and integrity keys (e.g., UP key(s) 728). In an aspect of the present disclosure, the IoTF-U 708 may generate an encrypted network reachability context based on the context (e.g., network state information) of the client device 702. The IoTF-U 708 may forward the data packet via a third message 736 to the next hop (e.g., the IoT server 722 or the P-GW 724) with the encrypted network reachability context.

Client Device Terminated Data Transfer

Figure 8:
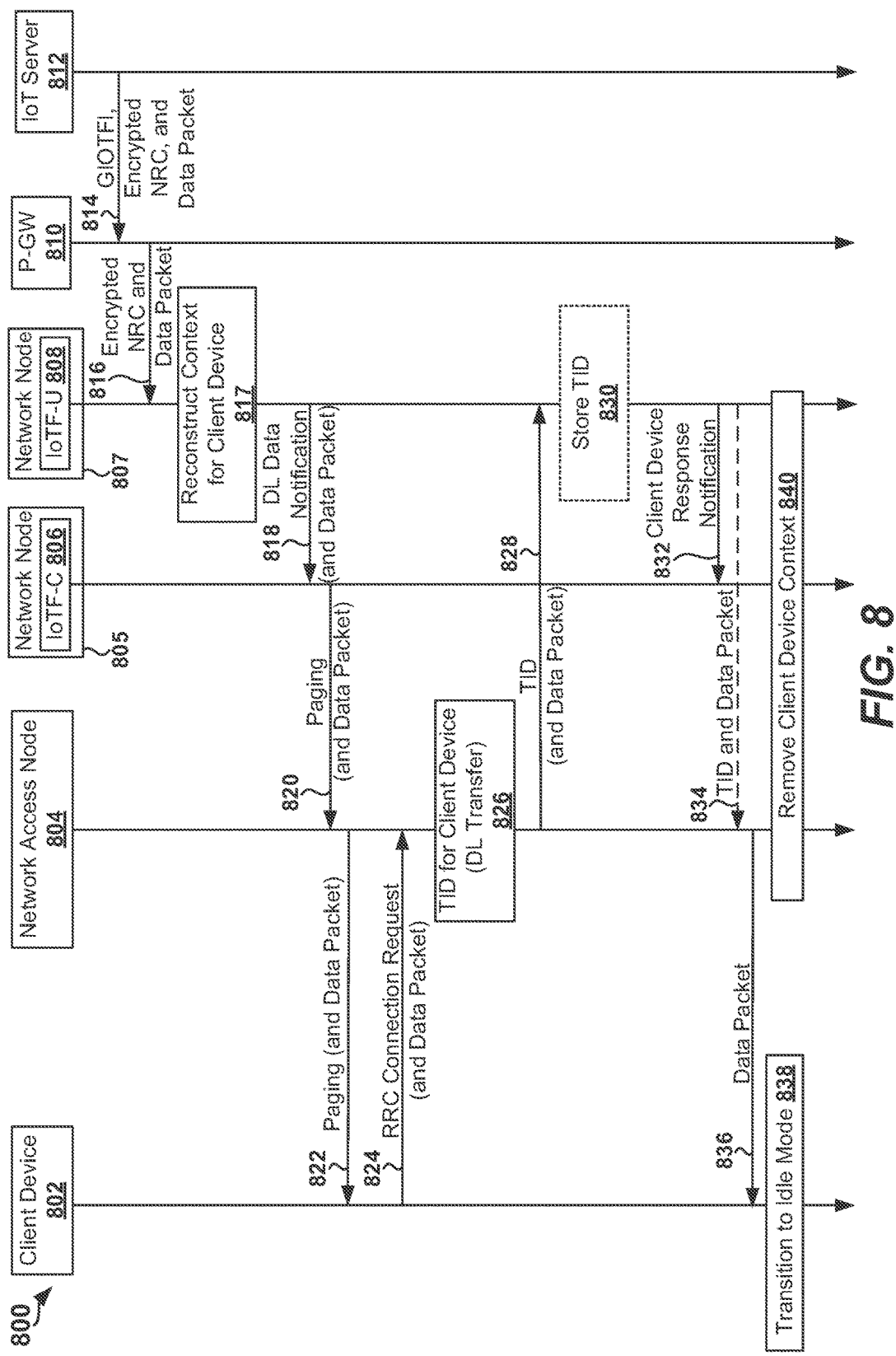
FIG. 8 is a signal flow diagram of a client device terminated data transmission in an IoT network architecture in accordance with various aspects of the present disclosure.

FIG. 8 is a signal flow diagram 800 of an exemplary client device terminated data transmission in an IoT network architecture (e.g., IoT network architecture 100) in accordance with various aspects of the present disclosure. As shown in FIG. 8, the signal flow diagram 800 includes a client device 802 (also referred to as an IoT device), a network access node 804 (e.g., eNB, base station, network access point), an IoTF-C 806 implemented at a network node 805 and an IoTF-U 808 implemented at a network node 807, a P-GW 810, and an IoT server 812.

The IoT server 812 may transmit a downlink (DL) message 814 including a DL data packet, a global IoTF identifier (GIOTFI), and an encrypted network reachability context (NRC) to the P-GW 810. The P-GW 810 may locate the IoTF-U 808 based on the GIOTFI and may forward the DL data packet to the IoTF-U 808 in a forward message 816. In an aspect of the present disclosure, the IoTF-U 808 may verify the encrypted network reachability context.

As shown in FIG. 8, the IoTF-U 808 may reconstruct 817 the context (e.g., including the security context) for the client device 802. For example, the IoTF-U 808 may reconstruct the context for the client device 802 by decrypting the encrypted network reachability context using a context key (e.g., the key $K_{NRC\text{-}IoTF\text{-}U}$ 306) stored at the IoTF-U 808. The IoTF-U 808 may transmit a DL data notification message 818 to IoTF-C 806. In an aspect of the present disclosure, the DL data notification message 818 may include the DL data packet if the DL data packet is small enough to be carried in a paging message. In such aspect, the IoTF-U 808 may protect the data packet based on an encryption algorithm, encryption key, integrity protection algorithm, and/or integrity protection key of the security context for the client device 802.

The IoTF-C 806 may transmit a paging message 820 to one or more network access nodes (e.g., network access node 804). The network access node 804 may then page the client device 802 by transmitting the page message 822. The client device 802 may transmit an RRC connection request message 824 including a UL data packet to the IoTF-U 808. In an aspect of the present disclosure, the UL data packet transmitted by the client device 802 may be empty. The network access node 804 determines 826 the temporary identifier (TID) and forwards the UL data packet to the IoTF-U 808 in a forward message 828. The IoTF-U 808 may store 830 the TID and ID of the network access node 804.

The IoTF-U 808 may transmit a client device response notification message 832 to the IoTF-C 806. In an aspect of the present disclosure, the IoTF-U 808 may transmit, to the client device 802, a message 834 including the DL data packet and the TID for the client device if the IoTF-U 808 was not able to include the DL data packet in the DL data notification message 818. The network access node 804 may forward the DL data packet to the client device 802 in a forward message 836. The client device 802 may then transition 838 to the idle mode, and the network access node 804 and IoTF-C 806 may remove 840 the client device context.

In one aspect of the present disclosure, the P-GW 810 may store an encrypted network reachability context for the client device 802 and may associate the encrypted network reachability context with the client device 802. In such aspect, when the P-GW 810 subsequently receives a packet (e.g., a downlink (DL) data packet from the IoT server 812) to be delivered to the client device 802, the P-GW 810 may determine the encrypted network reachability context corresponding to the client device 802 and may transmit the encrypted network reachability context in a message (e.g., the forward message 816) that includes the packet. It can be appreciated that in this aspect, the IoT server 812 may not need to transmit an encrypted network reachability context together with a packet for the client device 802. The IoTF-U 808 may receive the encrypted network reachability context and may reconstruct 817 the context for the client device 802.

Resource Establishment and Release

Figure 9:
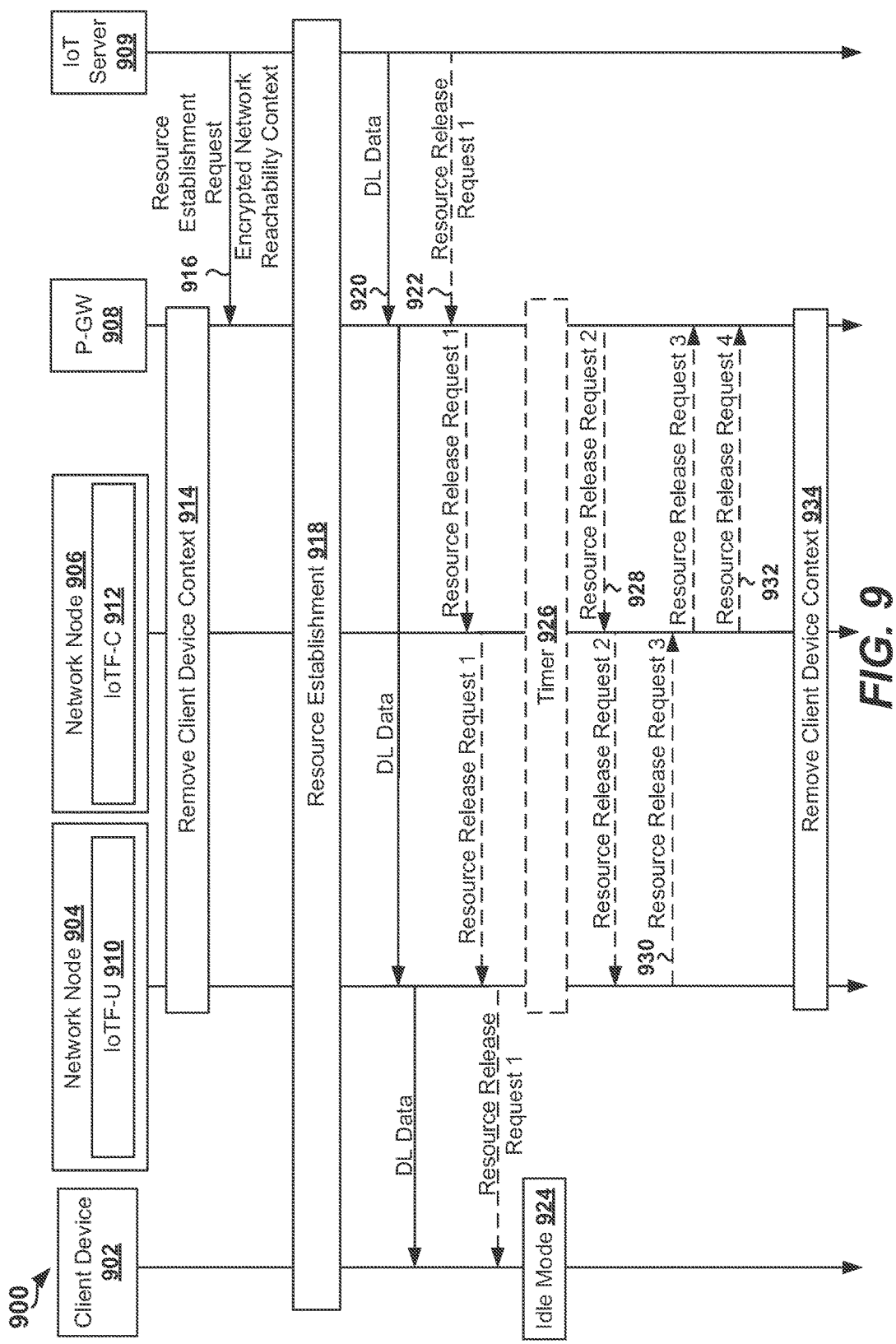
FIG. 9 is a signal flow diagram of an exemplary resource establishment and release in an IoT network architecture in accordance with various aspects of the present disclosure.

FIG. 9 is a signal flow diagram 900 of an exemplary resource establishment and release in an IoT network architecture (e.g., IoT network architecture 100) in accordance with various aspects of the present disclosure. As shown in FIG. 9, the signal flow diagram 900 includes a client device 902 (also referred to as an IoT device), an IoTF-U 910 implemented at a network node 904, an IoTF-C 912 implemented at a network node 906, a P-GW 908, and an IoT server 909.

As shown in FIG. 9, the IoTF-U 910, the IoTF-C 912, and/or the P-GW 908 may remove 914 a context for the client device 902. In one aspect, the IoTF-U 910 and/or the IoTF-C 912 may remove the context for the client device 902 after the IoTF-C 912 has provided an encrypted network reachability context to the P-GW 908 and/or the IoT Server 909. As shown in FIG. 9, the IoT Server 909 may transmit a resource establishment request message 916 to the P-GW 908. For example, the IoT Server 909 may transmit the resource establishment request message 916 when the IoT Server 909 is to transmit infrequent burst data transmissions to the client device 902. For example, a burst data transmission may include a sequence of Protocol Data Units (PDUs), such as IP packets. In an aspect, the resource establishment request message 916 may include an encrypted network reachability context (e.g., an encrypted network reachability context for the control plane).

During the resource establishment operation 918, the IoTF-C 912 may verify the encrypted network reachability context from the IoT server 909 and upon successful verification, the IoTF-C 912 may decrypt the encrypted network reachability context. The IoTF-C 912 may then reconstruct the context for the client device 902. In an aspect, the IoTF-U 910 and the P-GW 908 may also reconstruct the context for the client device 902. In an aspect, the IoTF-C 912 may obtain a network address (e.g., an IP address) for the client device 902 and may provide the network address to the client device 902 and the IoT server 909 during the resource establishment operation 918. As shown in FIG. 9, the IoT server 909 may transmit downlink (DL) data 920 to the client device 902 via the P-GW 908 and the IoTF-U 910. In an aspect, the IoT server 909 may transmit the DL data 920 in one or more PDUs that include the network address of the client device 902.

In one aspect, the IoT server 909 may determine that there are no further data transmissions to be made to the client device 902. In such aspect, the IoT server 909 may optionally transmit a resource release request message 1 922 to the P-GW 908. In some aspects, and as shown in FIG. 9, the resource release request message 1 922 may be forwarded to the IoTF-C 912, the IoTF-U 910, and the client device 902. The client device 902 may then enter the idle mode 924.

In an aspect, the resource release request message 1 922 enables the P-GW 908 to release one or more resources for the client device 902. For example, the one or more resources may include the network address assigned to the client device 902 (e.g., to allow reallocation of that network address), a bearer for the client device 902, and/or other resources for the client device 902. The IoTF-U 910, the IoTF-C 912, and the P-GW 908 may then remove 934 the context for the client device 902. In another aspect, the IoTF-C 912, the IoTF-U 910, and/or the P-GW 908 may initiate a timer 926 after the DL data 920 is received at the IoTF-U 910. If the timer 926 expires prior to receiving any new DL data (e.g., additional DL data subsequent to the DL data 920) from the IoT server 909 and/or prior to receiving any uplink (UL) data from the client device 902, the IoTF-C 912, the IoTF-U 910, and/or the P-GW 908 may determine that the client device 902 is in the idle mode 924.

In one scenario, upon expiration of the timer 926, the P-GW 908 may optionally transmit a resource release request message 2 928 to the IoTF-C 912, which may be forwarded to the IoTF-U 910 as shown in FIG. 9. In an aspect, the resource release request message 2 928 enables the IoTF-C 912 and/or the IoTF-U 910 to release one or more resources for the client device 902. For example, the one or more resources may include the network address assigned to the client device 902 (e.g., to allow reallocation of that network address), a bearer for the client device 902, and/or other resources for the client device 902. The P-GW 908, the IoTF-C 912, and the IoTF-U 910 may then remove 934 the context for the client device 902.

In another scenario, upon expiration of the timer 926, the IoTF-U 910 may optionally transmit a resource release request message 3 930 to the P-GW 908 via the IoTF-C 912. In an aspect, the resource release request message 3 930 enables the IoTF-C 912 and/or the P-GW 908 to release one or more resources for the client device 902. For example, the one or more resources may include the network address assigned to the client device 902 (e.g., to allow reallocation of that network address), a bearer for the client device 902, and/or other resources for the client device 902. The P-GW 908, the IoTF-C 912, and the IoTF-U 910 may then remove 934 the context for the client device 902.

In yet another scenario, upon expiration of the timer 926, the IoTF-C 912 may optionally transmit a resource release request message 4 932 to the P-GW 908. In an aspect, the resource release request message 4 932 enables the P-GW 908 to release one or more resources for the client device 902. For example, the one or more resources may include the network address assigned to the client device 902 (e.g., to allow reallocation of that network address), a bearer for the client device 902, and/or other resources for the client device 902. The P-GW 908, the IoTF-C 912, and the IoTF-U 910 may then remove 934 the context for the client device 902. In one aspect, the timer 926 may be reset by the IoTF-C 912, the IoTF-U 910, and/or the P-GW 908 when a new DL data transmission (e.g., additional DL data subsequent to the DL data 920) is received at the IoTF-U 910 from the IoT server 909 prior to expiration of the timer 926.

Figure 10:
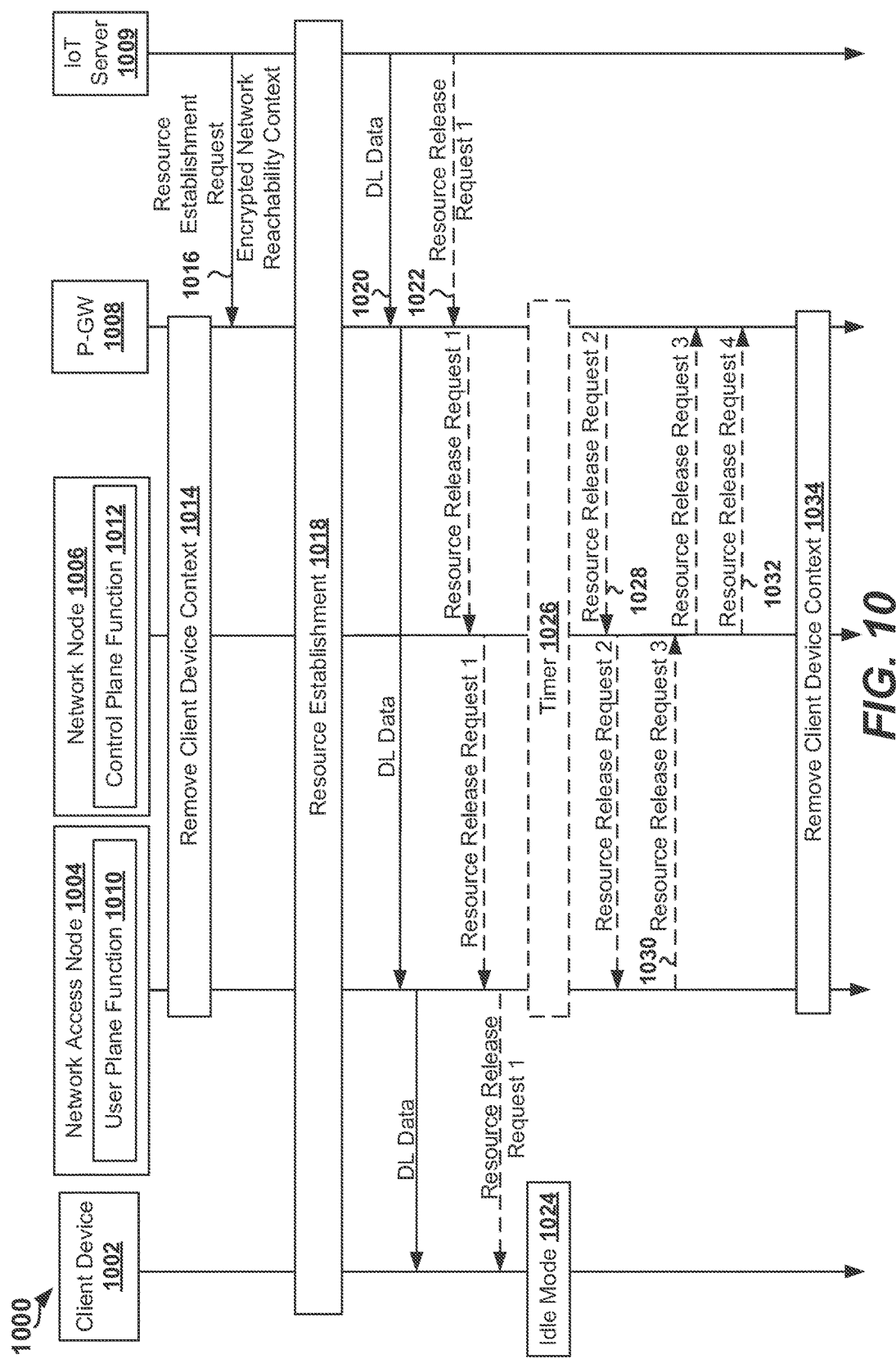
FIG. 10 is a signal flow diagram of an exemplary resource establishment and release in an IoT network architecture in accordance with various aspects of the present disclosure.

FIG. 10 is a signal flow diagram 1000 of an exemplary resource establishment and release in an IoT network architecture in accordance with various aspects of the present disclosure. As shown in FIG. 10, the signal flow diagram 1000 includes a client device 1002 (also referred to as an IoT device), a user plane function 1010 implemented at a network access node 1004, a control plane function 1012 implemented at a network node 1006, a P-GW 1008, and an IoT server 1009. As shown in FIG. 10, the user plane function 1010, the control plane function 1012, and/or the P-GW 1008 may remove 1014 a context for the client device 1002. In one aspect, the user plane function 1010 and/or the control plane function 1012 may remove the context for the client device 1002 after the control plane function 1012 has provided an encrypted network reachability context to the P-GW 1008 and/or the IoT Server 1009. As shown in FIG. 10, the IoT Server 1009 may transmit a resource establishment request message 1016 to the P-GW 1008. For example, the IoT Server 1009 may transmit the resource establishment request message 1016 when the IoT Server 1009 is to transmit infrequent burst data transmissions to the client device 1002. For example, a burst data transmission may include a sequence of Protocol Data Units (PDUs), such as IP packets. In an aspect, the resource establishment request message 1016 may include one or more encrypted network reachability contexts (e.g., an encrypted network reachability context for the control plane).

During the resource establishment operation 1018, the control plane function 1012 may verify the encrypted network reachability context from the IoT server 1009 and upon successful verification, the control plane function 1012 may decrypt the encrypted network reachability context. The control plane function 1012 may then reconstruct the context for the client device 1002. In an aspect, the user plane function 1010 and the P-GW 1008 may also reconstruct the context for the client device 1002. In an aspect, the control plane function 1012 may obtain a network address (e.g., an IP address) for the client device 1002 and may provide the network address to the client device 1002 and the IoT server 1009 during the resource establishment operation 1018. As shown in FIG. 10, the IoT server 1009 may transmit downlink (DL) data 1020 to the client device 1002 via the P-GW 1008 and the user plane function 1010. In an aspect, the IoT server 1009 may transmit the DL data 1020 in one or more PDUs that include the network address of the client device 1002.

In one aspect, the IoT server 1009 may determine that there are no further data transmissions to be made to the client device 1002. In such aspect, the IoT server 1009 may optionally transmit a resource release request message 1 1022 to the P-GW 1008. In some aspects, and as shown in FIG. 10, the resource release request message 1 1022 may be forwarded to the control plane function 1012, the user plane function 1010, and the client device 1002. The client device 1002 may then enter the idle mode 1024. In an aspect, the resource release request message 1 1022 enables a network entity (e.g., the P-GW 1008) and/or the client device 1002 to release one or more resources for the client device 1002. For example, the one or more resources may include the network address assigned to the client device 1002 (e.g., to allow reallocation of that network address), a bearer for the client device 1002, and/or other resources for the client device 1002.

The user plane function 1010, the control plane function 1012, and the P-GW 1008 may then remove 1034 the context for the client device 1002. In another aspect, the user plane function 1010, the control plane function 1012, and/or the P-GW 1008 may initiate a timer 1026 after the DL data 1020 is received at the user plane function 1010. If the timer 1026 expires prior to receiving any new DL data (e.g., additional DL data subsequent to the DL data 1020) from the IoT server 1009 and/or prior to receiving any uplink (UL) data from the client device 1002, the user plane function 1010, the control plane function 1012, and/or the P-GW 1008 may determine that the client device 1002 is in the idle mode 1024.

In one scenario, upon expiration of the timer 1026, the P-GW 1008 may optionally transmit a resource release request message 2 1028 to the control plane function 1012, which may be forwarded to the user plane function 1010 as shown in FIG. 10. In an aspect, the resource release request message 2 1028 enables the control plane function 1012 and/or the user plane function 1010 to release one or more resources for the client device 1002. For example, the one or more resources may include the network address assigned to the client device 1002 (e.g., to allow reallocation of that network address), a bearer for the client device 1002, and/or other resources for the client device 1002. The P-GW 1008, the user plane function 1010, and the control plane function 1012 may then remove 1034 the context for the client device 1002.

In another scenario, upon expiration of the timer 1026, the user plane function 1010 may optionally transmit a resource release request message 3 1030 to the P-GW 1008 via the control plane function 1012. In an aspect, the resource release request message 3 1030 enables the control plane function 1012 and/or the P-GW 1008 to release one or more resources for the client device 1002. For example, the one or more resources may include the network address assigned to the client device 1002 (e.g., to allow reallocation of that network address), a bearer for the client device 1002, and/or other resources for the client device 1002. The P-GW 1008, the user plane function 1010, and the control plane function 1012 may then remove 1034 the context for the client device 1002.

In yet another scenario, upon expiration of the timer 1026, the control plane function 1012 may optionally transmit a resource release request message 4 1032 to the P-GW 1008. In an aspect, the resource release request message 4 1032 enables the P-GW 1008 to release one or more resources for the client device 1002. For example, the one or more resources may include the network address assigned to the client device 1002 (e.g., to allow reallocation of that network address), a bearer for the client device 1002, and/or other resources for the client device 1002. The P-GW 1008, the user plane function 1010, and the control plane function 1012 may then remove 1034 the context for the client device 1002. In one aspect, the timer 1026 may be reset by the control plane function 1012, the user plane function 1010, and/or the P-GW 1008 when a new DL data transmission (e.g., additional DL data subsequent to the DL data 1020) is received at the user plane function 1010 from the IoT server 1009 prior to expiration of the timer 1026.

Control Plane Protocol Stack

Figure 11:
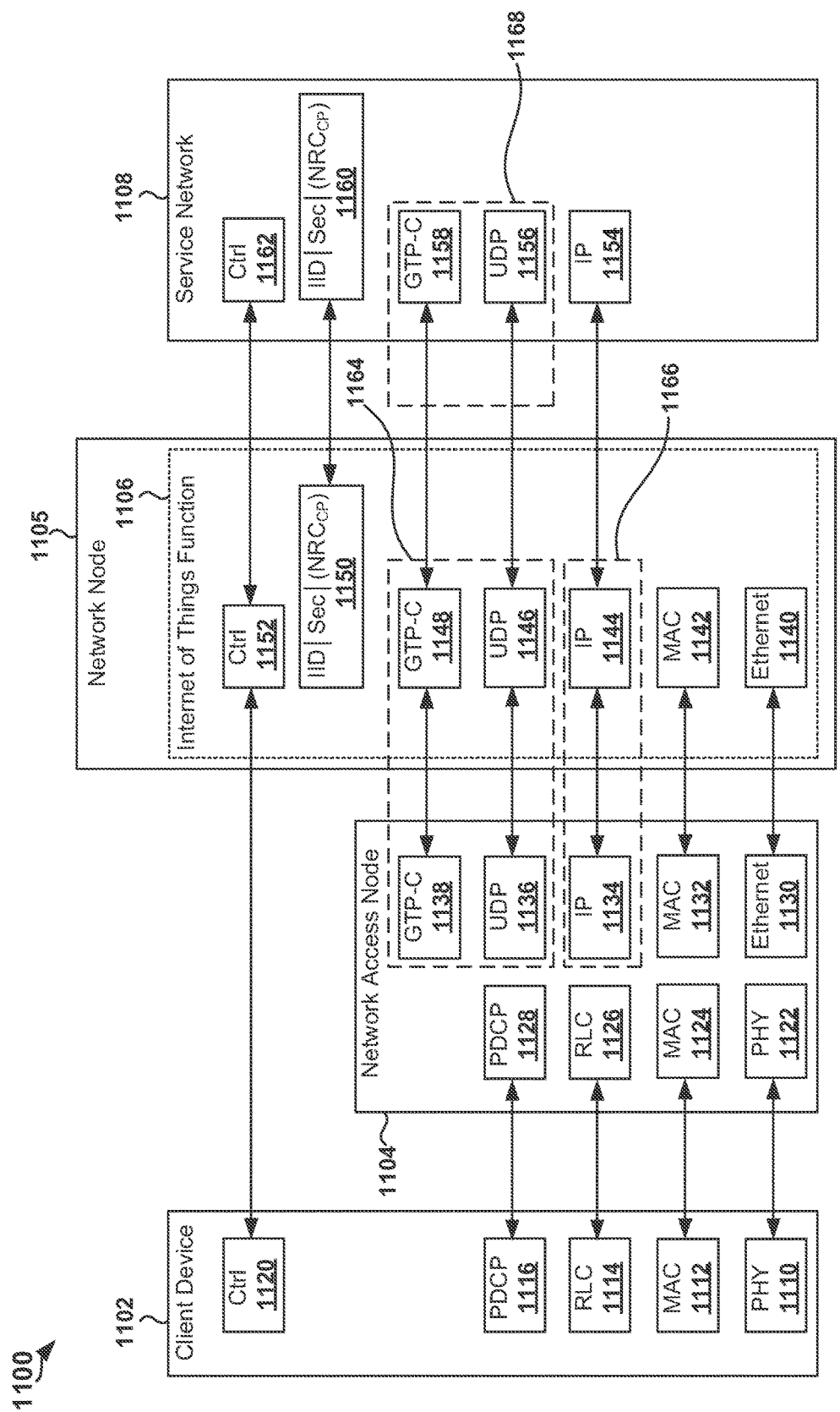
FIG. 11 is a diagram illustrating a control plane protocol stack for IoT data transmission in accordance with various aspects of the present disclosure.

FIG. 11 is a diagram illustrating a control plane protocol stack 1100 for IoT data transmission in accordance with various aspects of the present disclosure. As shown in FIG. 11, the protocol stack 1100 may include a client device protocol stack 1102 (also referred to as an IoT device protocol stack), a network access node protocol stack 1104, an IoTF protocol stack 1106 implemented at a network node 1105, and a service network protocol stack 1108. For example, the network access node protocol stack 1104 may be implemented in an eNB, base station, or network access point. As another example, service network protocol stack 1108 may be implemented in a P-GW. As shown in FIG. 11, the client device protocol stack 1102 may include a physical (PHY) layer 1110, a media access control (MAC) layer 1112, a radio link control (RLC) layer 1114, a packet data convergence protocol (PDCP) layer 1116, and a control (Ctrl) layer 1120.

As shown in FIG. 11, the network access node protocol stack 1104 may include a PHY layer 1122, a MAC layer 1124, an RLC layer 1126, and a PDCP layer 1128 that respectively interface with the PHY layer 1110, the MAC layer 1112, the RLC layer 1114, and the PDCP layer 1116 of the client device protocol stack 1102. The network access node protocol stack 1104 may further include an Ethernet layer 1130, a MAC layer 1132, an Internet Protocol (IP) layer 1134, a user datagram protocol (UDP) layer 1136, and a control plane GPRS Tunneling Protocol (GTP-C) layer 1138.

As shown in FIG. 11, the IoTF protocol stack 1106 may include an Ethernet layer 1140, a MAC layer 1142, an IP layer 1144, a UDP layer 1146, a GTP-C layer 1148, and a control (Ctrl) layer 1152. As further shown in FIG. 11, the IoTF protocol stack 1106 may implement a context protocol layer 1150 for communicating a control plane encrypted network reachability context (abbreviated as "$NRC_{CP}$" in FIG. 11). The context protocol layer 1150 may also enable communication of an IoTF ID (IID) and/or a security header (abbreviated as "Sec" in FIG. 11) that indicates the presence of an encrypted network reachability context.

The service network protocol stack 1108 may include an IP layer 1154, a UDP layer 1156, a GTP-C layer 1158, and a Ctrl layer 1162 that respectively interface with the IP layer 1144, the UDP layer 1146, the GTP-C layer 1148 and the Ctrl layer 1152 of the IoTF protocol stack 1106. As further shown in FIG. 11, the service network protocol stack 1108 may implement a context protocol layer 1160 for communicating a control plane encrypted network reachability context (abbreviated as "NRC$_{CP}$" in FIG. 11). The context protocol layer 1160 may also enable communication of an IoTF ID (IID) and/or a security header (abbreviated as "Sec" in FIG. 11) that indicates the presence of an encrypted network reachability context. As shown in FIG. 11, the context protocol layer 1160 of the service network protocol stack 1108 is in communication with the context protocol layer 1150 of the IoTF protocol stack 1106. In an aspect of the present disclosure, an encrypted network reachability context may be carried in a packet header outside a control plane message in accordance with the exemplary IoT packet format described with respect to FIG. 11. In an aspect of the present disclosure, if a network architecture is implemented as a GSM EDGE Radio Access Network (GERAN), protocols different than the IP protocols 1166 may be used. In an aspect of the present disclosure, the GTP-C and UDP protocols indicated by regions 1164 and 1168 may be omitted.

User Plane Protocol Stack

Figure 12:
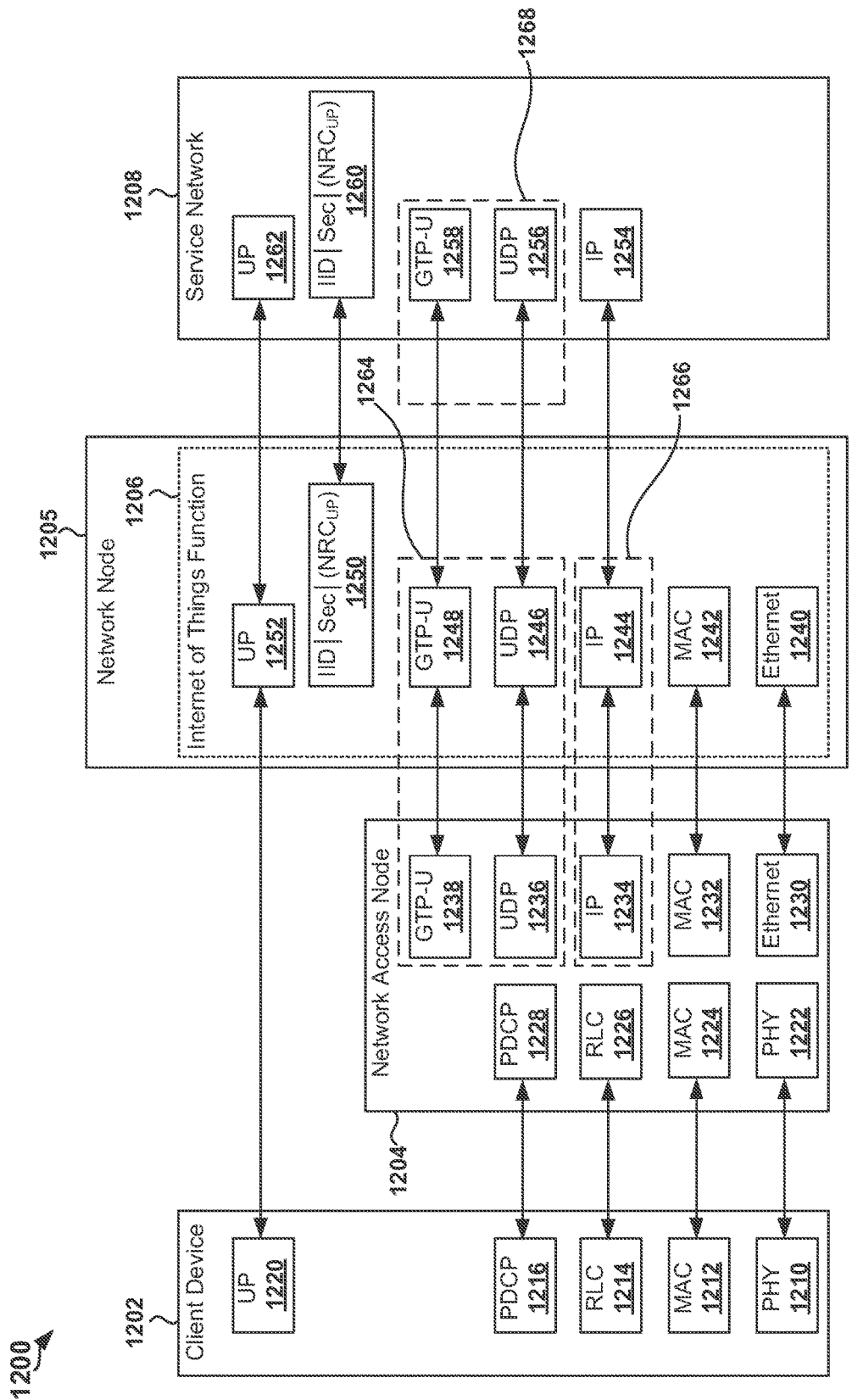
FIG. 12 is a diagram illustrating a user plane protocol stack for IoT data transmission in accordance with various aspects of the present disclosure.

FIG. 12 is a diagram illustrating a user plane protocol stack 1200 for IoT data transmission in accordance with various aspects of the present disclosure. As shown in FIG. 12, the protocol stack 1200 may include a client device protocol stack 1202 (also referred to as an IoT device protocol stack), a network access node protocol stack 1204, an IoTF protocol stack 1206 implemented at a network node 1205, and a service network protocol stack 1208. For example, the network access node protocol stack 1204 may be implemented in an eNB, base station, or network access point. As another example, the service network protocol stack 1208 may be implemented in a P-GW. As shown in FIG. 12, the client device protocol stack 1202 may include a physical (PHY) layer 1210, a media access control (MAC) layer 1212, a radio link control (RLC) layer 1214, a packet data convergence protocol (PDCP) layer 1216, and a user plane (UP) layer 1220.

As shown in FIG. 12, the network access node protocol stack 1204 may include a PHY layer 1222, a MAC layer 1224, an RLC layer 1226, and a PDCP layer 1228 that respectively interface with the PHY layer 1210, the MAC layer 1212, the RLC layer 1214, and the PDCP layer 1216 of the client device protocol stack 1202. The network access node protocol stack 1204 may further include an Ethernet layer 1230, a MAC layer 1232, an Internet Protocol (IP) layer 1234, a user datagram protocol (UDP) layer 1236, and a user plane GPRS Tunneling Protocol (GTP-U) layer 1238.

As shown in FIG. 12, the IoTF protocol stack 1206 may include an Ethernet layer 1240, a MAC layer 1242, an IP layer 1244, a UDP layer 1246, a GTP-U layer 1248, and a user plane (UP) layer 1252. As further shown in FIG. 12, the IoTF protocol stack 1206 may implement a context protocol layer 1250 for communicating a user plane encrypted network reachability context (abbreviated as "NRC$_{UP}$" in FIG. 12). The context protocol layer 1250 may further enable communication of an IoTF ID (IID) and/or a security header (abbreviated as "Sec" in FIG. 12) that indicates the presence of an encrypted network reachability context.

The service network protocol stack 1208 may include an IP layer 1254, a UDP layer 1256, a GTP-U layer 1258 and a user plane (UP) layer 1262 that respectively interface with the IP layer 1244, the UDP layer 1246, the GTP-U layer 1248, and the UP layer 1252 of the IoTF protocol stack 1206. The service network protocol stack 1208 may implement a context protocol layer 1260 for communicating a user plane encrypted network reachability context (abbreviated as "NRC$_{UP}$" in FIG. 12). As shown in FIG. 12, the context protocol layer 1260 of the service network protocol stack 1208 is in communication with the context protocol layer 1250 of the IoTF protocol stack 1206. In an aspect of the present disclosure, an encrypted network reachability context may be carried in a packet header outside a user plane message in accordance with the exemplary IoT packet format described with respect to FIG. 13. In an aspect of the present disclosure, if a network architecture is implemented as a GSM EDGE Radio Access Network (GERAN), protocols different than the IP protocols 1266 may be used. In an aspect of the present disclosure, the GTP-U and UDP protocols indicated by regions 1264 and 1268 may be omitted. In an aspect of the present disclosure, if the IP protocol is used for UP message delivery, the encrypted network reachability context may be carried in the IP options field (IPv4) or IP extension header (IPv6).

IoT Packet Format

Figure 13:
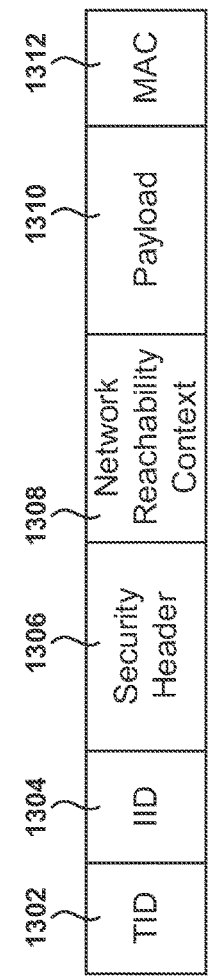
FIG. 13 is a diagram of packet format for transmission in an IoT network architecture in accordance with various aspects of the present disclosure.

FIG. 13 is a diagram of packet format 1300 for transmissions in an IoT network architecture in accordance with various aspects of the present disclosure. With reference to FIG. 13, the temporary identifier (TID) field 1302 may be used by a network access node (e.g., eNB, base station, or network access point) to identify a client device (also referred to as an IoT device) locally. For example, the value assigned by a network access node to the TID field 1302 for identifying a client device may be a C-RNTI or equivalent.

In an aspect of the present disclosure, the IoTF ID (IID) field 1304 may include a globally unique temporary identifier (GUTI). For example, the GUTI may include an identifier associated with an IoTF and an identifier (e.g., a temporary identifier, such as a mobility management entity (MME) temporary mobile subscriber identity (M-TMSI)) associated with the client device. For example, the GUTI may be used by a network access node to identify an IoTF, and the GUTI may be used by an IoTF to identify a client device. In another aspect, the IID field 1304 may include a global IoTF identifier (GIOTFI) and an identifier (e.g., a temporary identifier, such as an M-TMSI) associated with the client device. For example, the GIOTFI may be an equivalent of a globally unique mobility management entity identifier (GUMMEI) for an IoTF. In an aspect of the present disclosure, the M-TMSI may be encrypted for client device privacy. It should be noted that using the IoTF IP address may disclose the network topology.

The security header field 1306 may indicate the presence of an encrypted network reachability context, a control plane (CP)/user plane (UP) indication, a sequence number, a time stamp value and/or a random value. For example, the time stamp value may be based on a time and a counter, where the time is the network access node time or IoTF time. The network reachability context field 1308 may include an encrypted network reachability context. It should be noted that if a time stamp is used for encryption instead of the sequence number, the IoTF may not need to maintain any network state information for a client device. In an aspect, a random value may be based on a random number and a counter. The random value may be generated by the network access node or by the client device, or a combination thereof. The counter may be incremented by a certain value (e.g., one) for each packet. If a random value is used for encryption instead of the sequence number, the client device may generate a new encryption key based on the encryption key in the security context and the random number. If a random value is used for integrity protection instead of the sequence number, the client device may generate a new integrity protection key based on the integrity protection key in the security context and the random number, and may protect a message using the new integrity protection key. The payload field 1310 may include data or control information (e.g., a data packet or a control packet).

The message authentication code (MAC) field 1312 may be used for integrity protection. For example, the MAC field 1312 may include a message authentication code generated by a transmitting device or entity. The message authentication code in the MAC field 1312 may then be used by a receiving device or entity to verify that the integrity of the message has not been compromised (e.g., that the contents of the message have not been altered or manipulated). In one aspect, the message authentication code in the MAC field 1312 may be generated at a transmitting device or entity by applying a message authentication code generation algorithm (e.g., an AEAD cihper), where a message (e.g., a packet) and a user plane key or a control plane key are used as inputs for the message authentication code generation algorithm.

The output of the message authentication code generation algorithm may be the message authentication code included in the MAC field 1312. A receiving device or entity may verify the integrity of the received message by applying the message authentication code generation algorithm (e.g., the AEAD cihper) to the message. For example, the received message (e.g., the packet) and the user plane key or the control plane key may be used as inputs for the message authentication code generation algorithm. The receiving device or entity may then compare the output of the message authentication code generation algorithm to the message authentication code included in the MAC field 1312. In such example, when the output of the message authentication code generation algorithm matches the message authentication code included in the MAC field 1312, the receiving device or entity may determine that the message has been successfully verified.

Encrypted Network Reachability Context Design and Generation a) Control Plane Encrypted Network Reachability Context In an aspect of the present disclosure, an encrypted network reachability context may be generated by concatenating one or more items of information. For example, a control plane (CP) encrypted network reachability context may be generated based on the expression KeyID||Enc_$K_{NRC\text{-}IoTF\text{-}C}$(CDC$_{CP}$)||MAC. In an aspect of the present disclosure, the key $K_{NRC\text{-}IoTF\text{-}C}$ (e.g., the key $K_{NRC\text{-}IoTF\text{-}C}$ 304 in FIG. 3) may be the same as the key $K_{NRC\text{-}IoTF}$ (e.g., the key $K_{NRC\text{-}IoTF}$ 302 in FIG. 3) or may be derived from the key $K_{NRC\text{-}IoTF}$. The term KeyID may represent the Key Index (used for generating the network reachability context). The term CDC$_{CP}$ may represent the control plane client device context. For example, the control plane client device context may include a client device identifier, the client device security context (e.g., control plane keys, such as the key $K_{IoT}$ 202 ($K_{ASME}$ equivalent), the key $K_{IoT\text{-}CPenc}$ 210, the key $K_{IoT\text{-}CPint}$ 212), the client device security capabilities (e.g., Evolved Packet System Encryption Algorithm (EEA), Evolved Packet System Integrity Algorithm (EIA)), and/or the next hop (S5/S8) configuration information. For example, the next hop configuration information may include an IoT server address, a P-GW address, and/or TEIDs. The term MAC may indicate the encryption mode and/or a message authentication code generation algorithm (also referred to as a MAC algorithm), which may be chosen by a mobile network operator (MNO) and configured to IoTFs. Therefore, the term Enc_$K_{NRC\text{-}IoTF\text{-}C}$ (CDC$_{CP}$) may represent the result of an encryption operation performed on the control plane client device context using the key $K_{NRC\text{-}IoTF\text{-}C}$ (e.g., the key $K_{NRC\text{-}IoTF\text{-}C}$ 304 in FIG. 3)

b) User Plane Encrypted Network Reachability Context

As another example, a user plane (UP) encrypted network reachability context may be generated based on the expression KeyID||Enc_$K_{NRC\text{-}IoTF\text{-}U}$(CDC$_{UP}$)||MAC. The term CDC$_{UP}$ may represent the user plane client device context. For example, the user plane client device context may include a client device identifier, bearer IDs, Evolved Packet System (EPS) bearer quality of service(s) (QoS), an S5 tunnel endpoint identifier (TEID) for a user plane General Packet Radio Service (GPRS) tunneling protocol (GTP-U), a P-GW Internet Protocol (IP) address (or equivalent information) to which the IoTF-U 108 forwards UL data, a client device security context (e.g., a selected encryption algorithm and user plane keys, such as the key $K_{IoT\text{-}UPenc}$ 216, the key $K_{IoT\text{-}UPint}$ 218), the client device security capabilities (e.g., Evolved Packet System Encryption Algorithm (EEA), Evolved Packet System Integrity Algorithm (EIA)), and/or the next hop (S5/S8) configuration information. For example, the next hop configuration information may include an IoT server address, a P-GW address, and/or TEIDs. Therefore, the term Enc_$K_{NRC\text{-}IoTF\text{-}U}$(CDC$_{UP}$) may represent the result of an encryption operation performed on the user plane client device context using the key $K_{NRC\text{-}IoTF\text{-}U}$ (e.g., the key $K_{NRC\text{-}IoTF\text{-}U}$ 306 in FIG. 3) In an aspect of the present disclosure, the encrypted network reachability context may only be decrypted by the IoTF (e.g., IoTF-C 106 and/or IoTF-U 108) to which the client device is attached/associated. In an aspect of the present disclosure, the network reachability context may be compressed prior to encryption.

The encrypted network reachability context may have one or more characteristics. For example, an encrypted network reachability context may contain the network state information associated with a particular client device and, therefore, may not be transferable to other client devices. An IoTF-C/U (e.g., the IoTF-C 106 and/or the IoTF-U 108) may not maintain contexts (e.g., network state information) of a client device. Accordingly, such IoTF-C/U may reconstruct a network reachability context for a client device by decrypting an encrypted network reachability context using its own secret key and, therefore, the IoTF-C/U may not need to store any additional information to recover a network reachability context. The IoTF-C/U may remove a network reachability context for a client device under certain conditions (e.g., Evolved Packet System Connection Management (ECM)-Idle or immediately after small data transfer) and restore it when necessary (e.g., for data transfer).

Tracking Area Update Procedure

A client device may perform a tracking area update (TAU) procedure when the client device enters into a new tracking area during the idle mode. The TAU message may include the current tracking area ID (TAI) and the GIOTFI or equivalent (e.g., a globally unique mobile management entity identifier (GUMMEI)) of the source IoTF-C. The target IoTF-C may update the location of the client device and the mobility anchor (e.g., IoTF-U ID) to one or more network entities (e.g., a P-GW) along with an encrypted network reachability context. In an aspect of the present disclosure, the encrypted network reachability context may enable the IoTF-U to verify the downlink packet. In an aspect of the present disclosure, an application server (e.g., an IoT server) and/or a P-GW may transmit a downlink (DL) packet with the encrypted network reachability context to the IoTF-U/C (identified by the GIOTFI).

Figure 14:
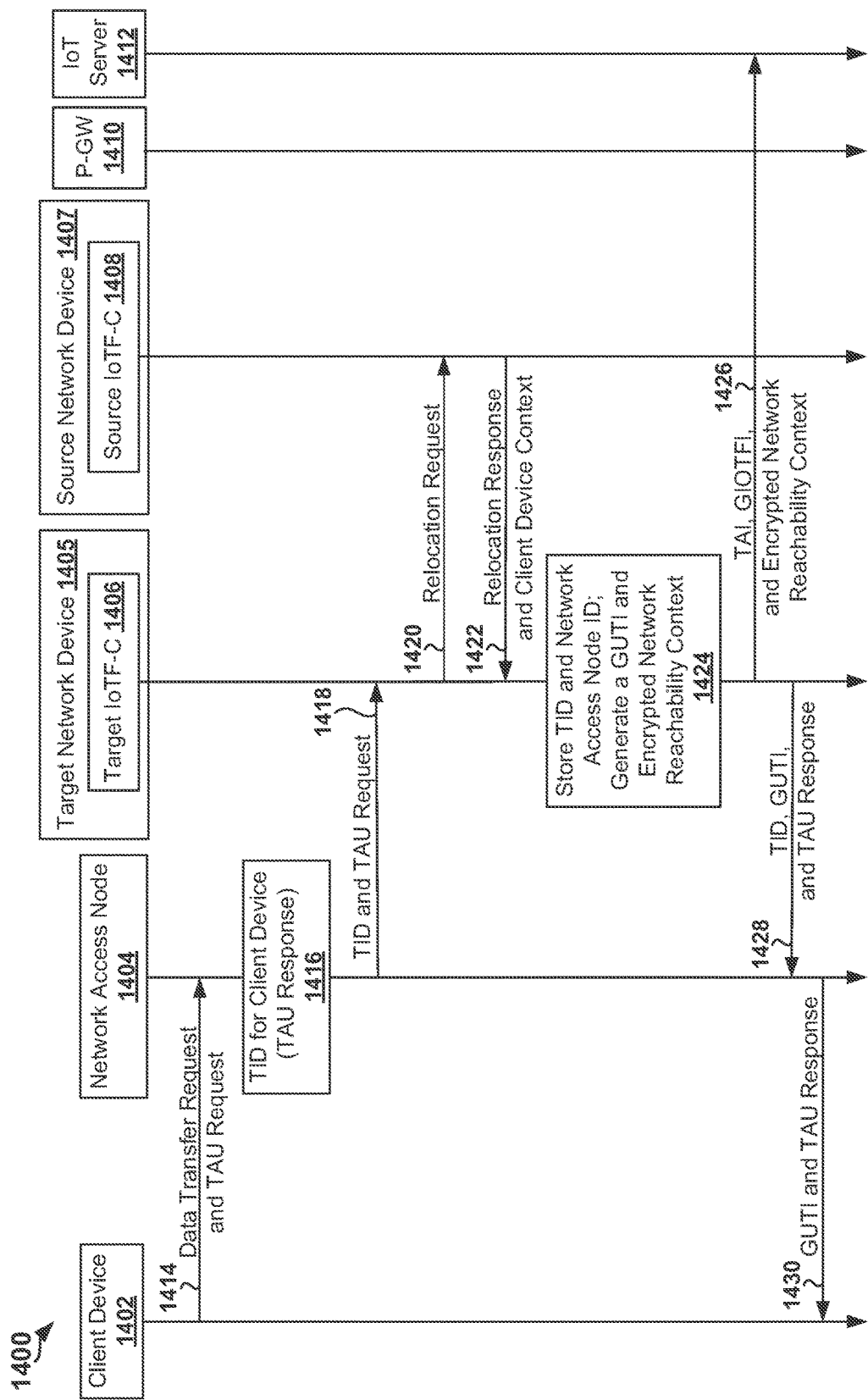
FIG. 14 is a signal flow diagram of a tracking area update (TAU) procedure in an IoT network architecture in accordance with various aspects of the present disclosure.

FIG. 14 is a signal flow diagram 1400 of a TAU procedure in an IoT network architecture (e.g., IoT network architecture 100) in accordance with various aspects of the present disclosure. As shown in FIG. 14, the signal flow diagram 1400 includes a client device 1402 (also referred to as an IoT device), a network access node 1404 (e.g., eNB, base station, network access point), a target IoTF-C 1406 implemented at a target network device 1405, a source IoTF-C 1408 implemented at a source network device 1407, a P-GW 1410, and an IoT server 1412 (also referred to as an application server).

The client device 1402 may transmit a data transfer request message 1414 that includes a TAU request to the network access node 1404. In an aspect of the present disclosure, the data transfer request message 1414 may be sent by the client device 1402 without establishing an RRC connection. The network access node 1404 may determine 1416 the target IoTF-C identifier included in the TAU request. The network access node 1404 may then determine the IP address of the target IoTF-C 1406, and may transmit a message 1418 including the TID associated with the client device 1402 and the TAU request to the target IoTF-C 1406. The target IoTF-C 1406 may transmit a message 1420 including a request for the client device context to the source IoTF-C 1408.

The source IoTF-C 1408 may transmit a message 1422 including the client device context to the target IoTF-C 1406. The target IoTF-C 1406 may store 1424 the TID for client device and an ID for the network access node 1404, and may generate 1424 a new GUTI and a new encrypted network reachability context for the client device 1402 based on the received client device context. In an aspect of the present disclosure, the target IoTF-C 1406 may generate user plane (UP) keys and context generation keys and may provide the keys to an IoTF-U. The target IoTF-C 1406 may transmit a message 1426 including the tracking area ID (TAI), the ID of the target IoTF-C 1406 (e.g., GIOTFI), and the new encrypted network reachability context to the IoT server 1412 (or P-GW 1410).

The target IoTF-C 1406 may transmit a message 1428 including the TID, the new GUTI, and the TAU response to the client device 1402. The network access node 1404 may forward the new GUTI and the TAU response to the client device 1402 in a message 1430 based on the TID.

The aspects disclosed herein provide an architecture with new dedicated network functions that enable independent deployment and that avoid scalability/inter-working requirements. The aspects disclosed herein may enable a network access node (e.g., a base station) to transfer data to or from client devices without storing or maintaining security contexts for the client devices, thereby avoiding consumption of a substantial amount of resources at network entities (e.g., a network access node or other network entity). Security features may be anchored at a new network function (referred to as the IoT Function (IoTF)). Dedicated resources are allocated for IoT data transfer in order to avoid affecting normal client devices' PDN connection/traffic. An encrypted network reachability context may be used for data transfer to eliminate the client device's semi-persistent context at the IoTF when the client device is in the idle state. Consequently, the MME/S-GW does not need to maintain large amounts of network state information (i.e., contexts) of client devices that do not transmit traffic frequently. Client devices may only require cost-effective data delivery without exhausting valuable core network resources.

Encrypted Network Reachability Context Usage Information

In accordance with the various aspects of the present disclosure, a network entity (e.g., the IoT server 909 in FIG. 9 or the IoT server 1009 in FIG. 10) may transmit usage information along with an encrypted network reachability context, where the usage information is associated with the encrypted network reachability context (also referred to as encrypted network reachability context usage information). In one aspect, the encrypted network reachability context may indicate an amount of data to be transmitted from the network entity (e.g., the IoT server 909 in FIG. 9 or the IoT server 1009 in FIG. 10). For example, the amount of data may be indicated as a reduced data transmission (e.g., a transmission that includes a single data packet) or a burst data transmission (e.g., one or more transmissions that include several data packets). In an aspect, the amount of data to be transmitted from the network entity may be indicated using a single bit (e.g., as part of an information element (IE) in a header of a packet). In such aspect, for example, the network entity may enable the bit (e.g., set the bit to '1') to indicate that the amount of data to be transmitted from the network entity is a reduced data transmission or may disable the bit (e.g., set the bit to '0') to indicate that the amount of data to be transmitted from the network entity is a burst data transmission. In one aspect, when the network entity (e.g., the IoT server 909 in FIG. 9 or the IoT server 1009 in FIG. 10) indicates that the amount of data to be transmitted is a reduced data transmission, other network entities (e.g., a network node, such as the network node 904, 906, and/or a network access node, such as the network access node 1004) may remove the context for the client device immediately after the reduced data transmission is received from the network entity (e.g., the IoT server 909 in FIG. 9 or the IoT server 1009 in FIG. 10). In another aspect, when the network entity (e.g., the IoT server 909 in FIG. 9 or the IoT server 1009 in FIG. 10) indicates that the amount of data to be transmitted is a reduced data transmission, the other network entities may maintain the context for the client device for a first threshold period of time. For example, the other network entities may implement a first timer configured to measure the first threshold period of time. In this aspect, the other network entities may remove the context for the client device upon expiration of the first timer. In one aspect, if the other network entities receive a data transmission (e.g., a packet) from the network entity (e.g., the IoT server 909 in FIG. 9 or the IoT server 1009 in FIG. 10) before expiration of the first timer, the other entities network may reset the first timer and may maintain the context for the client device until the first timer expires. In another aspect, when the network entity (e.g., the IoT server 909 in FIG. 9 or the IoT server 1009 in FIG. 10) indicates that the amount of data to be transmitted is a burst data transmission, the other network entities may maintain the context for the client device for a second threshold period of time. For example, the other network entities may implement a second timer configured to measure the second threshold period of time. In this aspect, the other network entities may remove the context for the client device upon expiration of the second timer. In one aspect, if the other network entities receive a data transmission (e.g., a packet) from the network entity (e.g., the IoT server 909 in FIG. 9 or the IoT server 1009 in FIG. 10) before expiration of the second timer, the other network entities may reset the second timer and may maintain the context for the client device until the second timer expires. For example, the second threshold period of time may be greater than the first threshold period of time. In one aspect, the encrypted network reachability context usage information may be included in a header of a packet transmitted to the other network entities.

In one aspect, a network entity (e.g., the network node 605 in FIG. 6) may provide multiple types of encrypted network reachability contexts to one or more network entities of a service network (e.g., the service network 609 in FIG. 6). In such aspect, each type of encrypted network reachability context may be used by a receiving network entity (e.g., the P-GW 908, the network node 906, and/or the network node 904 in FIG. 9) to reconstruct a portion of a context for the client device (e.g., a subset of a context for the client device). For example, a first type of encrypted network reachability context may be associated with a first service (e.g., a mobile broadband service) provided by the network, where the first type of encrypted network reachability context enables a network entity (e.g., the P-GW 908, the network node 906, and/or the network node 904 in FIG. 9) to reconstruct a first portion of the network reachability context that is needed to support the first service. In such example, a second type of encrypted network reachability context may be associated with a second service (e.g., ultra-reliable low-latency communications (URLLC)) provided by the network, where the second type of encrypted network reachability context enables a network entity to reconstruct a second portion of the network reachability context that is needed to support the second service. In an aspect, the first portion of the network reachability context and the second portion of the network reachability context may include less context information than the network reachability context originally generated by the network for the client device. In an aspect, a network entity (e.g., the IoT server 909 in FIG. 9 or the IoT server 1009 in FIG. 10) may determine one or more of the multiple types of encrypted network reachability contexts to use based on the type of transmission to be sent to (or received from) the client device. For example, and with reference to the examples provided above, if a network entity (e.g., the IoT server 909 in FIG. 9 or the IoT server 1009 in FIG. 10) is to transmit data associated with a mobile broadband service, the network entity may transmit the first type of encrypted network reachability context to the other network entities. As another example, if the network entity (e.g., the IoT server 909 in FIG. 9 or the IoT server 1009 in FIG. 10) is to transmit data associated with a URLLC service, the network entity may transmit the second type of encrypted network reachability context to the other network entities. It should be understood that other types of services may be provided by the network in addition to or instead of the examples provided above, such as a high priority access service, a delay tolerant access service, or a machine type communications (MTC) service. In accordance with the various aspects of the present disclosure, a network entity (e.g., the IoT server 909 in FIG. 9 or the IoT server 1009 in FIG. 10) may indicate the type of the encrypted network reachability context in the previously described usage information when the network entity transmits an encrypted network reachability context to other network entities. In one aspect, the encrypted network reachability context usage information may indicate the type of information being transmitted from the network entity (e.g., the IoT server 909 in FIG. 9 or the IoT server 1009 in FIG. 10). For example, the encrypted network reachability context usage information may indicate that the information being transmitted from the network entity (e.g., the IoT server 909 in FIG. 9 or the IoT server 1009 in FIG. 10) is associated with the user plane (e.g., data) or the control plane (e.g., control information). It can be appreciated that since each of the different types of encrypted network reachability contexts previously discussed may be used by network entities (e.g., at the network node 906 in FIG. 9) to reconstruct a portion of a context for the client device (e.g., a subset of a context for the client device), such different types of encrypted network reachability contexts may be reduced in size as compared to an encrypted network reachability context that enables reconstruction of the entire (e.g., full) network reachability context.

In an aspect, the context (or portion of a context) to be reconstructed by network entities (e.g., at the network node 906 in FIG. 9) for a type of service provided by the network (e.g., at the IoT server 909 in FIG. 9) may be associated with a value (e.g., an index number or other value). In such aspect, a network entity (e.g., the IoT server 909 in FIG. 9 or the IoT server 1009 in FIG. 10) may transmit the value along with the encrypted network reachability context to facilitate reconstruction of a context at another network entity for a particular service (or other specific use or application). For example, an index number "1" may indicate a particular quality of service (QoS) for a mobile broadband service and the information needed to reconstruct a context for supporting that QoS. In such example, the network entity (e.g., the IoT server 909 in FIG. 9 or the IoT server 1009 in FIG. 10) may transmit an encrypted network reachability context associated with a mobile broadband service and the index number "1" to facilitate reconstruction of a portion of the network reachability context that supports the mobile broadband service.

Exemplary Apparatus (e.g., Network Device) and Method Thereon

Figure 15:
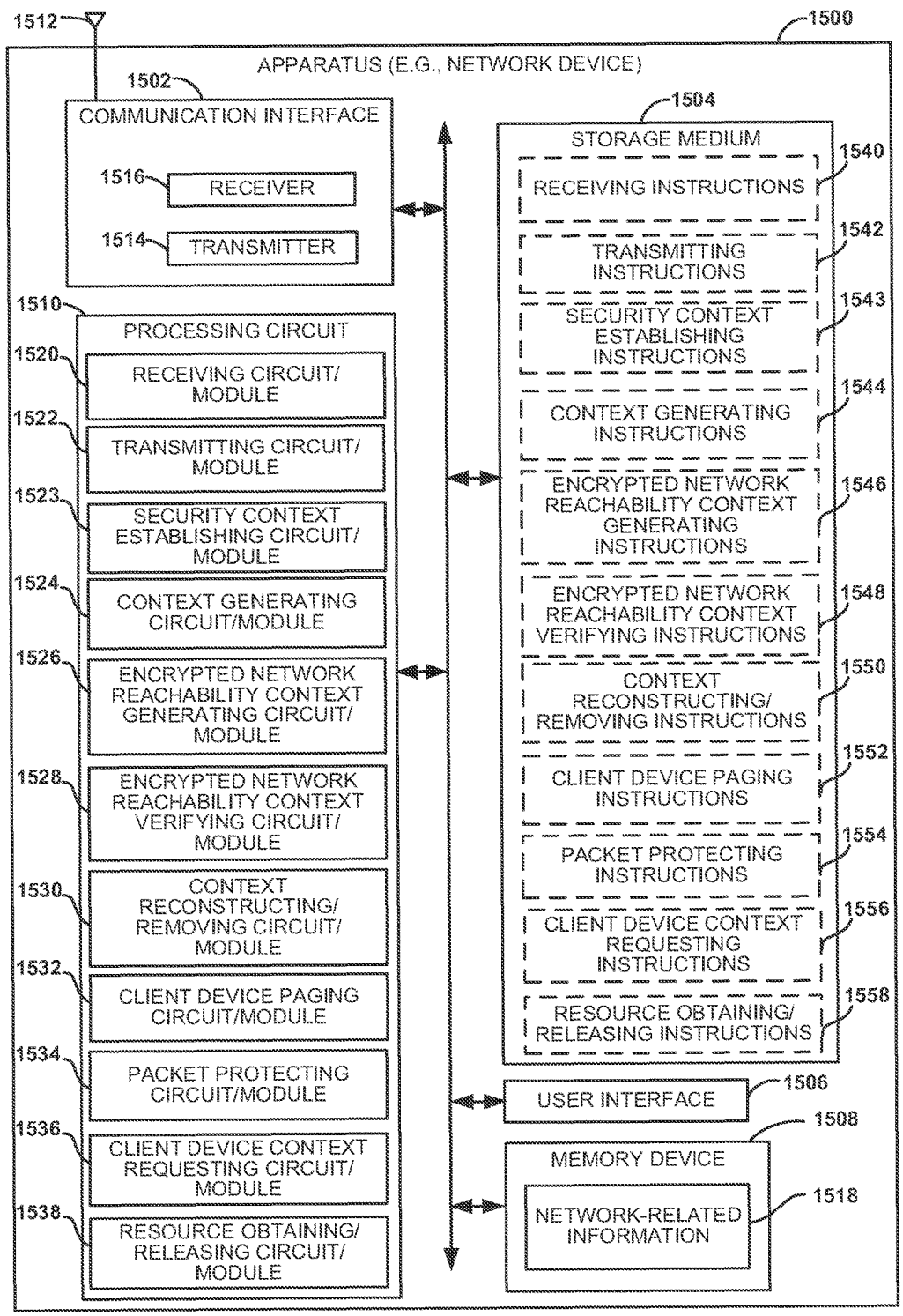
FIG. 15 is an illustration of an apparatus configured to support operations related to communication in an IoT network architecture in accordance with various aspects of the present disclosure.

FIG. 15 is an illustration of an apparatus 1500 according to one or more aspects of the disclosure (e.g., aspects related to the methods of FIGS. 14-16 described below). The apparatus 1500 includes a communication interface (e.g., at least one transceiver) 1502, a storage medium 1504, a user interface 1506, a memory device 1508, and a processing circuit 1510. In an aspect, the apparatus 1500 may be a network device (e.g., network device 105, 505, 705) that implements an Internet of Things (IoT) Function. For example, the apparatus 1500 may implement a control plane IoT Function (e.g., IoTF-C 106, 506, 606, 706, 806, 1406) and/or a user plane IoT Function (e.g., IoTF-UL 108, 508, 608, 708, 808). It should be understood that such network device may be implemented as a single network entity or as multiple network entities.

These components can be coupled to and/or placed in electrical communication with one another via a signaling bus or other suitable component, represented generally by the connection lines in FIG. 15. The signaling bus may include any number of interconnecting buses and bridges depending on the specific application of the processing circuit 1510 and the overall design constraints. The signaling bus links together various circuits such that each of the communication interface 1502, the storage medium 1504, the user interface 1506, and the memory device 1508 are coupled to and/or in electrical communication with the processing circuit 1510. The signaling bus may also link various other circuits (not shown) such as timing sources, peripherals, voltage regulators, and power management circuits, which are well known in the art, and therefore, will not be described any further.

The communication interface 1502 may be adapted to facilitate wireless communication of the apparatus 1500. For example, the communication interface 1502 may include circuitry and/or code (e.g., instructions) adapted to facilitate the communication of information bi-directionally with respect to one or more communication devices in a network. The communication interface 1502 may be coupled to one or more antennas 1512 for wireless communication within a wireless communication system. The communication interface 1502 can be configured with one or more standalone receivers and/or transmitters, as well as one or more transceivers. In the illustrated example, the communication interface 1502 includes a transmitter 1514 and a receiver 1516.

The memory device 1508 may represent one or more memory devices. As indicated, the memory device 1508 may maintain network-related information/along with other information used by the apparatus 1500. In some implementations, the memory device 1508 and the storage medium 1504 are implemented as a common memory component. The memory device 1508 may also be used for storing data that is manipulated by the processing circuit 1510 or some other component of the apparatus 1500.

The storage medium 1504 may represent one or more computer-readable, machine-readable, and/or processor-readable devices for storing code, such as processor executable code or instructions (e.g., software, firmware), electronic data, databases, or other digital information. The storage medium 1504 may also be used for storing data that is manipulated by the processing circuit 1510 when executing code. The storage medium 1504 may be any available media that can be accessed by a general purpose or special purpose processor, including portable or fixed storage devices, optical storage devices, and various other mediums capable of storing, containing or carrying code.

By way of example and not limitation, the storage medium 1504 may include a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing code that may be accessed and read by a computer. The storage medium 1504 may be embodied in an article of manufacture (e.g., a computer program product). By way of example, a computer program product may include a computer-readable medium in packaging materials. In view of the above, in some implementations, the storage medium 1504 may be a non-transitory (e.g., tangible) storage medium.

The storage medium 1504 may be coupled to the processing circuit 1510 such that the processing circuit 1510 can read information from, and write information to, the storage medium 1504. That is, the storage medium 1504 can be coupled to the processing circuit 1510 so that the storage medium 1504 is at least accessible by the processing circuit 1510, including examples where at least one storage medium is integral to the processing circuit 1510 and/or examples where at least one storage medium is separate from the processing circuit 1510 (e.g., resident in the apparatus 1500, external to the apparatus 1500, distributed across multiple entities, etc.).

Code and/or instructions stored by the storage medium 1504, when executed by the processing circuit 1510, causes the processing circuit 1510 to perform one or more of the various functions and/or process operations described herein. For example, the storage medium 1504 may include operations configured for regulating operations at one or more hardware blocks of the processing circuit 1510, as well as to utilize the communication interface 1502 for wireless communication utilizing their respective communication protocols.

The processing circuit 1510 is generally adapted for processing, including the execution of such code/instructions stored on the storage medium 1504. As used herein, the term "code" or "instructions" shall be construed broadly to include without limitation programming, instructions, instruction sets, data, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 1510 is arranged to obtain, process and/or send data, control data access and storage, issue commands, and control other desired operations. The processing circuit 1510 may include circuitry configured to implement desired code provided by appropriate media in at least one example. For example, the processing circuit 1510 may be implemented as one or more processors, one or more controllers, and/or other structure configured to execute executable code. Examples of the processing circuit 1510 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 1510 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 1510 are for illustration and other suitable configurations within the scope of the disclosure are also contemplated.

According to one or more aspects of the disclosure, the processing circuit 1510 may be adapted to perform any or all of the features, processes, functions, operations and/or routines for any or all of the apparatuses described herein. As used herein, the term "adapted" in relation to the processing circuit 1510 may refer to the processing circuit 1510 being one or more of configured, employed, implemented, and/or programmed to perform a particular process, function, operation and/or routine according to various features described herein.

According to at least one example of the apparatus 1500, the processing circuit 1510 may include one or more of a receiving circuit/module 1520, transmitting circuit/module 1522, a security context establishing circuit/module 1523, context generating circuit/module 1524, encrypted network reachability context generating circuit/module 1526, encrypted network reachability context verifying circuit/module 1528, context reconstructing/removing circuit/module 1530, client device paging circuit/module 1532, packet protecting circuit/module 1534, and a client device context requesting circuit/module 1536 that are adapted to perform any or all of the features, processes, functions, operations and/or routines described herein (e.g., features, processes, functions, operations and/or routines described with respect to FIGS. 14-16).

The receiving circuit/module 1520 may include circuitry and/or instructions (e.g., receiving instructions 1540 stored on the storage medium 1504) adapted to perform several functions relating to, for example, receiving a control packet to be sent to the client device and one or more encrypted network reachability contexts from a network entity, receiving, from the client device, a request to communicate with a network, receiving a data packet to be sent to a client device and one or more encrypted network reachability contexts associated with the client device from a network entity, receiving a control packet from a client device, receiving the context for the client device from a second network device, receiving a resource establishment request and at least one of the one or more encrypted network reachability contexts from a network entity, receiving a resource release request message from the network entity, and/or receiving a message from the client device, the message including at least one of the one or more encrypted network reachability contexts and usage information associated with the one or more network reachability contexts.

The transmitting circuit/module 1522 may include circuitry and/or instructions (e.g., transmitting instructions 1542 stored on the storage medium 1504) adapted to perform several functions relating to, for example, transmitting the one or more encrypted network reachability contexts to a network entity (e.g., service network/IoT server/gateway), transmitting a new encrypted network reachability context to a network entity (e.g., an IoT server), transmitting a message including the control packet, transmitting a message including a data packet, transmitting, to the client device, a globally unique temporary identifier associated with the first network device, transmitting the network address to the client device and/or the network entity, and/or transmitting a resource release request message to a packet data network gateway when a timer expires prior to a transmission from the network entity to the client device or prior to a transmission from the client device to the network entity, wherein the resource release request message enables the packet data network gateway to release one or more resources for the client device.

The security context establishing circuit/module 1523 may include circuitry and/or instructions (e.g., security context establishing instructions 1543 stored on the storage medium 1504) adapted to perform several functions relating to, for example, establishing a security context for a connection with a client device, where the security context includes at least an encryption algorithm, an encryption key, an integrity protection algorithm, or an integrity protection key.

The context generating circuit/module 1524 may include circuitry and/or instructions (e.g., context generating instructions 1544 stored on the storage medium 1504) adapted to perform several functions relating to, for example, generating a context for the client device, the context including network state information associated with the client device. For example, the network state information may include at least the encryption algorithm, the encryption key, the integrity protection algorithm, or the integrity protection key.

The encrypted network reachability context generating circuit/module 1526 may include circuitry and/or instructions (e.g., encrypted network reachability context generating instructions 1546 stored on the storage medium 1504) adapted to perform several functions relating to, for example, generating one or more encrypted network reachability contexts based on the context, and generating a new encrypted network reachability context based on the context.

The encrypted network reachability context verifying circuit/module 1528 may include circuitry and/or instructions (e.g., encrypted network reachability context verifying instructions 1548 stored on the storage medium 1504) adapted to perform several functions relating to, for example, determining a key that was used to generate the encrypted network reachability context, generating a first message authentication code (MAC) using the key, and comparing the first MAC to a second MAC in the encrypted network reachability context in order to verify the encrypted network reachability context.

The context reconstructing/removing circuit/module 1530 may include circuitry and/or instructions (e.g., context reconstructing/removing instructions 1550 stored on the storage medium 1504) adapted to perform several functions relating to, for example, obtaining a key (e.g., the key $K_{NRC\text{-}IoTF\text{-}U}$) for one or more encrypted network reachability contexts, decrypting the one or more encrypted network reachability contexts using the key to obtain network state information included in the one or more encrypted network reachability contexts, the network state information including at least an encryption algorithm, an encryption key, an integrity protection algorithm, or an integrity protection key, reconstructing the context using the encrypted network reachability context, reconstructing at least a portion of a context based on the at least one of the one or more encrypted client device contexts and the usage information and/or removing the context, and/or maintaining the at least a portion of a context for a first threshold period of time when the usage information indicates a reduced data transmission, or a second threshold period of time when the usage information indicates a burst data transmission, the second threshold period of time being greater than the first threshold period of time. In an aspect, the context reconstructing/removing circuit/module 1530 may reconstruct a context for the client device based on the network state information included in one or more encrypted network reachability contexts.

The client device paging circuit/module 1532 may include circuitry and/or instructions (e.g., client device paging instructions 1552 stored on the storage medium 1504) adapted to perform several functions relating to, for example, paging the client device based on the reconstructed context.

The packet protecting circuit/module 1534 may include circuitry and/or instructions (e.g., packet protecting instructions 1554 stored on the storage medium 1504) adapted to perform several functions relating to, for example, protecting a packet (e.g., a control packet or data packet) with a security context for the client device. For example, the packet protecting circuit/module 1534 may protect a control packet or data packet based on at least one of an encryption algorithm, an encryption key, an integrity protection algorithm, or an integrity protection key.

The client device context requesting circuit/module 1536 may include circuitry and/or instructions (e.g., client device context requesting instructions 1556 stored on the storage medium 1504) adapted to perform several functions relating to, for example, requesting a context for the client device from a second network device.

The resource obtaining/releasing circuit module 1538 may include circuitry and/or instructions (e.g., resource obtaining/releasing instructions 1558 stored on the storage medium 1504) adapted to perform several functions relating to, for example, obtaining a network address for the client device in response to the resource establishment request and/or releasing one or more resources for the client device.

Figure 16A:
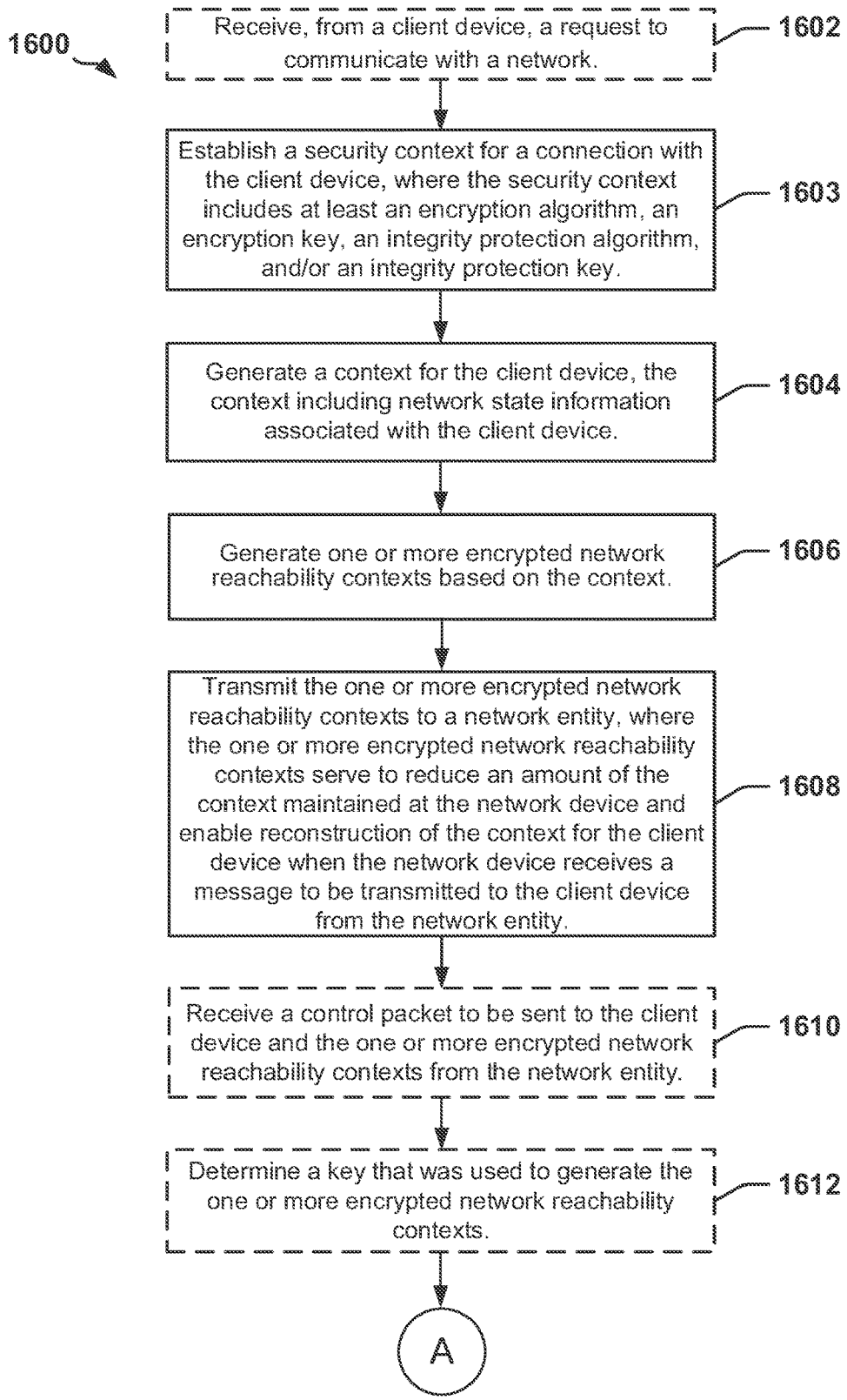
FIG. 16 (including FIGS. 16A and 16B) illustrates a method operational in an apparatus for communication in an IoT network architecture in accordance with various aspects of the present disclosure.
Figure 16B:
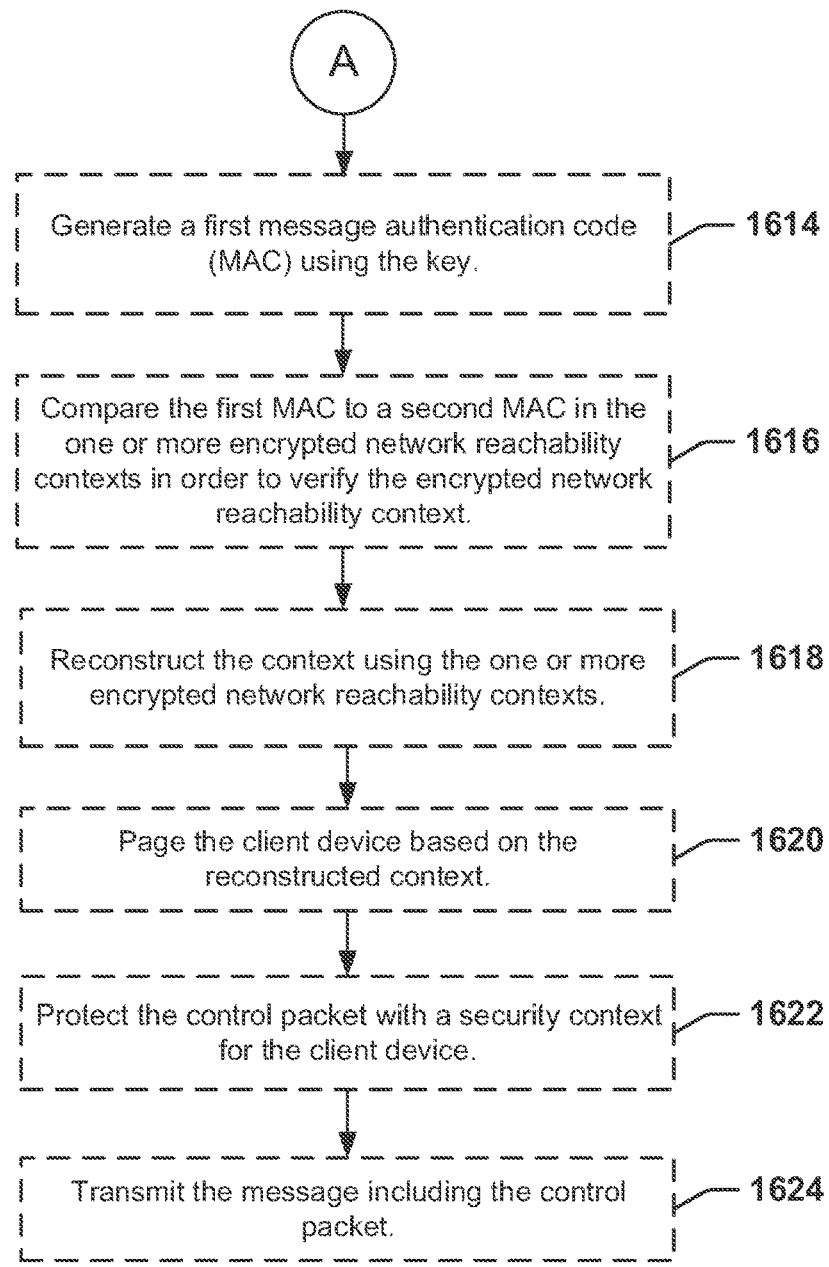

FIG. 16 (including FIGS. 16A and 16B) is a flowchart 1600 illustrating a method for communicating in an IoT network architecture in accordance with various aspects of the disclosure. The method may be performed by an apparatus such as a network device (e.g., the network device 105 of FIG. 1 or the apparatus 1500 of FIG. 15) that implements an IoT Function (e.g., a control plane IoT Function, such as the IoTF-C 106 of FIG. 1). It should be understood that the operations represented with dashed lines in FIG. 16 represent optional operations.

The apparatus receives, from a client device, a request to communicate with a network 1602. The apparatus establishes a security context for a connection with the client device, where the security context includes at least an encryption algorithm, an encryption key, an integrity protection algorithm, and/or an integrity protection key 1603. In an aspect, the security context is established as a result of a successful authentication and key agreement procedure.

The apparatus generates a context for the client device, the context indicating network state information associated with the client device 1604. In an aspect, the network state information includes at least the encryption algorithm, the encryption key, the integrity protection algorithm, and/or the integrity protection key. For example, the network state information may enable the apparatus to reach the client device for transmission of a message.

The apparatus generates one or more encrypted network reachability contexts based on the context 1606. In an aspect, the apparatus generates the one or more encrypted network reachability contexts by encrypting at least one of a control plane (CP) client device context and/or a user plane (UP) client device context for downlink (DL) packet transfer.

The apparatus transmits the one or more encrypted network reachability contexts to a network entity 1608. In an aspect, the one or more encrypted network reachability contexts serve to reduce an amount of the context maintained at the apparatus and enable reconstruction of the context for the client device when the apparatus receives a message to be transmitted to the client device from the network entity.

The apparatus receives a control packet to be sent to the client device and the one or more encrypted network reachability contexts from the network entity 1610. The apparatus determines a key that was used to generate the one or more encrypted network reachability contexts 1612. The apparatus generates a first message authentication code (MAC) using the key 1614. The apparatus compares the first MAC to a second MAC in the one or more encrypted network reachability contexts in order to verify the one or more encrypted network reachability contexts 1616.

The apparatus reconstructs the context using the one or more encrypted network reachability contexts 1618. For example, the apparatus reconstructs the context by decrypting the one or more encrypted network reachability contexts with the key that was used to generate the one or more encrypted network reachability contexts, and by obtaining the network state information included in the one or more encrypted network reachability contexts. In such example, the apparatus reconstructs the context for the client device based on the network state information. The apparatus pages the client device based on the reconstructed context 1620. The apparatus protects a control packet with a security context for the client device 1622. In an aspect, the apparatus protects the control packet based on at least one of the encryption algorithm, the encryption key, the integrity protection algorithm, and/or the integrity protection key. The apparatus transmits the message including the control packet 1624.

Figure 17:
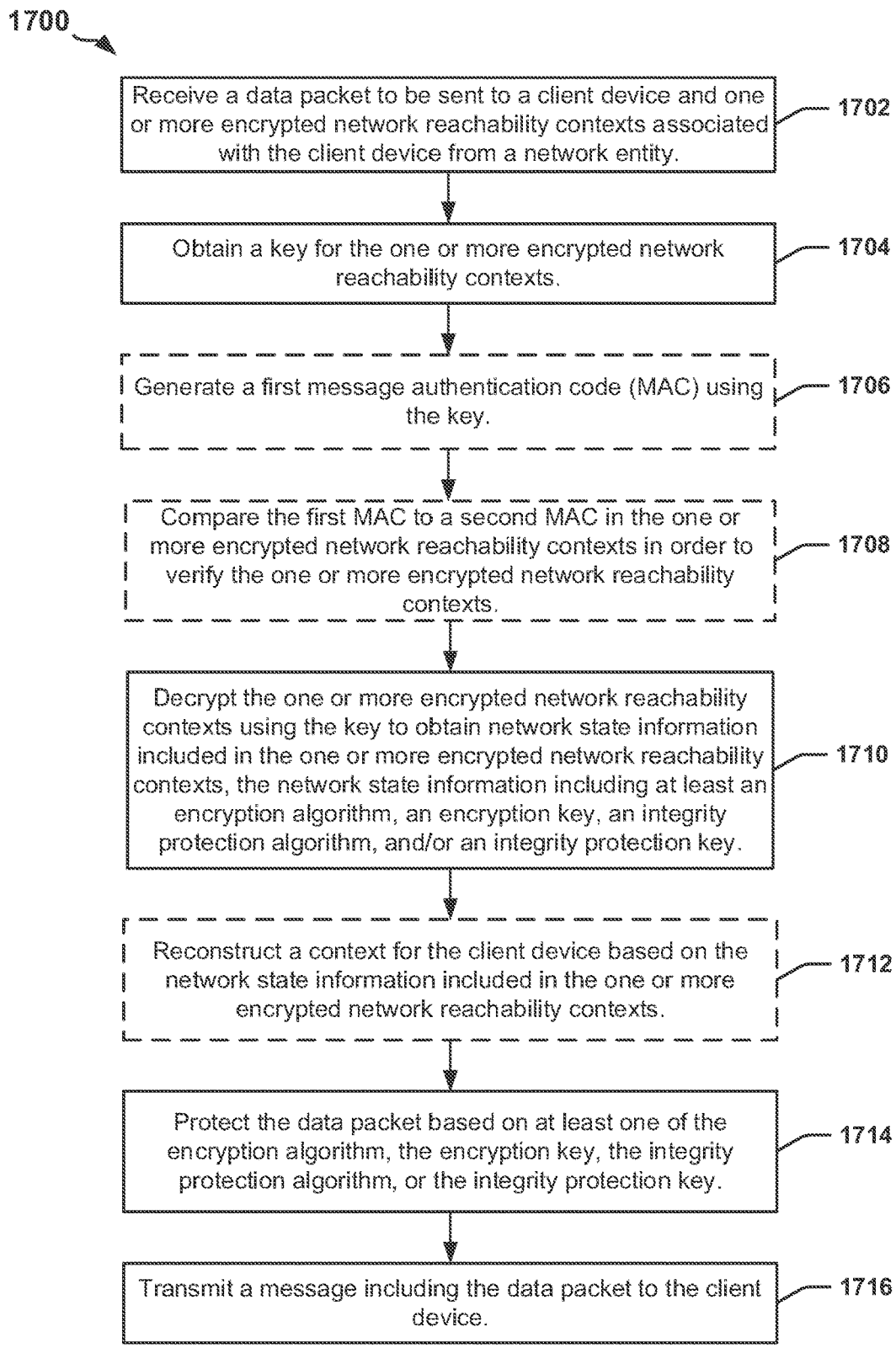
FIG. 17 illustrates a method operational in an apparatus for communication in an IoT network architecture in accordance with various aspects of the present disclosure.

FIG. 17 is a flowchart 1700 illustrating a method for communicating in an IoT network architecture in accordance with various aspects of the disclosure. The method may be performed by an apparatus such as a network device (e.g., the network device 105 of FIG. 1 or the apparatus 1500 of FIG. 15) that implements an IoT Function (e.g., a user plane IoT Function, such as the IoTF-U 108 of FIG. 1). It should be understood that the operations represented with dashed lines in FIG. 17 represent optional operations.

The apparatus receives a data packet to be sent to a client device and one or more encrypted network reachability contexts associated with the client device from a network entity 1702. For example, the network entity may include a packet data network gateway (P-GW) or an Internet of Things server. In an aspect, the network entity may include one or more network nodes. The apparatus obtains a key (e.g., the key $K_{NRC\text{-}IoTF\text{-}U}$) for the one or more encrypted network reachability contexts 1704.

The apparatus generates a first message authentication code using the key 1706. The apparatus compares the first message authentication code to a second message authentication code in the one or more encrypted network reachability contexts in order to verify the one or more encrypted network reachability contexts 1708. The apparatus decrypts the one or more encrypted network reachability contexts using the key to obtain network state information included in the one or more encrypted network reachability contexts, the network state information including at least an encryption algorithm, an encryption key, an integrity protection algorithm, and/or an integrity protection key 1710. The apparatus reconstructs a context for the client device based on the network state information included in the one or more encrypted network reachability contexts 1712. In an aspect, the network state information further includes information that enables the network device to reach the client device for transmission of the message. In an aspect, the information that enables the network device to reach the client device may include client device location information (e.g., a serving or tracking area identifier) for paging the client device.

The apparatus protects the data packet based on at least one of the encryption algorithm, the encryption key, the integrity protection algorithm, and/or the integrity protection key 1714. The apparatus transmits a message including the data packet to the client device 1716.

Figure 18:
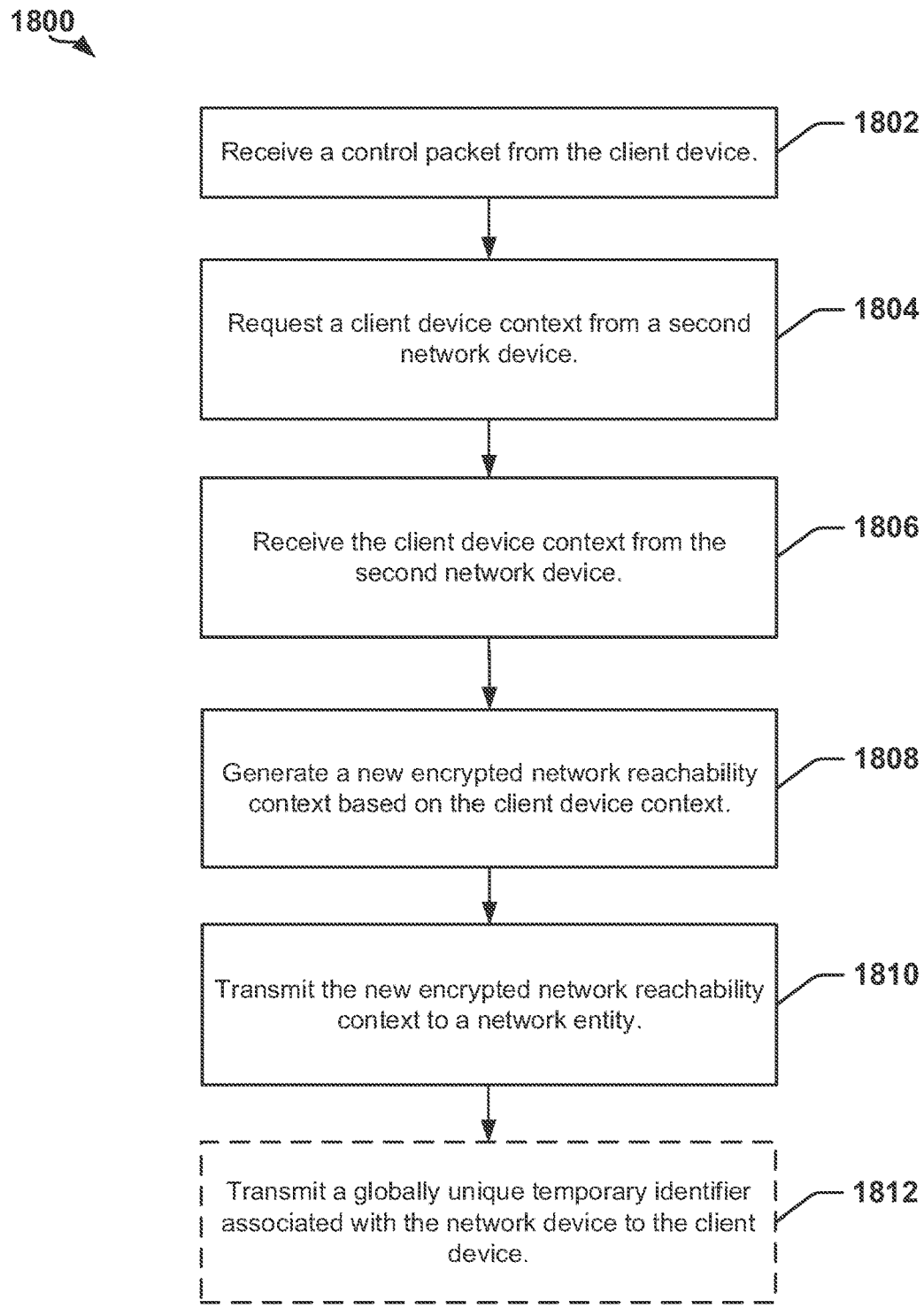
FIG. 18 illustrates a method operational in an apparatus for communication in an IoT network architecture in accordance with various aspects of the present disclosure.

FIG. 18 is a flowchart 1800 illustrating a method for communicating in an IoT network architecture in accordance with various aspects of the present disclosure. The method may be performed by an apparatus such as a network device (e.g., the network device 105 of FIG. 1 or the apparatus 1500 of FIG. 15) that implements an IoT Function (e.g., a control plane IoT Function, such as the IoTF-C 106 of FIG. 1). It should be understood that the operations represented with dashed lines in FIG. 18 represent optional operations.

The apparatus (also referred to as a first network device) receives a control packet from a client device 1802. The apparatus requests a client device context from a second apparatus (e.g., a second network device implementing a source control plane IoTF-C) 1804. In an aspect, the apparatus is associated with a new serving area with respect to the client device, the second apparatus is associated with an old serving area with respect to the client device, and the control packet includes a serving area update request. In an aspect, a serving area may be referred to as a tracking area and the serving area update request may be referred to as a tracking area update (TAU) request.

The apparatus receives the client device context from the second apparatus 1806. The apparatus generates a new encrypted network reachability context based on the context 1808. The apparatus transmits the new encrypted network reachability context to a network entity (e.g., an IoT server or other service network entity) 1810. For example, the encrypted network reachability context includes network state information that enables the network entity to reach the client device. The apparatus transmits, to the client device, a globally unique temporary identifier associated with the apparatus 1812.

Figure 19A:
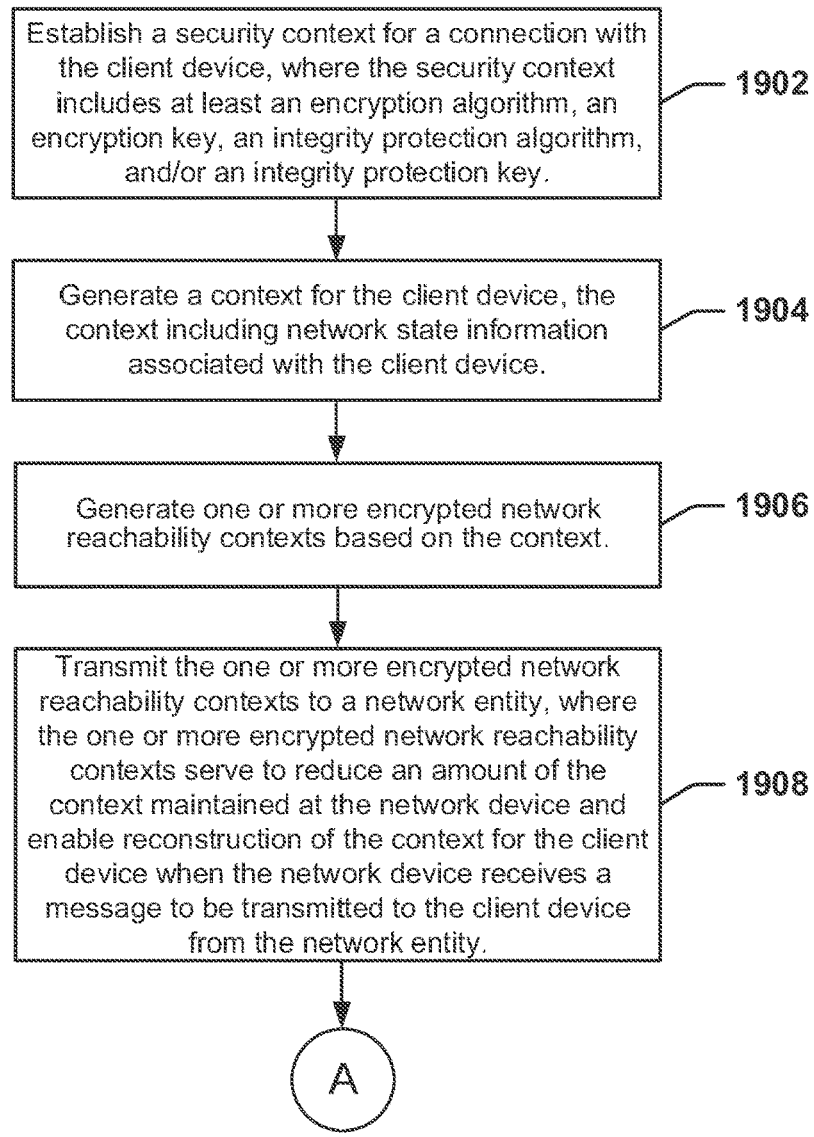
FIG. 19 (including FIGS. 19A and 19B) is a flowchart illustrating a method for communicating in an IoT network architecture in accordance with various aspects of the disclosure.
Figure 19B:
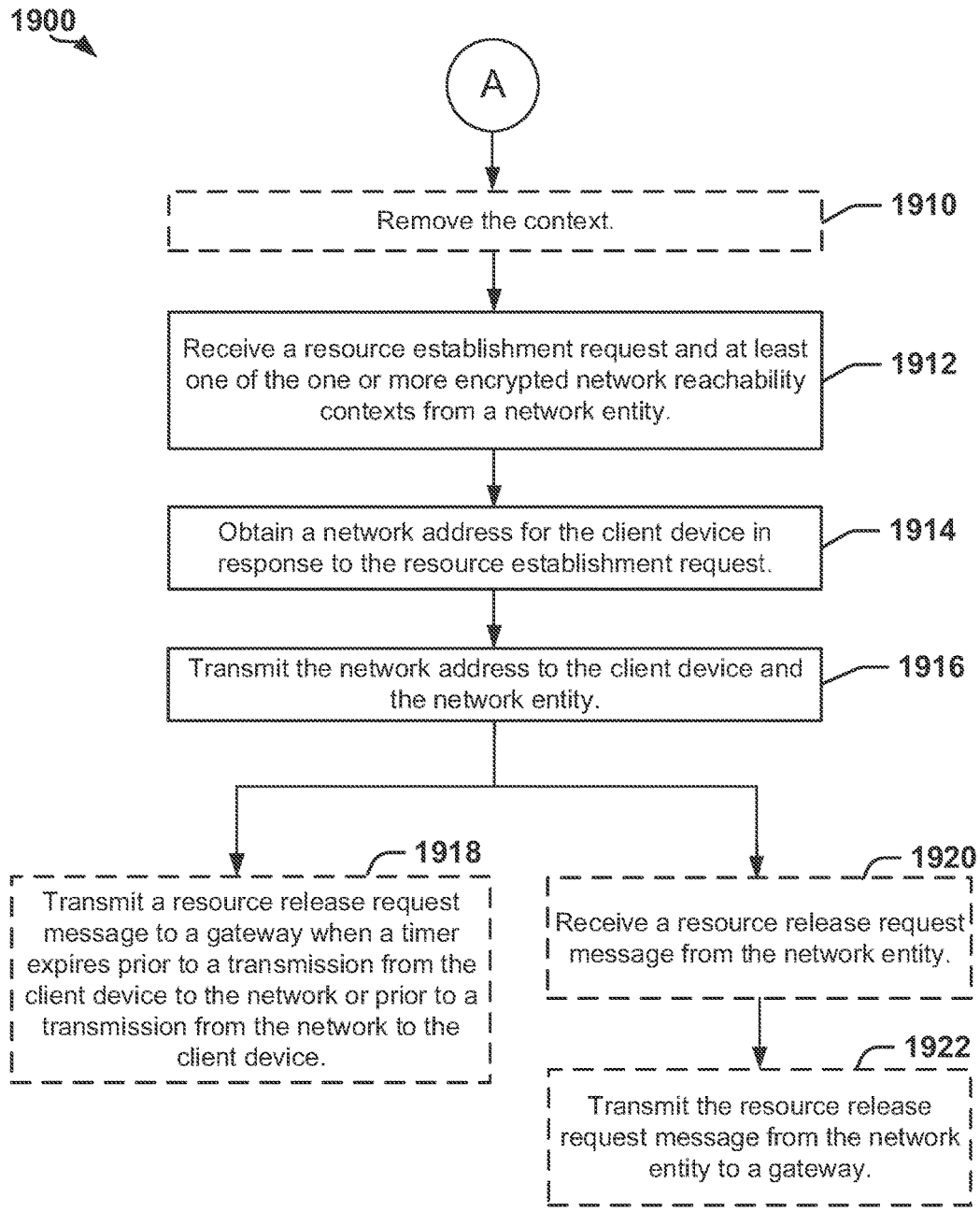

FIG. 19 (including FIGS. 19A and 19B) is a flowchart 1900 illustrating a method for communicating in an IoT network architecture in accordance with various aspects of the disclosure. The method may be performed by an apparatus such as a network device (e.g., the network device 105 of FIG. 1 or the apparatus 1500 of FIG. 15) that implements an IoT Function (e.g., a control plane IoT Function, such as the IoTF-C 106 of FIG. 1). It should be understood that the operations represented with dashed lines in FIG. 19 represent optional operations.

The apparatus establishes a security context for a connection with the client device, where the security context includes at least an encryption algorithm, an encryption key, an integrity protection algorithm, and/or an integrity protection key 1902. In an aspect, the security context is established as a result of a successful authentication and key agreement procedure.

The apparatus generates a context for the client device, the context indicating network state information associated with the client device 1904. In an aspect, the network state information includes at least the encryption algorithm, the encryption key, the integrity protection algorithm, and/or the integrity protection key. For example, the network state information may enable the apparatus to reach the client device for transmission of a message.

The apparatus generates one or more encrypted network reachability contexts based on the context 1906. In an aspect, the apparatus generates the one or more encrypted network reachability contexts by encrypting at least one of a control plane (CP) client device context and/or a user plane (UP) client device context for downlink (DL) packet transfer.

The apparatus transmits the one or more encrypted network reachability contexts to a network entity 1908. In an aspect, the one or more encrypted network reachability contexts serve to reduce an amount of the context maintained at the apparatus and enable reconstruction of the context for the client device when the apparatus receives a message to be transmitted to the client device from the network entity.

The apparatus removes the context 1910. The apparatus receives a resource establishment request and at least one of the one or more encrypted network reachability contexts from a network entity 1912. The apparatus obtains a network address for the client device in response to the resource establishment request 1914. The apparatus transmits the network address to the client device and the network entity 1916.

In one aspect, the apparatus transmits a resource release request message to a gateway when a timer expires prior to a transmission from the client device to the network or prior to a transmission from the network to the client device 1918. In an aspect, the resource release request message enables the gateway to release one or more resources for the client device. In another aspect, the apparatus receives a resource release request message from the network entity 1920. In such aspect, the apparatus transmits the resource release request message from the network entity to a gateway 1922. In an aspect, the resource release request message enables the gateway to release one or more resources for the client device. In some aspects, the operation 1918 and the operations 1920 and 1922 may be performed in the alternative. For example, if operation 1918 is performed, operations 1920 and 1922 may not be performed. As another example, if the operations 1920 and 1922 are performed, operation 1918 may not be performed.

Figure 20A:
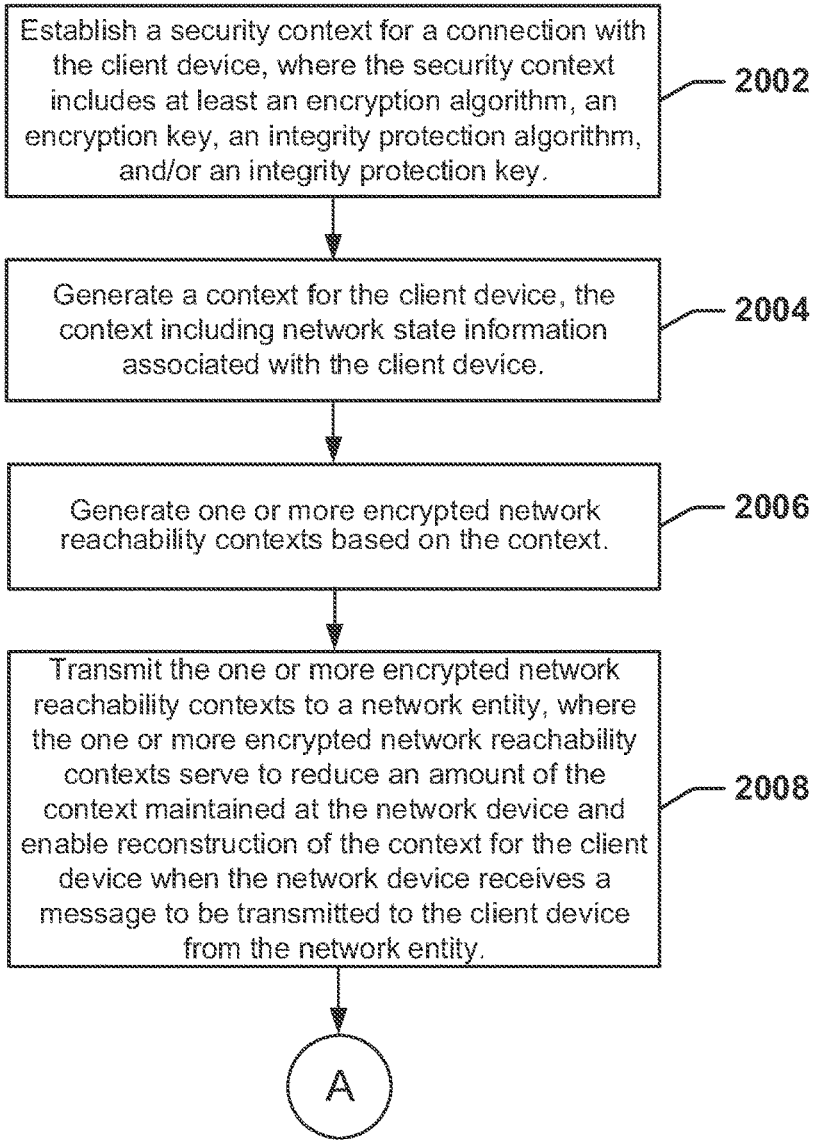
FIG. 20 (including FIGS. 20A and 20B) is a flowchart illustrating a method for communicating in an IoT network architecture in accordance with various aspects of the disclosure.
Figure 20B:
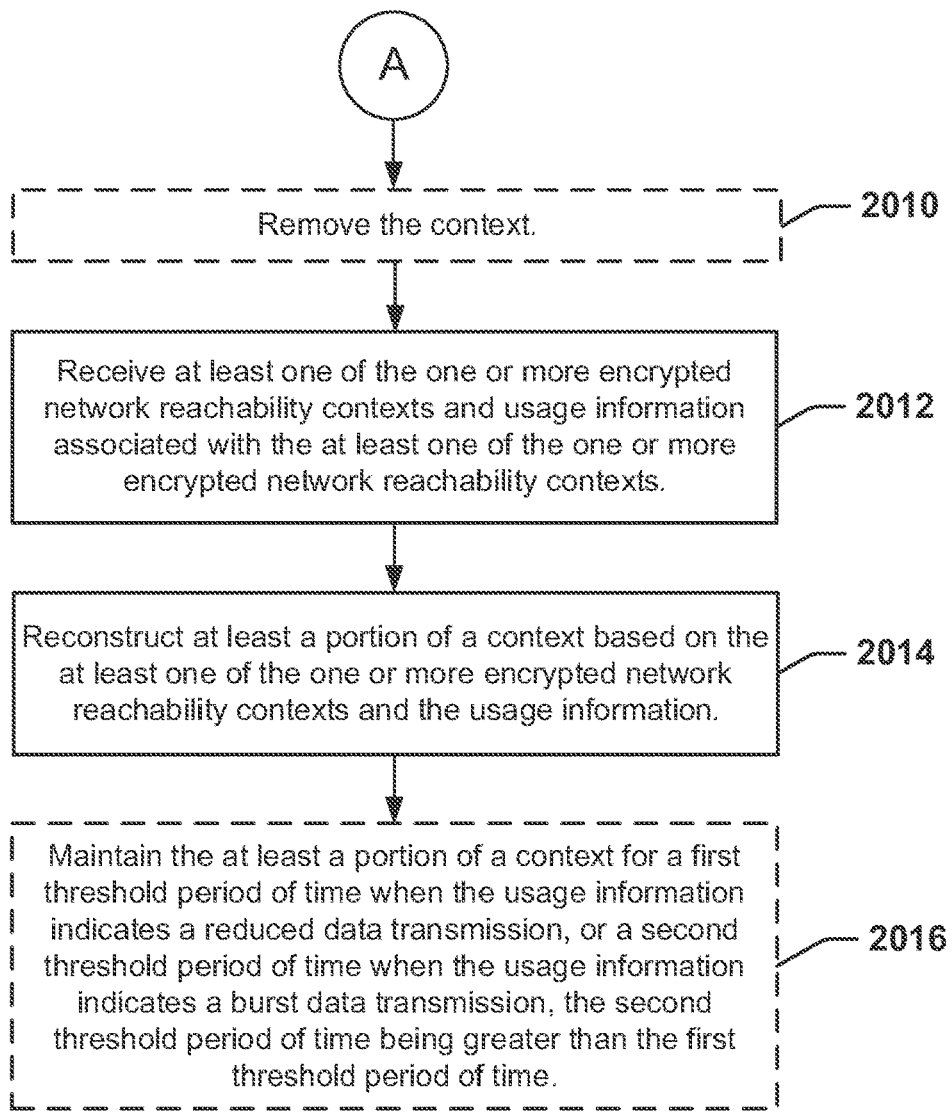

FIG. 20 (including FIGS. 20A and 20B) is a flowchart 2000 illustrating a method for communicating in an IoT network architecture in accordance with various aspects of the disclosure. The method may be performed by an apparatus such as a network device (e.g., the network device 105 of FIG. 1 or the apparatus 1500 of FIG. 15) that implements an IoT Function (e.g., a control plane IoT Function, such as the IoTF-C 106 of FIG. 1). It should be understood that the operations represented with dashed lines in FIG. 20 represent optional operations.

The apparatus establishes a security context for a connection with the client device, where the security context includes at least an encryption algorithm, an encryption key, an integrity protection algorithm, and/or an integrity protection key 2002. In an aspect, the security context is established as a result of a successful authentication and key agreement procedure.

The apparatus generates a context for the client device, the context indicating network state information associated with the client device 2004. In an aspect, the network state information includes at least the encryption algorithm, the encryption key, the integrity protection algorithm, and/or the integrity protection key. For example, the network state information may enable the apparatus to reach the client device for transmission of a message.

The apparatus generates one or more encrypted network reachability contexts based on the context 2006. In an aspect, the apparatus generates the one or more encrypted network reachability contexts by encrypting at least one of a control plane (CP) client device context and/or a user plane (UP) client device context for downlink (DL) packet transfer.

The apparatus transmits the one or more encrypted network reachability contexts to a network entity 2008. In an aspect, the one or more encrypted network reachability contexts serve to reduce an amount of the context maintained at the apparatus and enable reconstruction of the context for the client device when the apparatus receives a message to be transmitted to the client device from the network entity.

The apparatus removes the context 2010. The apparatus receives at least one of the one or more encrypted network reachability contexts and usage information associated with the at least one of the one or more encrypted network reachability contexts 2012. In an aspect, the apparatus may receive the at least one of the one or more encrypted network reachability contexts and usage information associated with the at least one of the one or more encrypted network reachability contexts in a message from a network entity (e.g., IoT server 909). The apparatus reconstructs at least a portion of a context based on the at least one of the one or more encrypted network reachability contexts and the usage information 2014. The apparatus maintains the at least a portion of a context for a first threshold period of time when the usage information indicates a reduced data transmission, or a second threshold period of time when the usage information indicates a burst data transmission, the second threshold period of time being greater than the first threshold period of time 2016.

Exemplary Apparatus (e.g., P-GW) and Method Thereon

Figure 21:
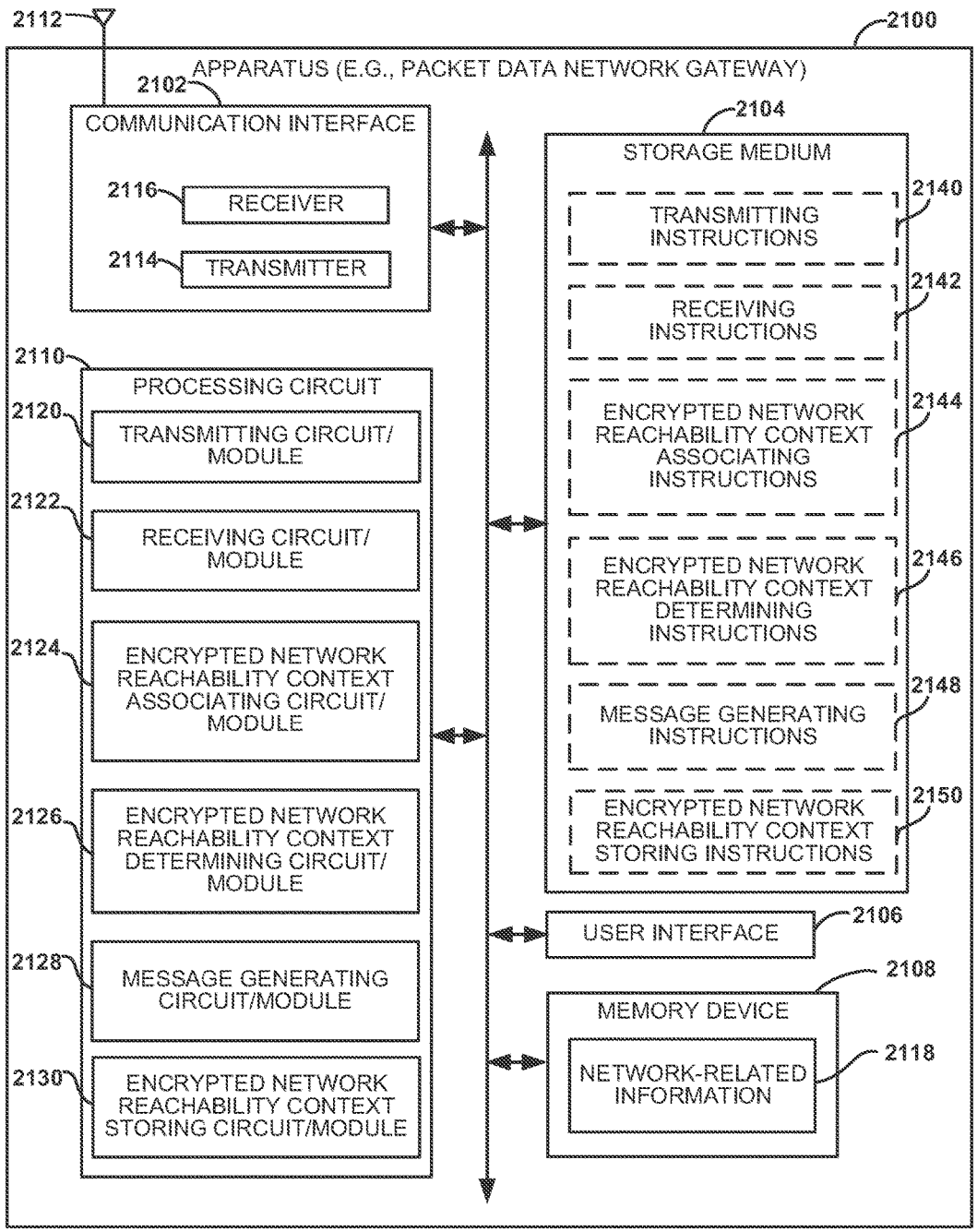
FIG. 21 is an illustration of an apparatus configured to support operations related to communication in an IoT network architecture in accordance with various aspects of the present disclosure.

FIG. 21 is an illustration of an apparatus 2100 according to one or more aspects of the disclosure (e.g., aspects related to the methods of FIG. 22 described below). The apparatus 2100 includes a communication interface (e.g., at least one transceiver) 2102, a storage medium 2104, a user interface 2106, a memory device 2108, and a processing circuit 2110. In an aspect, the apparatus 2100 may be a network entity, such as a P-GW (e.g., at least the P-GW 810 previously described with respect to FIG. 8), that includes one or more nodes in a network. It should be understood that such network entity may be implemented as a single network entity or as multiple network entities.

These components can be coupled to and/or placed in electrical communication with one another via a signaling bus or other suitable component, represented generally by the connection lines in FIG. 21. The signaling bus may include any number of interconnecting buses and bridges depending on the specific application of the processing circuit 2110 and the overall design constraints. The signaling bus links together various circuits such that each of the communication interface 2102, the storage medium 2104, the user interface 2106, and the memory device 2108 are coupled to and/or in electrical communication with the processing circuit 2110. The signaling bus may also link various other circuits (not shown) such as timing sources, peripherals, voltage regulators, and power management circuits, which are well known in the art, and therefore, will not be described any further.

The communication interface 2102 may be adapted to facilitate wireless communication of the apparatus 2100. For example, the communication interface 2102 may include circuitry and/or code (e.g., instructions) adapted to facilitate the communication of information bi-directionally with respect to one or more communication devices in a network. The communication interface 2102 may be coupled to one or more antennas 2112 for wireless communication within a wireless communication system. The communication interface 2102 can be configured with one or more standalone receivers and/or transmitters, as well as one or more transceivers. In the illustrated example, the communication interface 2102 includes a transmitter 2114 and a receiver 2116.

The memory device 2108 may represent one or more memory devices. As indicated, the memory device 2108 may maintain network-related information/along with other information used by the apparatus 2100. In some implementations, the memory device 2108 and the storage medium 2104 are implemented as a common memory component. The memory device 2108 may also be used for storing data that is manipulated by the processing circuit 2110 or some other component of the apparatus 2100.

The storage medium 2104 may represent one or more computer-readable, machine-readable, and/or processor-readable devices for storing code, such as processor executable code or instructions (e.g., software, firmware), electronic data, databases, or other digital information. The storage medium 2104 may also be used for storing data that is manipulated by the processing circuit 2110 when executing code. The storage medium 2104 may be any available media that can be accessed by a general purpose or special purpose processor, including portable or fixed storage devices, optical storage devices, and various other mediums capable of storing, containing or carrying code.

By way of example and not limitation, the storage medium 2104 may include a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing code that may be accessed and read by a computer. The storage medium 2104 may be embodied in an article of manufacture (e.g., a computer program product). By way of example, a computer program product may include a computer-readable medium in packaging materials. In view of the above, in some implementations, the storage medium 2104 may be a non-transitory (e.g., tangible) storage medium.

The storage medium 2104 may be coupled to the processing circuit 2110 such that the processing circuit 2110 can read information from, and write information to, the storage medium 2104. That is, the storage medium 2104 can be coupled to the processing circuit 2110 so that the storage medium 2104 is at least accessible by the processing circuit 2110, including examples where at least one storage medium is integral to the processing circuit 2110 and/or examples where at least one storage medium is separate from the processing circuit 2110 (e.g., resident in the apparatus 2100, external to the apparatus 2100, distributed across multiple entities, etc.).

Code and/or instructions stored by the storage medium 2104, when executed by the processing circuit 2110, causes the processing circuit 2110 to perform one or more of the various functions and/or process operations described herein. For example, the storage medium 2104 may include operations configured for regulating operations at one or more hardware blocks of the processing circuit 2110, as well as to utilize the communication interface 2102 for wireless communication utilizing their respective communication protocols.

The processing circuit 2110 is generally adapted for processing, including the execution of such code/instructions stored on the storage medium 2104. As used herein, the term "code" or "instructions" shall be construed broadly to include without limitation programming, instructions, instruction sets, data, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 2110 is arranged to obtain, process and/or send data, control data access and storage, issue commands, and control other desired operations. The processing circuit 2110 may include circuitry configured to implement desired code provided by appropriate media in at least one example. For example, the processing circuit 2110 may be implemented as one or more processors, one or more controllers, and/or other structure configured to execute executable code. Examples of the processing circuit 2110 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 2110 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 2110 are for illustration and other suitable configurations within the scope of the disclosure are also contemplated.

According to one or more aspects of the disclosure, the processing circuit 2110 may be adapted to perform any or all of the features, processes, functions, operations and/or routines for any or all of the apparatuses described herein. As used herein, the term "adapted" in relation to the processing circuit 2110 may refer to the processing circuit 2110 being one or more of configured, employed, implemented, and/or programmed to perform a particular process, function, operation and/or routine according to various features described herein.

According to at least one example of the apparatus 2100, the processing circuit 2110 may include one or more of a transmitting circuit/module 2120, receiving circuit/module 2122, encrypted network reachability context associating circuit/module 2124, encrypted network reachability context determining circuit/module 2126, message generating circuit/module 2128, and the encrypted network reachability context storing circuit/module 2130 that are adapted to perform any or all of the features, processes, functions, operations and/or routines described herein (e.g., features, processes, functions, operations and/or routines described with respect to FIG. 18).

The transmitting circuit/module 2120 may include circuitry and/or instructions (e.g., transmitting instructions 2140 stored on the storage medium 2104) adapted to perform several functions relating to, for example, transmitting a message including one or more encrypted network reachability contexts to a client device, where the one or more encrypted network reachability contexts include network state information that enables a network entity (e.g., P-GW) to reach the client device.

The receiving circuit/module 2122 may include circuitry and/or instructions (e.g., receiving instructions 2142 stored on the storage medium 2104) adapted to perform several functions relating to, for example, receiving one or more encrypted network reachability contexts for a client device from a network device and/or receiving a packet (e.g., a downlink data packet) to be transmitted to the client device to be transmitted to the client device.

The encrypted network reachability context associating circuit/module 2124 may include circuitry and/or instructions (e.g., encrypted network reachability context associating instructions 2144 stored on the storage medium 2104) adapted to perform several functions relating to, for example, associating the one or more encrypted network reachability contexts to the client device.

The encrypted network reachability context determining circuit/module 2126 may include circuitry and/or instructions (e.g., encrypted network reachability context determining instructions 2146 stored on the storage medium 2104) adapted to perform several functions relating to, for example, determining the one or more encrypted network reachability contexts that corresponds to the client device.

The message generating circuit/module 2128 may include circuitry and/or instructions (e.g., message generating instructions 2148 stored on the storage medium 2104) adapted to perform several functions relating to, for example, generating a message to be delivered to the client device, the message including the encrypted network reachability context.

The encrypted network reachability context storing circuit/module 2130 may include circuitry and/or instructions (e.g., encrypted network reachability context storing instructions 2150 stored on the storage medium 2104) adapted to perform several functions relating to, for example, storing the one or more encrypted network reachability contexts.

Figure 22:
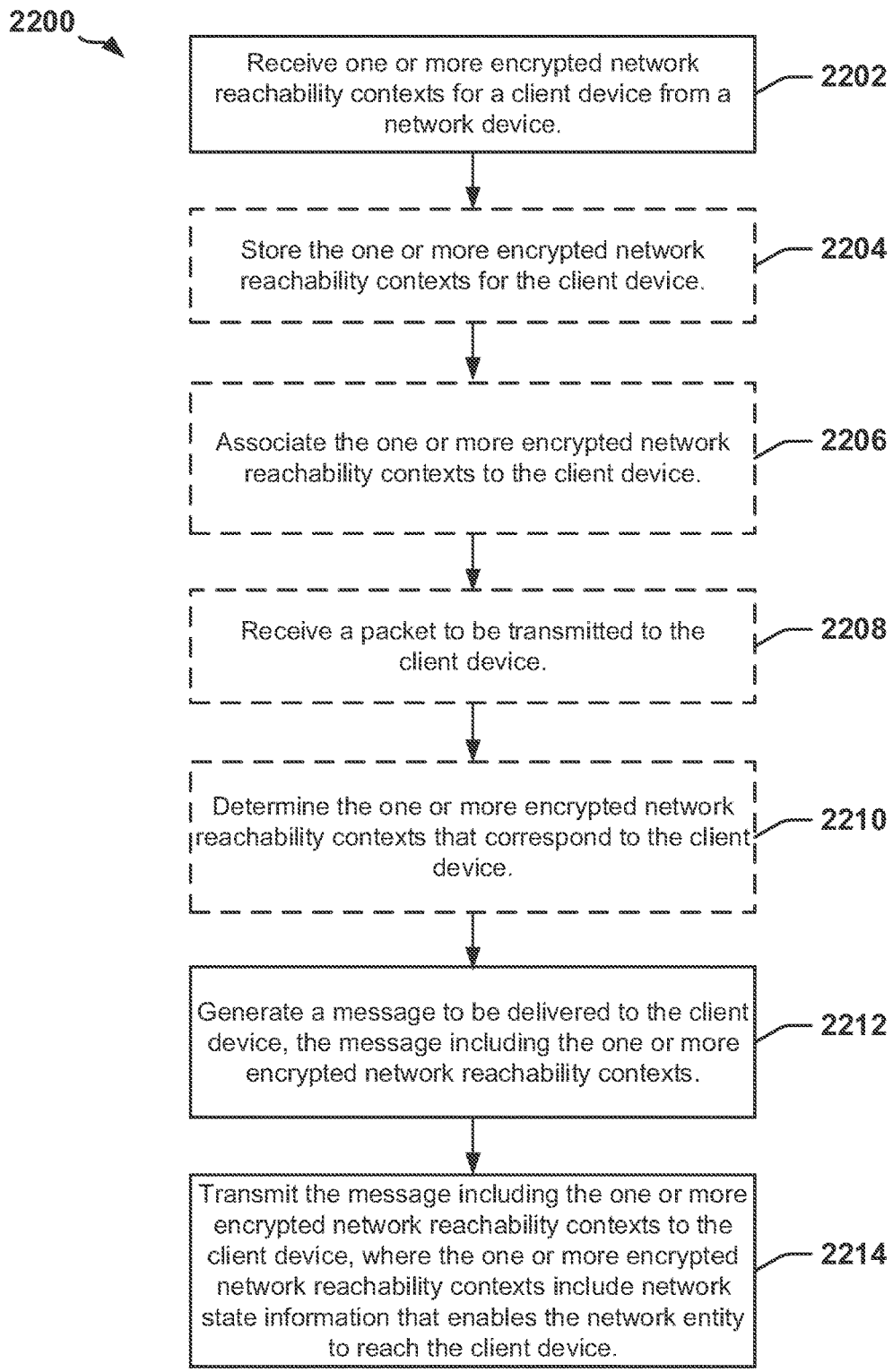
FIG. 22 illustrates a method operational in an apparatus for communication in an IoT network architecture in accordance with various aspects of the present disclosure.

FIG. 22 is a flowchart 2200 illustrating a method for communicating in an IoT network architecture in accordance with various aspects of the disclosure. The method may be performed by an apparatus such as a network entity, such as a P-GW (e.g., the P-GW 810 of FIG. 8 or the apparatus 2100 of FIG. 21). It should be understood that the operations represented with dashed lines in FIG. 22 represent optional operations.

The apparatus receives one or more encrypted network reachability contexts for a client device from a network device 2202. For example, the client device may be an IoT device and the network device may implement a user plane IoT Function (e.g., the IoTF-U 108 in FIG. 1). In an aspect, the one or more encrypted network reachability contexts serve to reduce an amount of the context maintained at the network entity and enable reconstruction of the context for the client device. In an aspect, the apparatus stores the one or more encrypted network reachability contexts 2204, and associates the one or more encrypted network reachability contexts to the client device 2206. In such aspect, the apparatus receives a packet to be transmitted to the client device 2208. For example, the packet may be a downlink data packet from an IoT server intended for the client device. The apparatus determines the one or more encrypted network reachability contexts that corresponds to the client device 2210.

The apparatus generates a message to be delivered to the client device, the message including the one or more encrypted network reachability contexts 2212. In an aspect, the apparatus includes the received packet in the generated message. The apparatus transmits the message including the one or more encrypted network reachability contexts to the client device 2214. In an aspect, the one or more encrypted network reachability contexts include network state information that enables the network entity to reach the client device.

One or more of the components, steps, features and/or functions illustrated in the figures may be rearranged and/or combined into a single component, step, feature or function or embodied in several components, steps, or functions. Additional elements, components, steps, and/or functions may also be added without departing from novel features disclosed herein. The apparatus, devices, and/or components illustrated in the figures may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

Additional elements, components, steps, and/or functions may also be added or not utilized without departing from the disclosure.

While features of the disclosure may have been discussed relative to certain implementations and figures, all implementations of the disclosure can include one or more of the advantageous features discussed herein. In other words, while one or more implementations may have been discussed as having certain advantageous features, one or more of such features may also be used in accordance with any of the various implementations discussed herein. In similar fashion, while exemplary implementations may have been discussed herein as device, system, or method implementations, it should be understood that such exemplary implementations can be implemented in various devices, systems, and methods.

Also, it is noted that at least some implementations have been described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. In some aspects, a process may correspond to a method, a function, a procedure, a subroutine, a subprogram, etc. When a process corresponds to a function, its termination corresponds to a return of the function to the calling function or the main function. One or more of the various methods described herein may be partially or fully implemented by programming (e.g., instructions and/or data) that may be stored in a machine-readable, computer-readable, and/or processor-readable storage medium, and executed by one or more processors, machines and/or devices.

Those of skill in the art would further appreciate that the various illustrative logical blocks, modules, circuits, and algorithm steps described in connection with the implementations disclosed herein may be implemented as hardware, software, firmware, middleware, microcode, or any combination thereof. To clearly illustrate this interchangeability, various illustrative components, blocks, modules, circuits, and steps have been described above generally in terms of their functionality. Whether such functionality is implemented as hardware or software depends upon the particular application and design constraints imposed on the overall system.

Within the disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another-even if they do not directly physically touch each other. For instance, a first die may be coupled to a second die in a package even though the first die is never directly physically in contact with the second die. The terms "circuit" and "circuitry" are used broadly, and intended to include both hardware implementations of electrical devices and conductors that, when connected and configured, enable the performance of the functions described in the disclosure, without limitation as to the type of electronic circuits, as well as software implementations of information and instructions that, when executed by a processor, enable the performance of the functions described in the disclosure.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

Accordingly, the various features associate with the examples described herein and shown in the accompanying drawings can be implemented in different examples and implementations without departing from the scope of the disclosure. Therefore, although certain specific constructions and arrangements have been described and shown in the accompanying drawings, such implementations are merely illustrative and not restrictive of the scope of the disclosure, since various other additions and modifications to, and deletions from, the described implementations will be apparent to one of ordinary skill in the art. Thus, the scope of the disclosure is only determined by the literal language, and legal equivalents, of the claims which follow.

What is claimed is:

1. A method for a network device comprising:
   establishing a security context for a connection with a client device, wherein the security context includes at least an encryption algorithm, an encryption key, an integrity protection algorithm, an integrity protection key, or combinations thereof;
   generating a context for the client device, the context including network state information associated with the client device, the network state information including at least the encryption algorithm, the encryption key, the integrity protection algorithm, the integrity protection key, or combinations thereof;
   generating one or more encrypted network reachability contexts based on the context; and transmitting the one or more encrypted network reachability contexts to a network entity, wherein the one or more encrypted network reachability contexts serve to reduce an amount of the context maintained at the network device and enable reconstruction of the context for the client device when the network device receives, from the network entity, a message that includes both a packet to be delivered to the client device and the one or more encrypted network reachability contexts.

2. The method of claim 1, wherein the network state information further includes information that enables the network device to reach the client device for transmission of the message.

3. The method of claim 1, further comprising:
receiving a control packet to be sent to the client device and the one or more encrypted network reachability contexts from the network entity; and
reconstructing the context using the one or more encrypted network reachability contexts.

4. The method of claim 3, further comprising:
determining a key that was used to generate the one or more encrypted network reachability contexts;
generating a first message authentication code using the key; and
comparing the first message authentication code to a second message authentication code in the one or more encrypted network reachability contexts in order to verify the one or more encrypted network reachability contexts.

5. The method of claim 1, further comprising:
paging the client device based on the reconstructed context.

6. The method of claim 1, further comprising:
receiving, from the client device, a request to communicate with a network,
wherein the security context is established as a result of a successful authentication and key agreement procedure, and wherein the network entity includes at least one of an application server or a packet data network gateway.

7. The method of claim 1, wherein generating the one or more encrypted network reachability contexts comprises:
encrypting at least one of a control plane client device context for control information or a user plane client device context for downlink packet transfer.

8. The method of claim 1, wherein the one or more encrypted network reachability contexts are generated based on one or more corresponding uses of the one or more encrypted network reachability contexts.

9. The method of claim 1, further comprising:
protecting a control packet with the security context for the client device; and
transmitting the message including the control packet.

10. The method of claim 9, wherein protecting the control packet comprises protecting the control packet based on at least one of the encryption algorithm, the encryption key, the integrity protection algorithm, or the integrity protection key.

11. The method of claim 1, further comprising:
removing the context;
receiving a resource establishment request and at least one of the one or more encrypted network reachability contexts from a network entity;
obtaining a network address for the client device in response to the resource establishment request; and
transmitting the network address to the client device and the network entity.

12. The method of claim 11, further comprising:
receiving a resource release request message from the network entity; and
releasing one or more resources for the client device.

13. The method of claim 11, further comprising:
transmitting a resource release request message to a packet data network gateway when a timer expires prior to a transmission from the network entity to the client device or prior to a transmission from the client device to the network entity, wherein the resource release request message enables the packet data network gateway to release one or more resources for the client device.

14. The method of claim 1, further comprising:
removing the at least one context;
receiving a message from the network entity, the message including at least one of the one or more encrypted network reachability contexts and usage information associated with the one or more encrypted network reachability contexts; and
reconstructing at least a portion of a context based on the at least one of the one or more encrypted network reachability contexts and the usage information.

15. The method of claim 14, further comprising:
maintaining the at least a portion of a context for a first threshold period of time when the usage information indicates a reduced data transmission, or a second threshold period of time when the usage information indicates a burst data transmission, the second threshold period of time being greater than the first threshold period of time.

16. The method of claim 14, wherein the usage information indicates whether transmission of the message is a reduced data transmission or a burst data transmission.

17. A network device, comprising:
a communication circuit configured to communicate with one or more network entities; and
a processing circuit coupled to the communication circuit, the processing circuit configured to
establish a security context for a connection with a client device, wherein the security context includes at least an encryption algorithm, an encryption key, an integrity protection algorithm, or an integrity protection key;
generate a context for the client device, the context including network state information associated with the client device, the network state information including at least the encryption algorithm, the encryption key, the integrity protection algorithm, or the integrity protection key;
generate one or more encrypted network reachability contexts based on the context; and
transmit the one or more encrypted network reachability contexts to a network entity, wherein the one or more encrypted network reachability contexts serve to reduce an amount of the context maintained at the network device and enable reconstruction of the context for the client device when the network device receives, from the network entity, a message that includes both a packet to be delivered to the client device and the one or more encrypted network reachability contexts.

18. The network device of claim 17, wherein the network state information further includes information that enables the network device to reach the client device for transmission of the message.

19. The network device of claim 17, wherein the processing circuit is further configured to:
receive a control packet to be sent to the client device and the one or more encrypted network reachability contexts from the network entity; and
reconstruct the context using the one or more encrypted network reachability contexts.

20. The network device of claim 19, wherein the processing circuit is further configured to:
determine a key that was used to generate the one or more encrypted network reachability contexts;
generate a first message authentication code using the key; and
compare the first message authentication code to a second message authentication code in the one or more encrypted network reachability contexts in order to verify the one or more encrypted network reachability contexts.

21. The network device of claim 17, wherein the processing circuit is further configured to:
page the client device based on the reconstructed context.

22. The network device of claim 17, wherein the processing circuit is further configured to:
receive, from the client device, a request to communicate with a network,
wherein the security context is established as a result of a successful authentication and key agreement procedure, and wherein the network entity includes at least one of an application server or a packet data network gateway.

23. The network device of claim 17, wherein the processing circuit configured to generate the one or more encrypted network reachability contexts is further configured to:
encrypt at least one of a control plane client device context for control information or a user plane client device context for downlink packet transfer.

24. The network device of claim 17, wherein the processing circuit is further configured to:
protect a control packet with the security context for the client device; and
transmit the message including the control packet.

25. The network device of claim 24, wherein the processing circuit configured to protect the control packet is further configured to:
protect the control packet based on at least one of the encryption algorithm, the encryption key, the integrity protection algorithm, or the integrity protection key.

26. A method for a network device comprising:
receiving, from a network entity, a message that includes both a data packet to be delivered to a client device and one or more encrypted network reachability contexts associated with the client device;
obtaining a key for the one or more encrypted network reachability contexts;
decrypting the one or more encrypted network reachability contexts using the key to obtain network state information included in the one or more encrypted network reachability contexts, the network state information including at least an encryption algorithm, an encryption key, an integrity protection algorithm, an integrity protection key, or combinations thereof;
protecting the data packet based on at least one of the encryption algorithm, the encryption key, the integrity protection algorithm, the integrity protection key, or combinations thereof; and
transmitting a message including the data packet to the client device.

27. The method of claim 26, further comprising:
reconstructing a context for the client device based on the network state information included in the one or more encrypted network reachability contexts.

28. The method of claim 26, wherein the network state information further includes information that enables the network device to reach the client device for transmission of the message.

29. The method of claim 26, further comprising:
generating a first message authentication code using the key; and
comparing the first message authentication code to a second message authentication code in the one or more encrypted network reachability contexts in order to verify the encrypted network reachability context.

30. A network device comprising:
a communication circuit configured to communicate with one or more network entities; and
a processing circuit coupled to the communication circuit, the processing circuit configured to
receive, from a network entity, a message that includes both a data packet to be delivered to a client device and one or more encrypted network reachability contexts associated with the client device;
obtain a key for the one or more encrypted network reachability contexts;
decrypt the one or more encrypted network reachability contexts using the key to obtain network state information included in the one or more encrypted network reachability contexts, the network state information including at least an encryption algorithm, an encryption key, an integrity protection algorithm, or an integrity protection key;
protect the data packet based on at least one of the encryption algorithm, the encryption key, the integrity protection algorithm, or the integrity protection key; and
transmit a message including the data packet to the client device.

31. The network device of claim 30, wherein the processing circuit is further configured to:
reconstruct a context for the client device based on the network state information included in the one or more encrypted network reachability contexts.

32. The network device of claim 30, wherein the network state information further includes information that enables the network device to reach the client device for transmission of the message.

33. The network device of claim 30, wherein the processing circuit is further configured to:
generate a first message authentication code using the key; and
compare the first message authentication code to a second message authentication code in the one or more encrypted network reachability contexts in order to verify the one or more encrypted network reachability contexts.

34. A method for a network entity comprising:
receiving one or more encrypted network reachability contexts for a client device from a network device;

generating a message for the client device, the message including both a packet to be delivered to the client device and the one or more encrypted network reachability contexts; and transmitting the message to the client device, wherein the one or more encrypted network reachability contexts includes network state information that enables the network entity to reach the client device.

35. The method of claim 34, wherein the network entity is a packet data network gateway, the method further comprising:

storing the one or more encrypted network reachability contexts;

associating the one or more encrypted network reachability contexts to the client device;

receiving a packet to be transmitted to the client device, wherein the packet is included in the generated message; and determining the one or more encrypted network reachability contexts that corresponds to the client device.

36. The method of claim 35, wherein the one or more encrypted network reachability contexts serve to reduce an amount of a context maintained at the network entity and enable reconstruction of a context for the client device.

37. The method of claim 34, wherein the network entity includes at least a packet data network gateway or a server.

38. A network entity, comprising:
a communication circuit configured to communicate with one or more network entities; and
a processing circuit coupled to the communication circuit, the processing circuit configured to
receive one or more encrypted network reachability contexts for a client device from a network device;
generate a message for the client device, the message including both a packet to be delivered to the client device and the one or more encrypted network reachability contexts; and
transmit the message to the client device, wherein the one or more encrypted network reachability contexts include network state information that enables the network entity to reach the client device.

39. The network entity of claim 38, wherein the network entity is a packet data network gateway, wherein the processing circuit is further configured to:
store the one or more encrypted network reachability contexts;
associate the one or more encrypted network reachability contexts to the client device;
receive a packet to be transmitted to the client device, wherein the packet is included in the generated message; and
determine the one or more encrypted network reachability contexts that corresponds to the client device.

40. The network entity of claim 39, wherein the one or more encrypted network reachability contexts serve to reduce an amount of a context maintained at the network entity and enable reconstruction of a context for the client device.

41. The network entity of claim 38, wherein the network entity includes at least a packet data network gateway or a server.

42. A method for a first network device comprising:
receiving a control packet from a client device;
requesting a context for the client device from a second network device;
receiving the context for the client device from the second network device;
generating one or more encrypted network reachability contexts based on the context received from the second network device; and
transmitting the one or more encrypted network reachability contexts to a network entity.

43. The method of claim 42, further comprising:
transmitting, to the client device, a globally unique temporary identifier associated with the first network device.

44. The method of claim 42, wherein the one or more encrypted network reachability contexts include network state information that enables the network entity to reach the client device.

45. The method of claim 44, wherein the network entity is a server.

46. The method of claim 42, wherein the first network device is associated with a new serving area with respect to the client device, wherein the second network device is associated with an old serving area with respect to the client device, and wherein the control packet includes a serving area update request.

47. A first network device comprising:
a communication circuit configured to communicate with one or more network entities; and
a processing circuit coupled to the communication circuit, the processing circuit configured to
receive a control packet from a client device;
request a context for a client device from a second network device;
receive the context for the client device from the second network device;
generate one or more encrypted network reachability contexts based on the context received from the second network device; and
transmit the one or more encrypted network reachability contexts to a network entity.

48. The first network device of claim 47, wherein the processing circuit is further configured to:
transmit, to the client device, a globally unique temporary identifier associated with the first network device.

49. The first network device of claim 47, wherein the one or more encrypted network reachability contexts include network state information that enables the network entity to reach the client device.

50. The first network device of claim 49, wherein the network entity is a server.

51. The first network device of claim 47, wherein the first network device is associated with a new serving area with respect to the client device, wherein the second network device is associated with an old serving area with respect to the client device, and wherein the control packet includes a serving area update request.

* * * * *